United States Patent [19]

Waugh et al.

[11] Patent Number: 4,663,710
[45] Date of Patent: May 5, 1987

[54] INTELLIGENT COOKING APPLIANCE

[75] Inventors: Gerald Waugh; Charley Myers; John Davis; John Sullivan, all of Shreveport, La.

[73] Assignee: The Frymaster Corporation, Shreveport, La.

[21] Appl. No.: 512,204

[22] Filed: Jul. 8, 1983

Related U.S. Application Data

[63] Continuation-in-part of Ser. No. 264,173, May 15, 1981, Pat. No. 4,437,159.

[51] Int. Cl.[4] .............. G05B 15/02; G06F 15/20; H05B 15/02; A47J 37/12

[52] U.S. Cl. .................. 364/400; 364/557; 219/492; 219/494

[58] Field of Search ................ 99/324–336, 99/329 R, 342–344, 403, 407; 219/490, 492, 494, 497, 501, 441–442; 364/400, 557, 149; 331/66; 338/28; 377/20; 236/9, 46, 15, 18

[56] References Cited

U.S. PATENT DOCUMENTS

| | | | |
|---|---|---|---|
| Re. 29,609 | 4/1978 | Wadia et al. | 219/494 |
| Re. 31,833 | 2/1985 | Loeffler et al. | 219/433 X |
| 3,775,591 | 9/1973 | Gould | 219/501 |
| 3,924,101 | 12/1975 | Beard | 219/494 X |
| 3,938,498 | 2/1976 | Price | 219/490 |
| 4,036,995 | 7/1977 | Koether et al. | 426/233 |
| 4,114,447 | 9/1978 | Creach | 73/362 AR |
| 4,167,663 | 9/1979 | Granzow et al. | 219/497 |
| 4,197,581 | 4/1980 | Watrous et al. | 364/400 |
| 4,200,910 | 4/1980 | Hall | 364/104 |
| 4,206,872 | 6/1980 | Levine | 236/46 R |
| 4,211,113 | 7/1980 | Harrison | 73/359 R |
| 4,223,379 | 9/1980 | Simcoe | 364/104 |
| 4,225,776 | 9/1980 | Meisner et al. | 219/492 |
| 4,228,730 | 10/1980 | Schlinder | 99/329 R |
| 4,246,641 | 1/1981 | Babil | 364/571 |
| 4,282,423 | 8/1981 | Volz | 219/490 |
| 4,289,064 | 9/1981 | Rosenblatt | 93/334 |
| 4,295,039 | 10/1981 | Stuckert | 235/380 |
| 4,300,199 | 11/1981 | Yoknis | 364/557 |
| 4,301,509 | 11/1981 | Haase et al. | 364/557 |
| 4,304,177 | 12/1981 | Loessler et al. | 99/333 |
| 4,309,584 | 1/1982 | Terakami | 219/10.55 |
| 4,320,285 | 3/1982 | Koether | 219/497 |
| 4,345,132 | 8/1982 | Takase et al. | 219/10.55 |
| 4,345,145 | 8/1982 | Norwood | 219/492 |
| 4,350,858 | 9/1982 | Yoshida | 219/10.55 B |
| 4,362,094 | 12/1982 | Polster | 99/342 |
| 4,370,546 | 1/1983 | Warner | 219/497 |
| 4,371,271 | 2/1983 | Bellet | 374/183 |
| 4,428,685 | 1/1984 | Lemelson et al. | 374/163 |
| 4,429,829 | 2/1984 | Dutton | 236/76 |
| 4,437,159 | 3/1984 | Waugh | 364/400 |
| 4,464,067 | 8/1984 | Hanaoka | 374/170 |
| 4,475,823 | 10/1984 | Stone | 374/1 |
| 4,503,502 | 3/1985 | Chapin | 364/400 |
| 4,580,025 | 4/1986 | Carlson et al. | 364/557 X |
| 4,601,004 | 7/1986 | Holt et al. | 364/557 |

FOREIGN PATENT DOCUMENTS

| | | | |
|---|---|---|---|
| DT27233 | 12/1978 | Fed. Rep. of Germany | 219/490 |
| 2011677 | 7/1979 | United Kingdom | 364/400 |
| 2018434 | 10/1979 | United Kingdom | 364/557 |

OTHER PUBLICATIONS

"Single Chip Microprocessor Rules the Roast", published Dec. 9, 1976 in *Electronics*, vol. 49, No. 25, pp. 105–110, Bell and Ogden.

*Primary Examiner*—Jerry Smith
*Assistant Examiner*—Charles B. Meyer
*Attorney, Agent, or Firm*—Hubbard, Thurman, Turner, and Tucker

[57] ABSTRACT

A cooking appliance includes a heating source to provide heat to a cooking medium for cooking food, temperature sensing circuitry for detecting the cooking medium temperature and control circuitry connected to the temperature sensing circuitry for cooking the food according to data stored in the control circuitry by controlling the heating source and removing the food from the cooking medium in accordance with the data. A temperature sensing apparatus is also disclosed that includes a temperature probe for measuring temperature and a reference circuit indicating a referenced temperature. Circuitry is alternately connected to the temperature probe and the reference circuit for alternately providing a first and second output signal indicative of the measured temperature and the referenced temperature respectively. Data processing circuitry is also provided that receives the output signals and computes the measured temperature from the first and second output signals.

6 Claims, 84 Drawing Figures

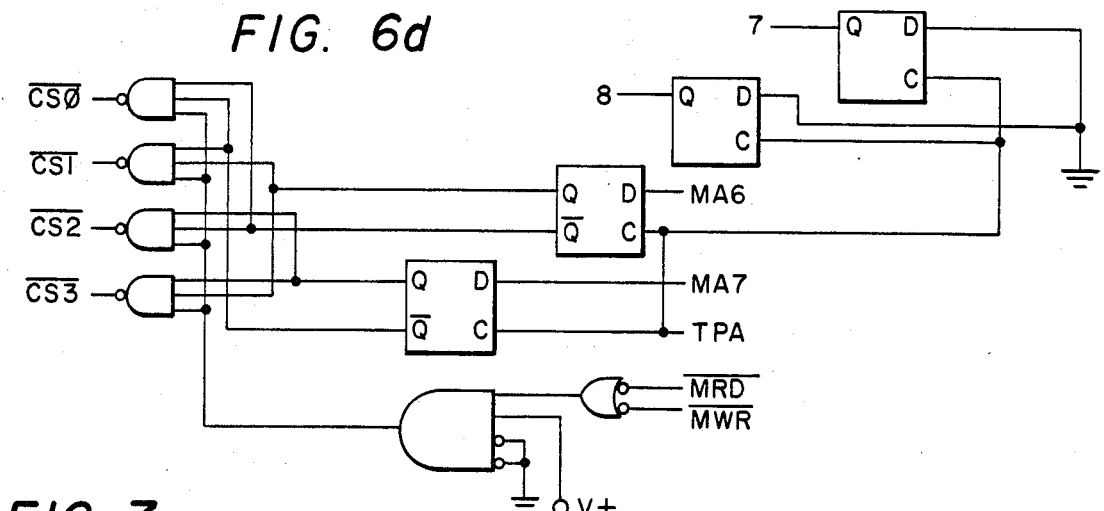
FIG. 6d
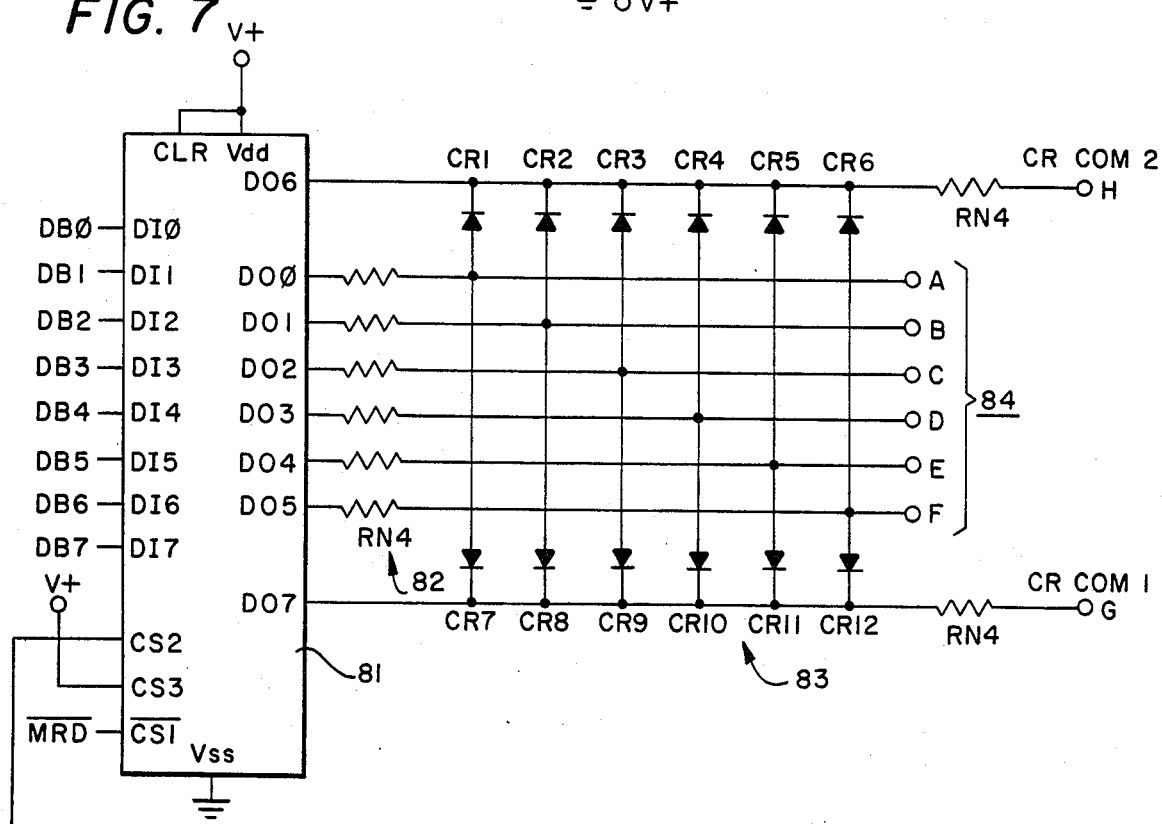
FIG. 7
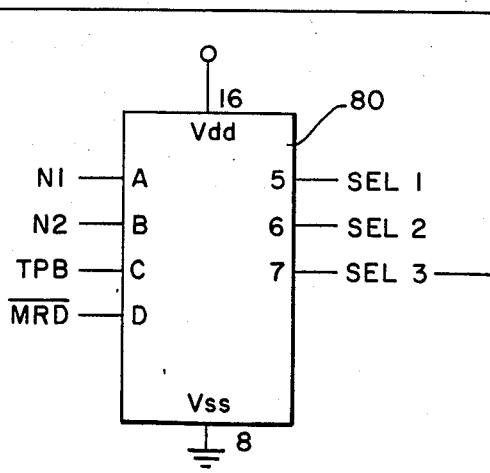

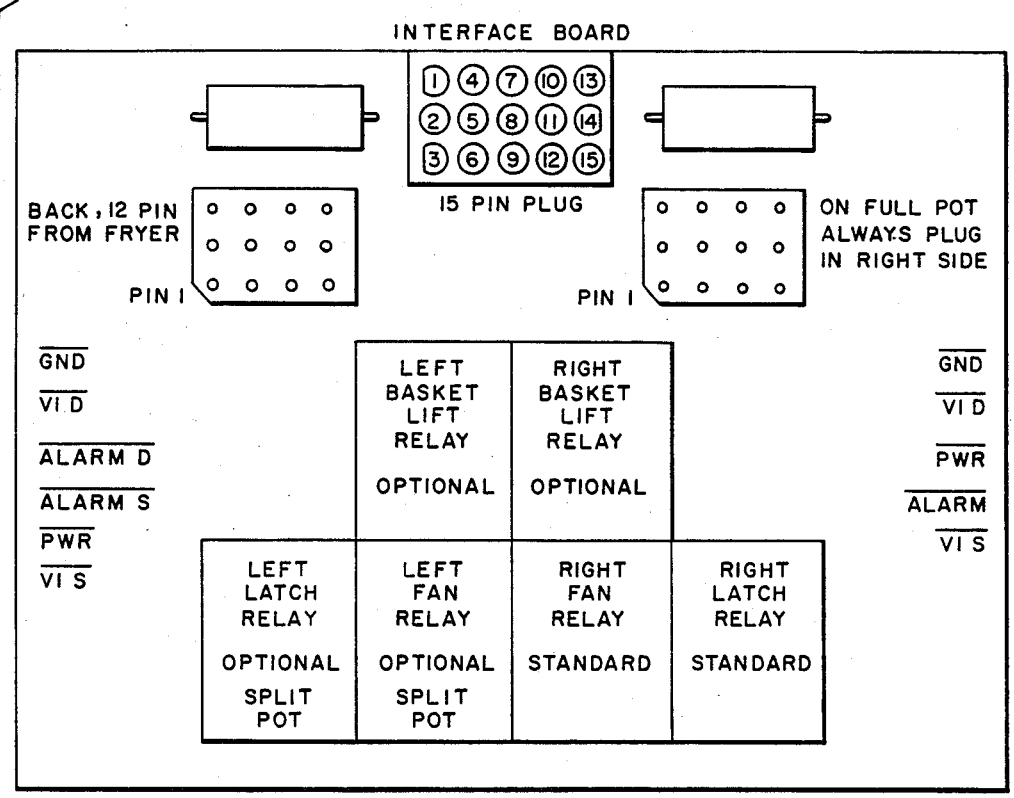

FIG. 14d

FOR FULL POT ONLY (1) CONNECT WIRE 12C TO PIN 9 ON RIGHT 12 PIN CONNECTOR (2) OMIT RIGHT GAS VALVE, WIRE 13C AND WIRE 22C (3) ON LEFT IGNITION MODULE (A) CONNECT WIRE 3C TO VI S INSTEAD OF VI D (B) CONNECT WIRE 4C TO ALARM S INSTEAD OF ALARM D (4) ON RIGHT IGNITION MODULE (A) CONNECT WIRE 8C TO VI S INSTEAD OF VI D (5) OMIT LEFT OPERATING PROBE AND HI LIMIT TSTAT

\* NOTE

FOR NON BASKET LIFT APPLICATIONS (1) CONNECT WIRE 26C FROM PIN 8 (8 PIN TERMINAL BLOCK) DIRECT TO CORD SET (2) CONNECT WIRE 27C FROM PIN 4 (8 PIN TERMINAL BLOCK) DIRECT TO CORD SET

INTELLIGENT COOKING APPLIANCE

RELATED CASE

This application is a continuation-in-part of U.S. patent application Ser. No. 264,173 filed 5-15-81, and now U.S. Pat. No. 4,437,159 issued 3-13-84.

BACKGROUND OF THE INVENTION

1. Field of the Invention

This invention relates to cooking devices and more specifically to programmable cooking devices.

2. Description of the Prior Art

There has been for a long time a need for a deivce to control precisely cooking of foods in deep fat fryers precisely and easily. A number of approaches have been developed in the prior art.

U.S. Pat. No. 3,979,056 to Barnes for a multi-Product Cooking Computer discloses an electronic circuit having a timer controlled in part by a temperature probe submerged within heated oil or shortening in a deep fat fryer well. The temperature probe controls the rate of oscillation of an oscillator 22. Oscillator 22 drives a counter 24. When counter 24 counts a predetermined number of oscillations of oscillator 22, an output signal is provided indicating that cooking has been completed. In other words Barnes employs a temperature adjusted oscillator to perform a type of time-temperature cooking integration. Barnes also provides a plurality of product selected switches which connect different resistences in series with a capacitor 68 to control the period of the oscillator. However, should it become necessary to adjust the time for which a particular product selection is cooked, internal adjustments of a mechanical or electronic nature would have to be made to the circuit.

Another approach was taken in U.S. Pat. No. 4,197,581 to Watrous et al, for a control system for a method of controlling a cooking appliance. Watrous teaches the use of a combination micro-computer controller having associated circuitry for controlling a deep fat fryer. Watrous, preloads timing counters from a diode matrices. Watrous like Barnes, employs a temperature variable frequency oscillator but uses it to actuate computer counters. The variable frequency oscillator of Watrous is controlled by a cooking control probe R801 so that as the probe, which is submerged in heating oil, becomes warmer, the oscillator runs faster. There is no provision in Watrous for altering the pre-load cooking counter without rewiring a circuir board.

SUMMARY OF THE INVENTION

In accordance with the present invention a cooking appliance is provided that includes a heating source to provide heat to a cooking medium for cooking food. A temperature sensing circuit is further provided for detecting the cooking medium temperature. Control circuitry is provided that is connected to the temperature sensing circuit for cooking the food according to data stored in the control circuitry and by controlling the heating source and removing the food from the cooking medium in accordance with the data.

In an embodiment of the present invention a cooking applicance is provided that includes the heat source to provide heat to a cooking medium of cooking oil or shortening. A temperature sensing circuit is provided for detecting the temperature of the cooking oil. Control circuitry is further provided that is connected to the temperature sensing circuit for cooking the food according to data stored in the control circuitry. The control circuitry further includes input storage circuitry that allows the user to input the cooking data. The control circuitry further includes data processing circuitry to compute the cooking time and the cooking temperature in accordance with an algorithm stored in the control circuitry and with the user entered and stored cooking data. In this preferred embodiment the input storage circuitry includes an non-volatile random access memory for storing the user input cooking data. The control circuitry further includes an output display to the user that includes both a visible indicia and an audio indicia. The control circuuit further includes a cooking sensitivity input that allows the user to alter the computation of the cooking temperature by the algorithm stored in the control circuitry. This control circuitry further includes a protective circuit to protect the cooking data from being accessed by unauthorized persons.

Also in accordance with the present invention a temperature sensing apparatus is provided that includes a temperature probe for measuring temperature, a reference circuit indicating a reference temperature, and a circuit that is alternately connected to the temperature probe and to the reference circuit for alternately providing first and second output signals indicative of the measured temperature and the reference temperature respectively. Further provided is data processing circuitry for receiving the output signals and computing the measured temperature from the first and second output signals.

BRIEF DESCRIPTION OF THE DRAWINGS

The novel features believed characteristic of the invention are set forth in the appended claims. The invention itself, however, as well as other features and advantages thereof, will be best understoo by reference to the detailed description which follows, read in conjunction with the accompanying drawings, wherein:

FIG. 6D is a schematic diagram of the address select logic.

FIG. 7 is a schematic diagram of the product display circuitry.

FIGS. 14A-D are schematic wiring diagrams.

Display 76 is a flow chart for a procedure that is activated when there is an input code access error.

DESCRIPTION OF THE PREFERRED EMBODIMENT

Figure 1:
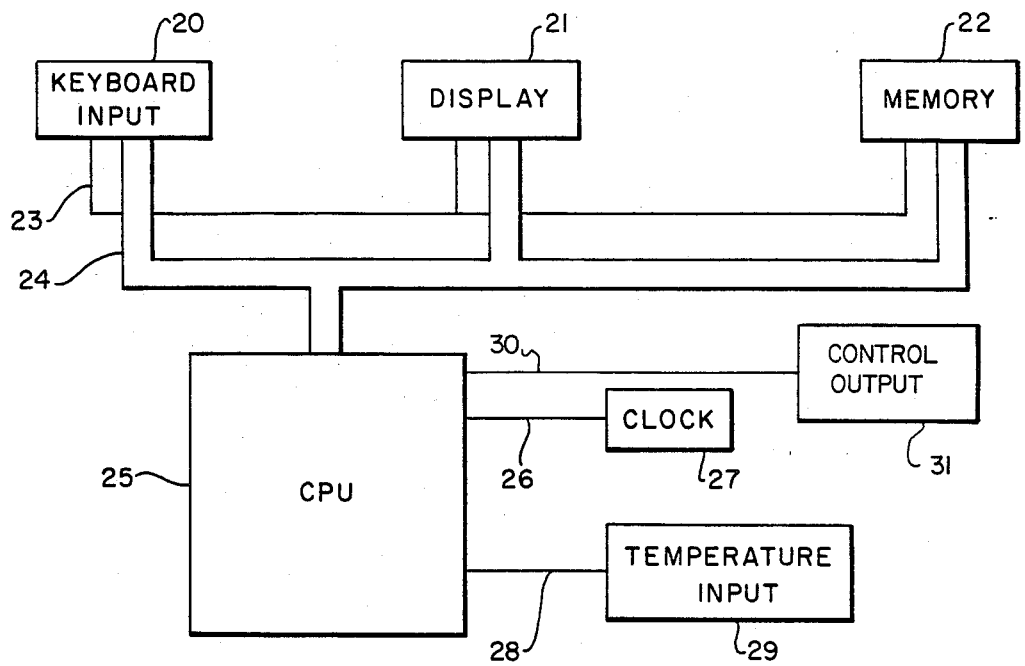
FIG. 1 is a block diagram of the cooking appliance controlling circuits.

FIG. 1 illustrates a controller for an automatic cooking appliance. The central processing unit (CPU) 25 is the intelligence of the controller. CPU 25 is connected to clock 27 by lines 26 which provide the timing signals for the internal operations of the CPU 25. CPU 25 is also connected to the temperature input 29 by a line 28. Temperature input 29 provides the temperature of the cooking medium to the CPU 25. CPU 25 is also connected to the keyboard input 20 via lines 23 and 24. Lines 23 represent control and discreet lines that connect the CPU 25 to the different peripheral devices. Lines 24 are address and data lines for the transfer of address and data information to and from the CPU 25. The keyboard input 20 provides the user input to the CPU 25. CPU 25 is also connected to the display 21 to display an output to the user. CPU 25 is further to memory 22. Memory 22 stores permanent program data in addition with user entered cooking data and provides temporary storage. CPU 25 is further connected to control output circuitry 31 via lines 30. The control output circuitry 31 provides the external control functions to control the cooking of the food in accordance with the data stored in memory 22.

Figure 2:
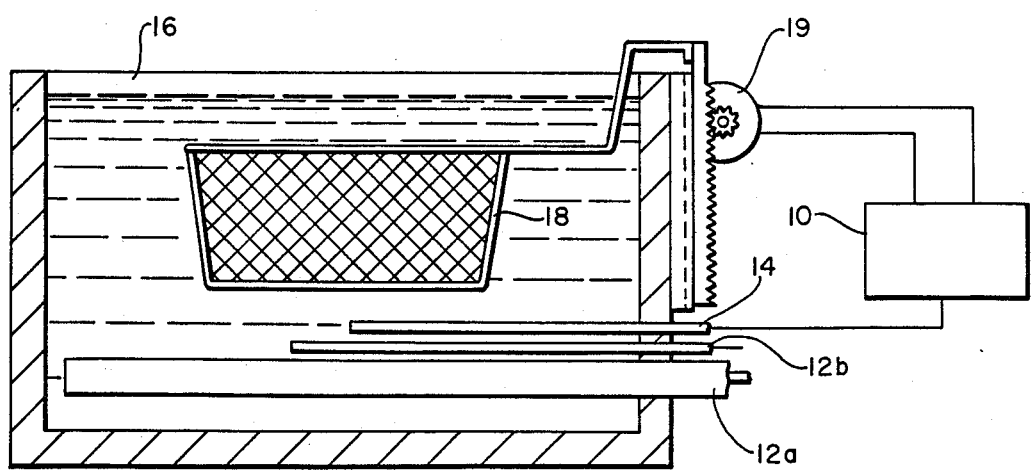
FIG. 2 is a side sectional view of the cooking appliance.

FIG. 2 illustrates the one embodiment of the present invention. Vat 16 contains a cooking oil or cooking shortening provided to cook food that is placed inside basket 18. This deep fat frying mechanism is used to fry foods. Controller 10 controls not only the cooking temperature of the oil in vat 16 but also the time of the food that is cooked in basket 18 by raising and lowering basket 18 via motor and gear mechanism 19. Controller 10 is further connected to a temperature sensing device 14. Device 12A is a heating element that in the preferred embodiment of the invention is a gas fired element to provide heat to the oil in vat 16. Device 12B is a thermostat control for the heating element 12A.

Figure 3:
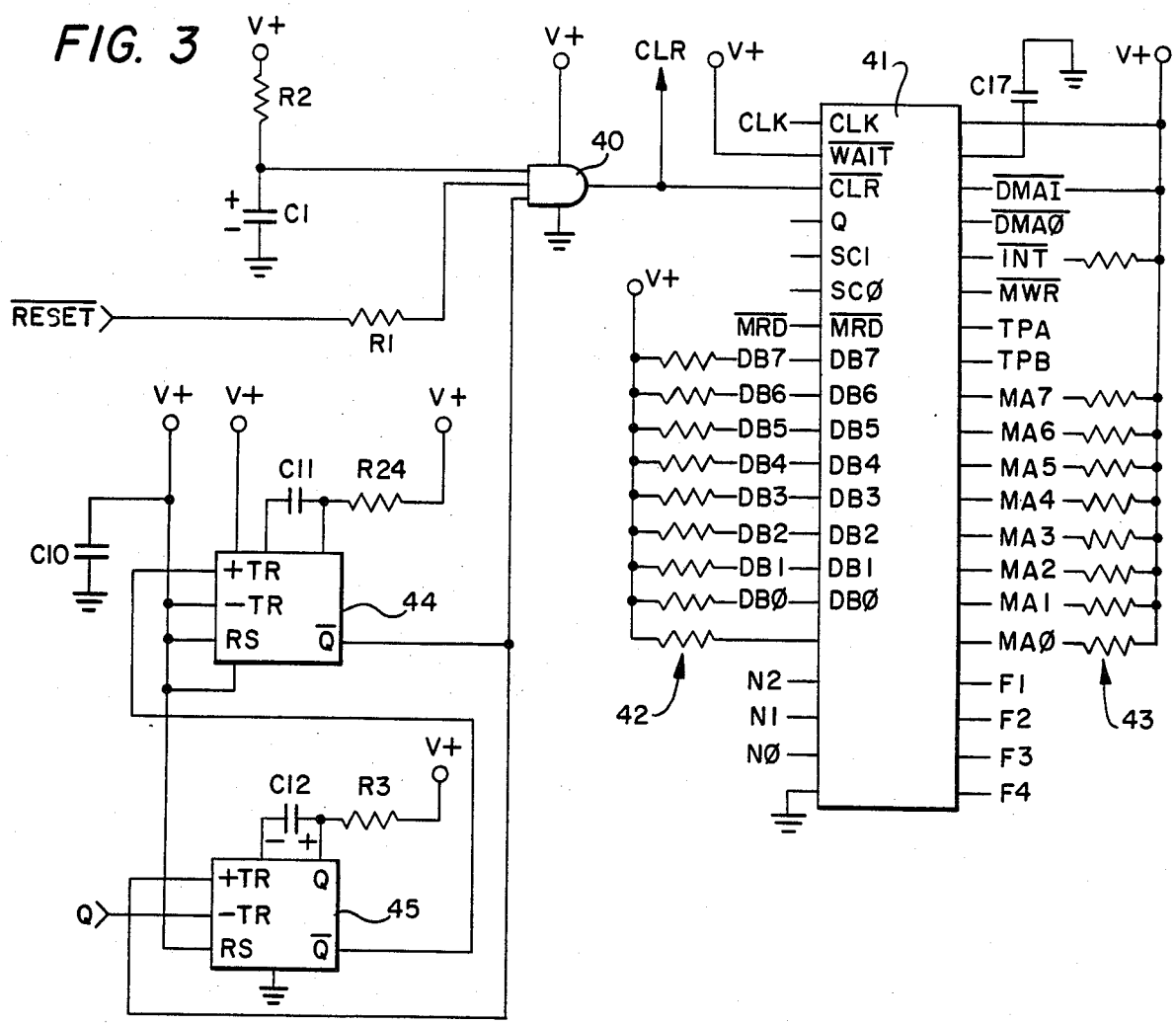
FIG. 3 is a schematic diagram of the central processing unit.

The CPU 25 of FIG. 1 is illustrated in FIG. 3. FIG. 3 illustrates the microprocessor semiconductor device 41 connected to a watchdog timer circuit consisting of flip-flops 44 and 45. In the preferred embodiment the microprocessor is an RCA 1802 CMOS microprocessor. The CMOS microprocessor is provided to reduce the heat dissipated by the controlling device. Microprocessor 41 is connected to a network of resistors for the data input on the lines as indicated. A reset signal provided by the user is connected to an AND gate 40 that provides the reset or clear function to the microprocessor 41. The R2 and C2 network insure that power has been applied for a specific time before AND gate 40 resets CPU 41. Microprocessor 41 provides data via the data lines DB0 to DB7 and addresses via address lines MA0 to MA7. It should be noted that the address lines are multiplexed in the 1802 (i.e. line MA0 to MA7 contain a 16 bit address). Resistor networks 42 and 43 are provided as pull-up resistors for the data and address lines. Flag F1 through F4 are inputs from the keyboard. N0 to N2 are programmed inputs input/output (I/O) lines. MRD- and MWR-provide the memory read memory and memory write signals, respectively. INT- is the timer interrupt. DMA0- is the input from the temperature sensing circuit. Q is provided by the microprocessor 41 to the temperature sensor to initiate the temperature input sequence. Q is also used by the watchdog timer for initialization. SC0 through SC1 (synchronous codes) are provided to peripheral devices to indicate the state of microprocessor 41. The watchdog timer circuit consisting of flip-flops 44 and 45 is a two flip-flop timing circuit provided to reset the microprocessor 41 via AND gate 40 if the Q signal is not received within a specified time. This specific time is provided by the time constant of C11. Many of the devices used in this embodiment are from the RCA CMOS microprocessor family. Specification information of the CDP 1802, CDP 1866 and CDP 1875 is incorporated by reference.

Figure 4:
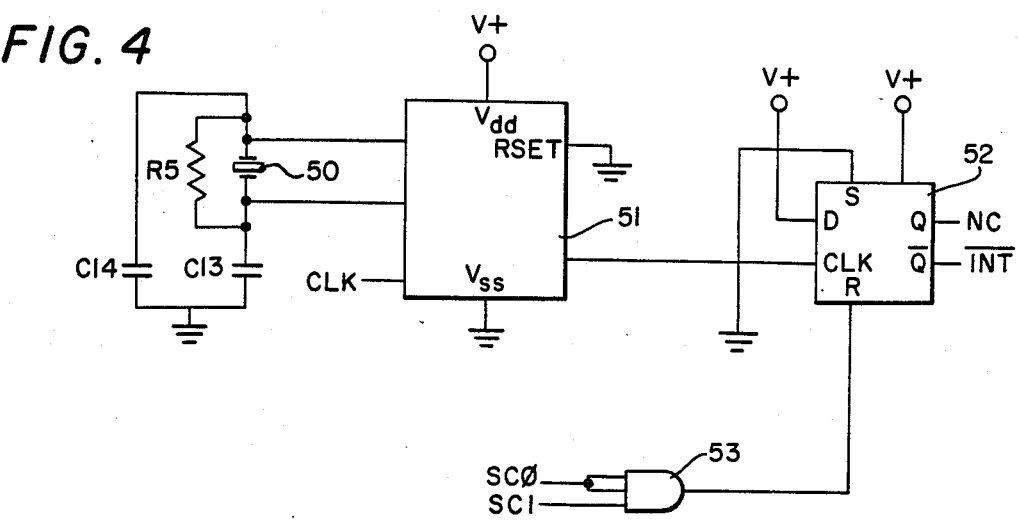
FIG. 4 is a schematic diagram of the clock.

FIG. 4 illustrates in schematic form the clock circuitry for the controller. A crystal 50 is connected to a capacitor resistor network including capacitor C13 and C14 and resistor R5 to provide an output frequency to a frequency dividing circuit 51. In the preferred embodiment, the crystal 50 provides a frequency of approximately 2.5 MHZ and device 51 is a 14-bit binary counter (4060). The frequency signal from the crystal 50 is output on the line CLK provided to the microprocessor 41 of FIG. 3. The output of frequency of crystal 50 is divided down by the counter 51 to provide a slower pulse to the flip-flop 52 to furnish a timer interrupt. The interrupt is acknowledged from the microprocessor 41 via signals SC0 and SC1 input into AND gate 53. The output of flip-flop 52 is the INT- or timer interrupt provided to microprocessor 41 as an indication of the passage of a time period.

Figure 5:
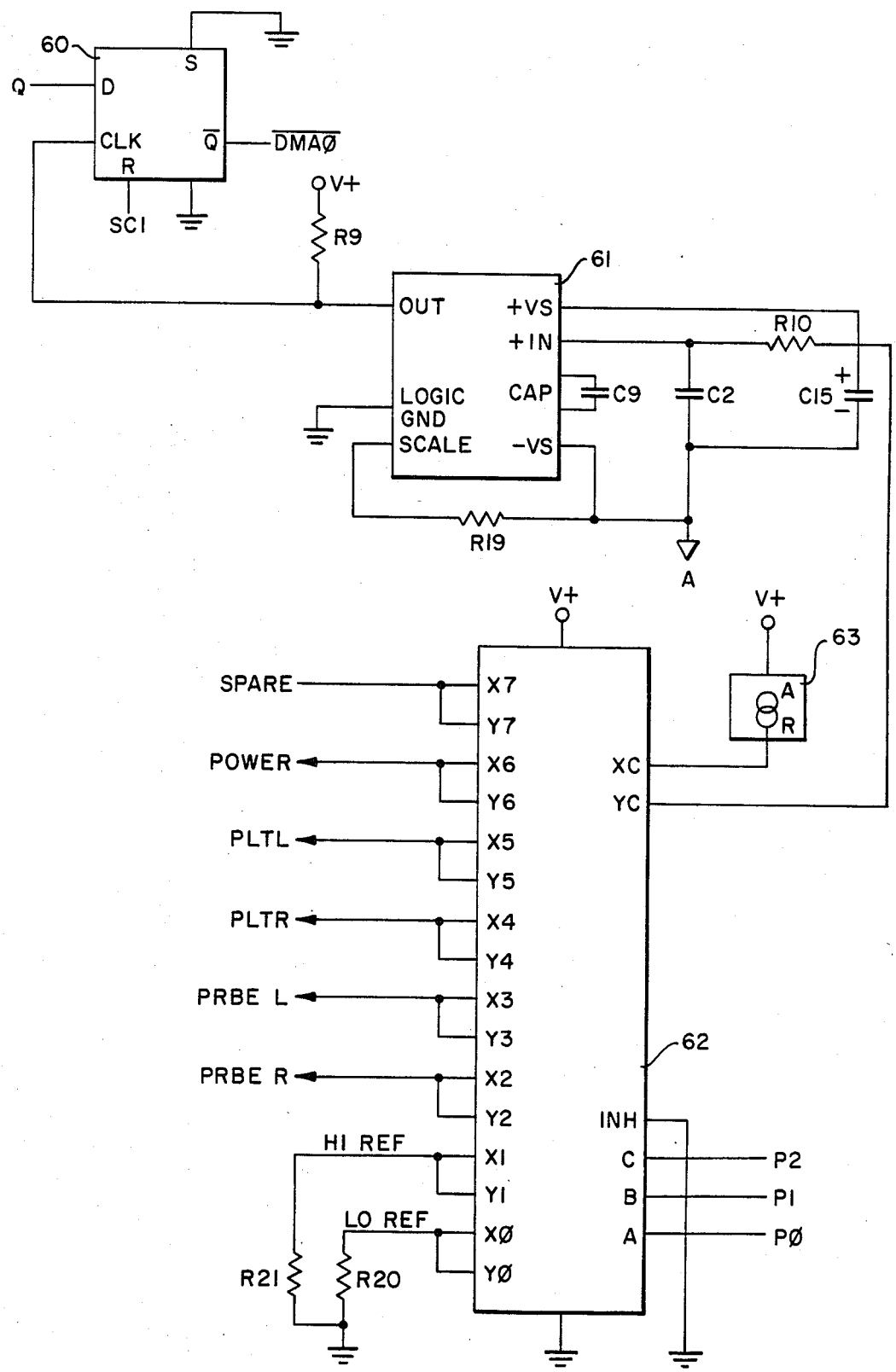
FIG. 5 is a schematic diagram of the temperature input circuit.

The temperature sensing circuit is illustrated in FIG. 5 and consists of a multiplexing semiconductor device (MUX) 62 connected to several resistance temperature devices not shown. In the preferred embodiment, the resistive temperature device is fabricated with platinum film. In this preferred embodiment applied to a two vat deep fat fryer, two of the temperature sensing devices are connected to the pilot light for a left vat (PLTL) and a pilot light for a right vat (PLTR) in the two cooking vat configuration where the vats are heated by gas and thus requiring pilot flames. In an embodiment including an igntor sub-system, this sub-system will provide a signal indicating the condition of the pilot flame. This signal is input into MUX 62. Further provided are PRBE L and PRBE R which are the temperatures of the cooking oil in the respective left and right vats. MUX 62 is further connected to a high reference resistor R21 and a low reference resistor R20 which represent the maximum and minimum temperatures measured by the temperature probes on lines PLTL, PLTR, PRBE L and PRBE R. R21 is set for 440 degrees Fahrenheit and R20 is set for 32 degrees Fahrenheit. A constant current source 63 provides a constant current to the multiplexer 62 which then connects this constant current to either the pilot probes via lines PLTL or PLTR, the vat probes via lines PRBE L or PRBE R or the reference resistors R20 or R21 in accordance with the MUX select lines P0, P1 an P2 from the CPU 41 and the output buffer in FIG. 8C. These lined P0 through P2 determine which of the temperature probes or reference lines are connected to the constant current source 63. The output voltage is connected to a voltage to frequency converter 61. Upon receiving the voltage from the MUX 62, the voltage to frequency converter converts the resulting voltage to a corresponding frequency which then is input as a clock signal into the flip-flop 60. The output of flip-flop 60 is connected to DMA0- and provided to the microprocessor 41 DMA (direct memory access) input. In the preferred embodiment, using the RCA 1802, the DMA0- input frequency count is accumulated in register 0 of the RCA 1802 to indicate the temperature of whichever probe was selected at the MUX 62. The count is initialized by an interrupt (INT-) from flip-flop 52 and stopped by the next interrupt which generates the signal Q input to flip-flop 60. An algorithm contained in microprocessor 41 computes a comparison between the probe count and the high and low reference counts to determine the exact temperature of the pilot lights or the cooking oil in the left and right vats. The algorithm computes the measured temperature by computing the frequency count difference of R21 and R20 and multiplying by 372 to compute the slope constant which is the frequency count per degree conversion factor. The probe temperature is then computed by multiplying the difference between the temperature probe count and the low reference count by the above conversion factor and then adding 32 which represents the offset. In this manner, the temperatures may be measured without extensive analog to digital conversions and other expensive peripheral devices. Using this arrangement, the temperature is input as a frequency directly into the microprocessor 41 register where it can be easily accessed by the algorithm being executed in the microprocessor 41.

Figure 6A:
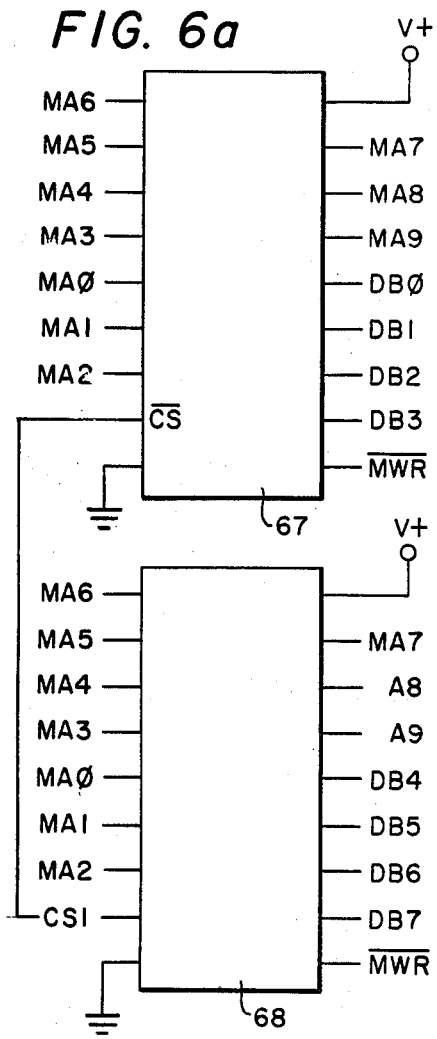
FIG. 6A is a schematic diagram of the random access memory.
Figure 6B:
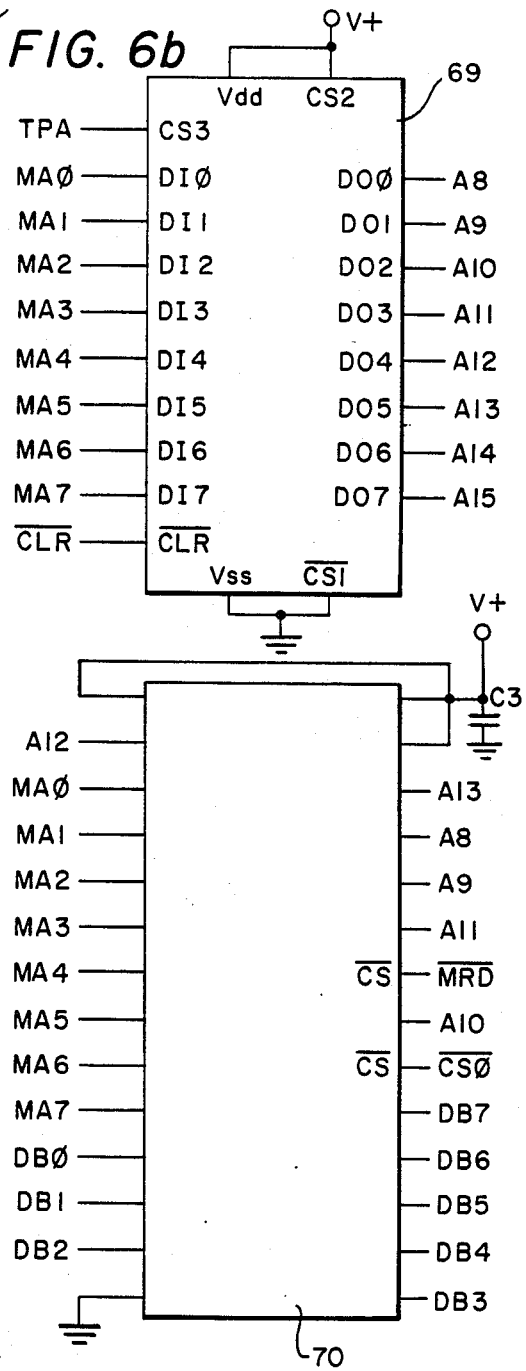
FIG. 6B is the schematic diagram of an address multiplexer and the read only memory.
Figure 6C:
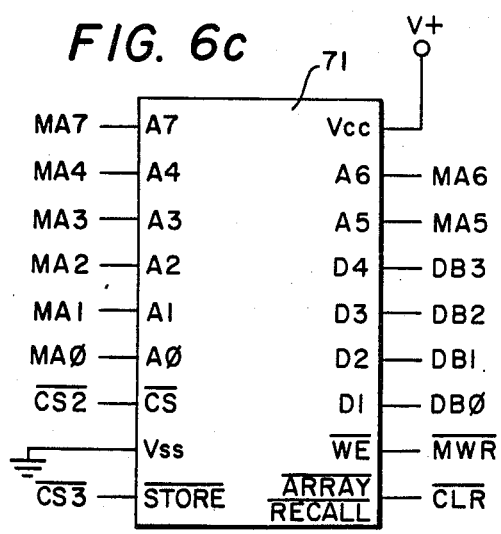
FIG. 6C is a schematic diagram of the non-volatile memory.

FIG. 6A is a portion of the memory for the controller 10. Devices 67 and 68 are random access memory semiconductor devices that are connected to the multiplexed address lines MA0 through MA7 and the data bus lines DB0 through DB7 respectively. FIG. 6B illustrates the ROM 70 that is likewise connected to the multiplexed address lines MA0 through MA7 and the data lines DB0 through DB7. Semiconductor device 69 of FIG. 6B is the demultiplexer for the multiplex address from the RCA 1802 microprocessor 41 of FIG. 3. The TPA line is used to perform the demultiplexing operation. FIG. 6C illustrates a nonvolatile RAM which is likewise connected to the multiplexed address lines MA0 through MA7 and the data lines DB0 through DB7. FIG. 6D illustrates a selection logic semiconductor device that uses multiplex address bits 6 and 7 and the microprocessor 41 timing signal TPA together with the memory read MRD- and memory write MWR- lines to select the RAM 67 and 68, ROM 70, or nonvolatile RAM 71 semiconductor devices via signals CS0- through CS3-. In the preferred embodiment this selection logic is provided by the RCA devices CDP 1866.

FIG. 7 illustrates the discrete light emitting diode (LED) display circuitry consisting of a BCD to decimal converter 80 connected to the input semiconductor device 81 which is further connected to a resistor network 82 and the LED matrix 83. The LED matrix 83, which displays which product is being cooked, is activated by line SEL3 which is decoded from the CPU 41 outputs N1 and N2 and the data latch signal TPB. The terminals 84 mark A through F are connected to the keyboard (FIG. 10) to provide keyboard scan signals.

Figure 8A:
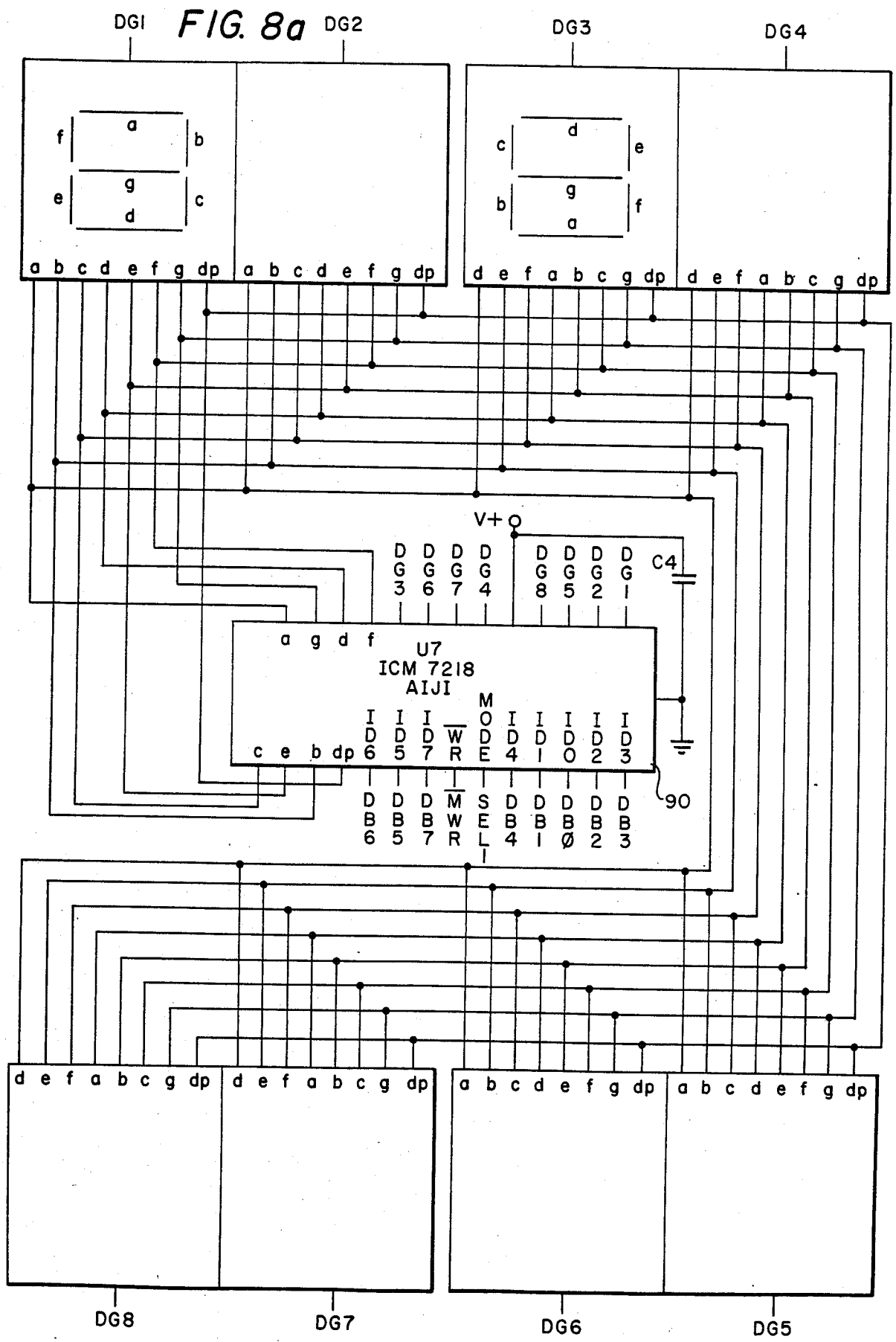
FIG. 8A is a schematic diagram of the eight 7-segment light emitting diode displays.

FIG. 8A illustrates the schematic of the seven segment light emitting diode (LED) display output. The seven segment LED displays are connected to a LED driver 90 which is connected to the data lines DB0 through DB7 from CPU 41 and select line SEL1 from the BCD to decimal converter 80 (FIG. 7). The seven segment LED displays provides alphanumeric information to the user. The UNREG line in the preferred embodiment driver 91 is a 75468 device. In this configuration pin 8 of driver is from the power supply (FIG. 9) and provides the signal to the base of transistor 96 which provides unregulated power to an interface board containing the relays previously discussed. FIG.

Figure 8B:
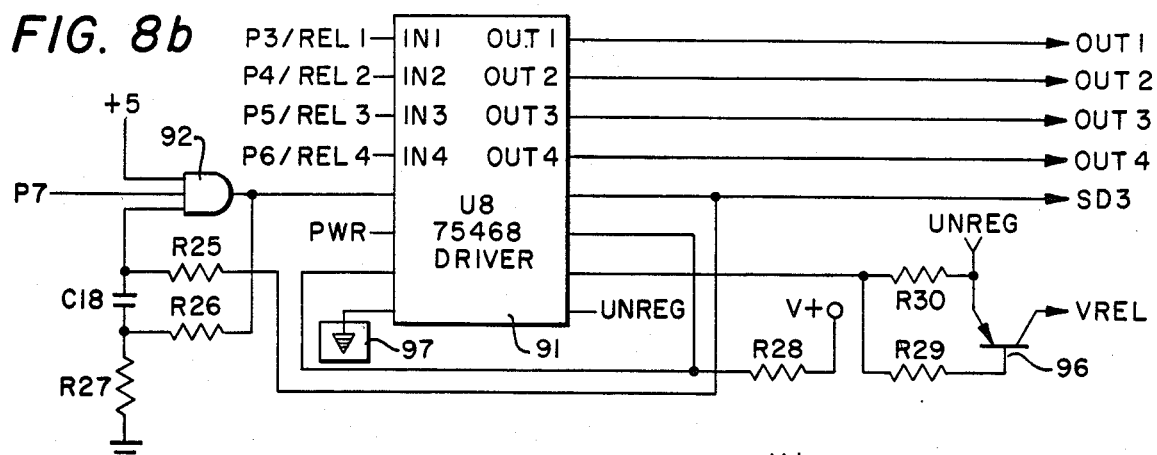
FIG. 8B is a schematic diagram of the driving circuit for the discreet light emitting diodes.
Figure 8C:
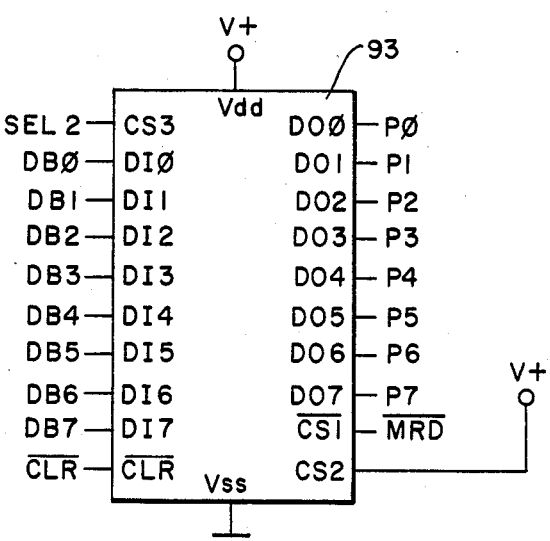
FIG. 8C is a schematic diagram of the driving circuits for the discreet outputs.

8B illustrates the driver 91 that is connected to an AND gate 92. Driver 91 provides the output signals (see FIG. 11) to the relays which control the gas regulator and the motor 19 of FIG. 2. Driver 91 and AND gate 92 receive the programmed input/output signals P3 through P7 from the microprocessor. FIG. 8C illustrates the output buffer 93 that provides the program IO signals from the data signals DB0 through DB7 controlled by the select line SEL2 and the memory read signal MR0- from the BCD to decimal converter 80 (FIG. 7).

Figure 9:
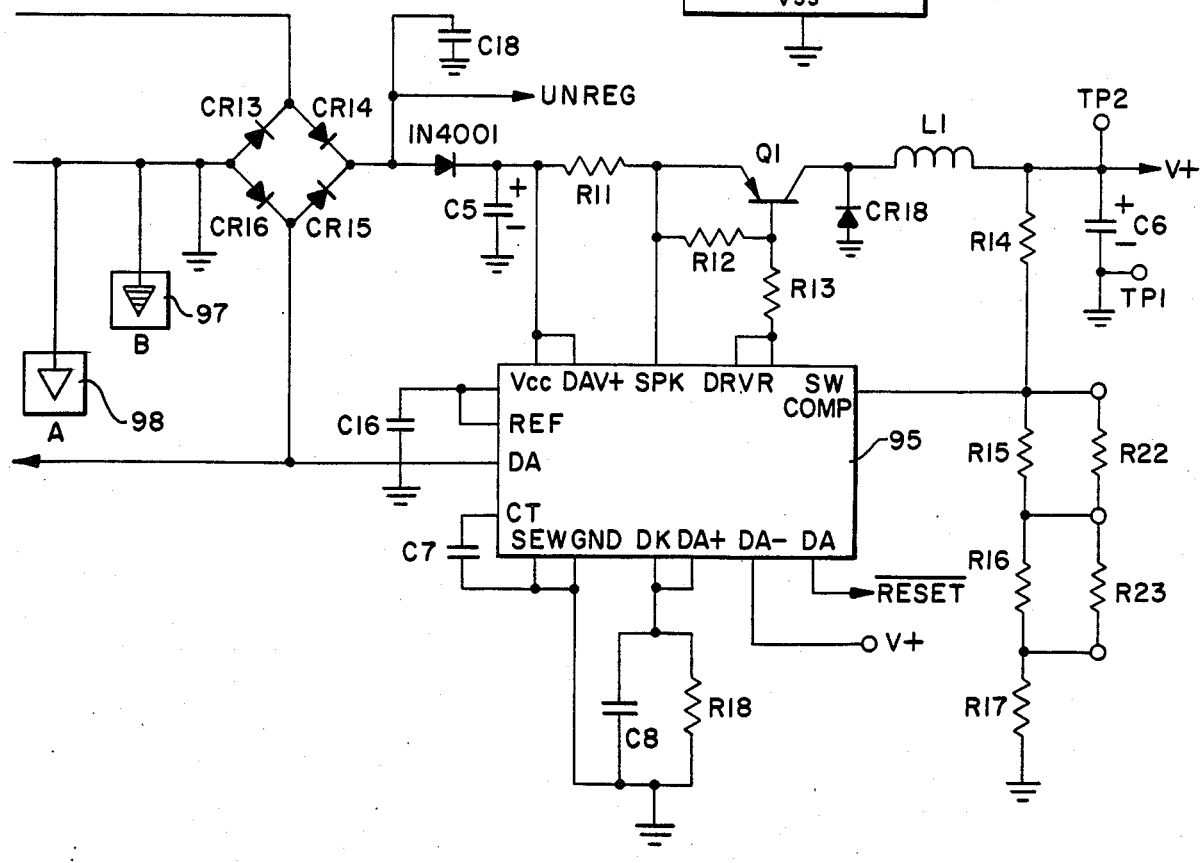
FIG. 9 is a schematic diagram of the power supply.

FIG. 9 is the schematic diagram of the power supply for the controller and consists of switching regulator 95 connected to a full wave rectifier circuit containing diodes C13 through C16. Note that the unregulated signal from the full wave bridge rectifier is provided to the driver 91 in FIG. 8B as previously discussed. Switching regulator 95 further includes an operational amplifier that provides the RESET signal when the input voltage of the four-way rectifier falls below a certain voltage level. TP2 and TP1 are test points provided on the circuit. The output V+ is regulated through Q1 and filtered through inductor L1 and capacitor C6. The full wave bridge rectifier is connected to both chassis ground 97 and analog ground 98. In the preferred embodiment the switching regulator 95 is a Fairchild 78540. For this regulator the resistor network R15, R16, R17, R22 and R23 are configured to provide an accurate input voltage of 1.3 volts.

Figure 10:
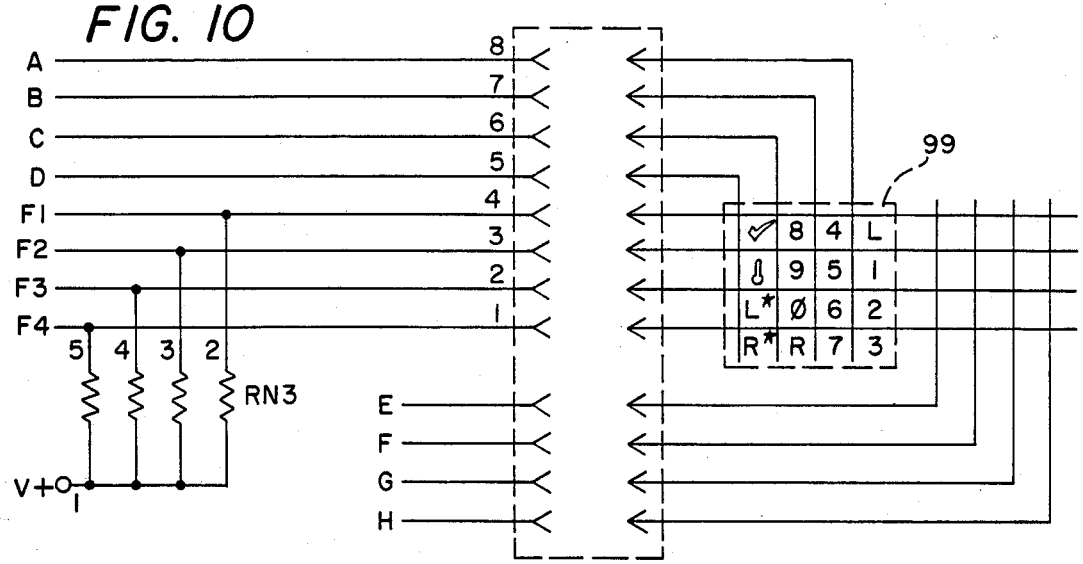
FIG. 10 is a schematic diagram of the keyboard input circuitry.

FIG. 10 illustrates the connection to the user keyboard 99. As previously discussed, lines A, B, C, D, E, F, G, and H provide scan inputs to keyboard 99. The outputs of keyboard 99 are flag lines F1, F2, F3, F4 which are connected to the pull up resistor network RN3. When the user depresses a key of the keyboard 99, the connecting flat line is grounded. When read by the CPU 41, the low flag line indicates that the key being scanned was depressed.

Figure 11:
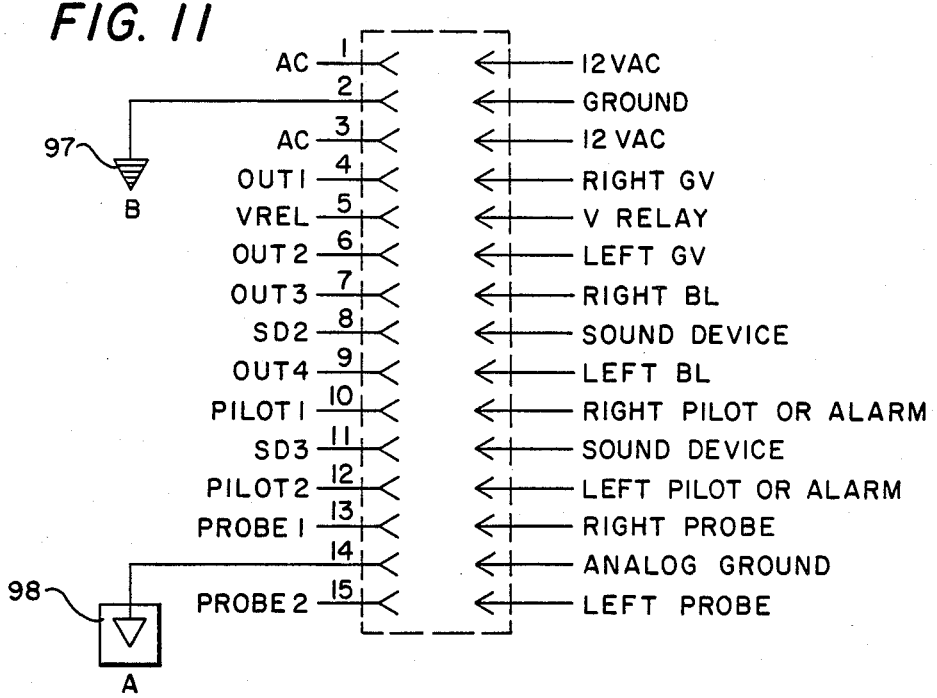
FIG. 11 is a schematic diagram of the external signal connector.

FIG. 11 illustrates the external signal connections to the fryer appliance.

Figure 12:
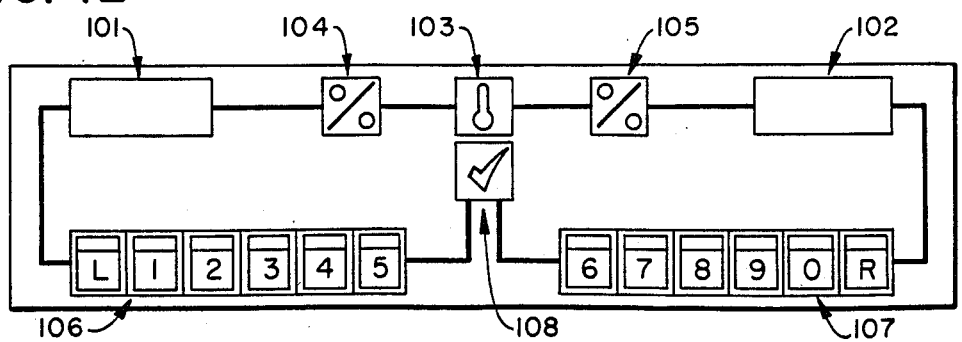
FIG. 12 is a front view of the control panel.

FIG. 12 is a front view of the control panel that provides both display and user inputs to the system. Display 101 contains four of the seven segment light emitting diodes. Display 102 contains the other remaining four seven segment light emitting diode displays. The storage switch 103 is provided to indicate to the system that the program contained in the computer is to be locked in. Switches 104 and 105 are power supply switches for the left and right vats. Switches 106 and 107 are the left, right and ten digit keyboard input switches used for entering the computer and accessing programming functions. Switch 108 is a program step verification switch. Table I contains the user input sequence for using the switches of FIG. 12.

Figure 13A:
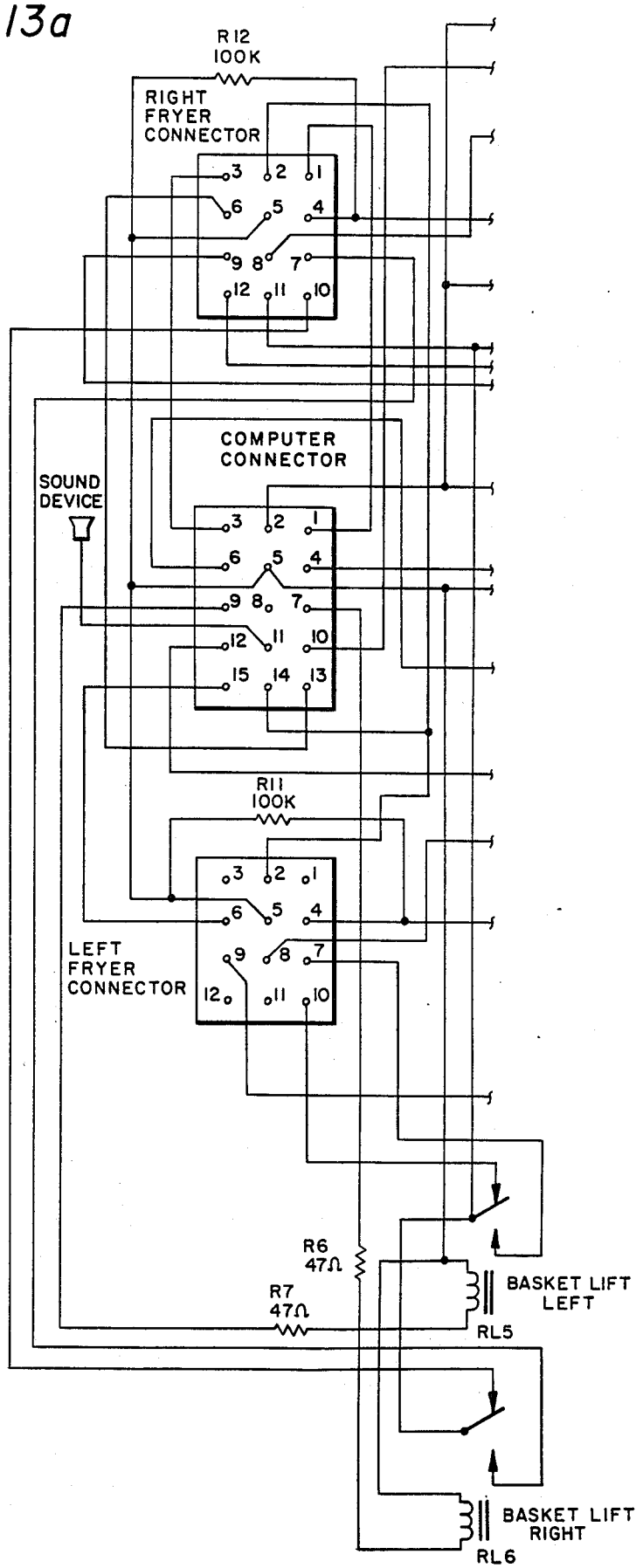
FIGS. 13A-B are schematic diagrams of the relay interconnection.
Figure 13B:
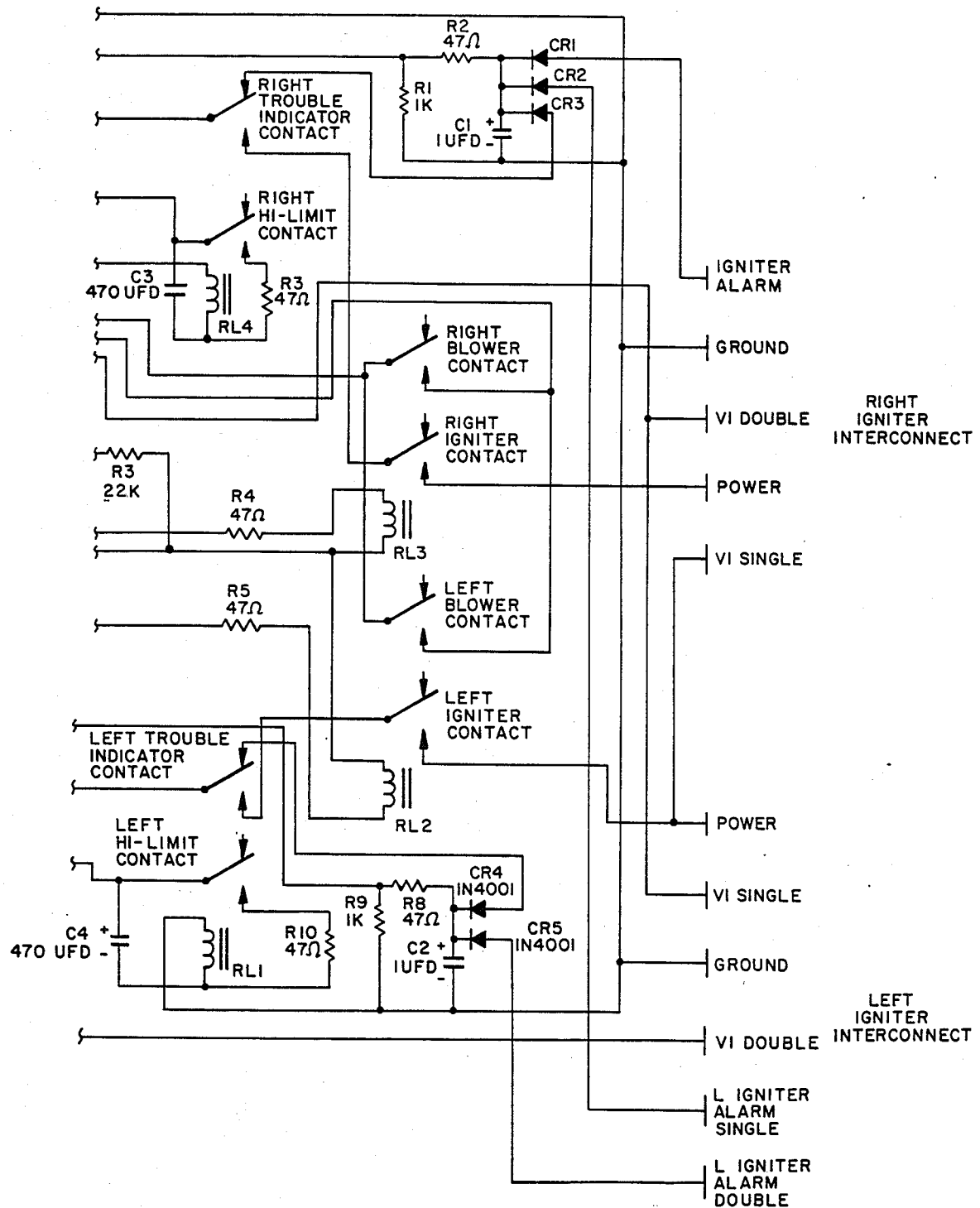
Figure 14A:
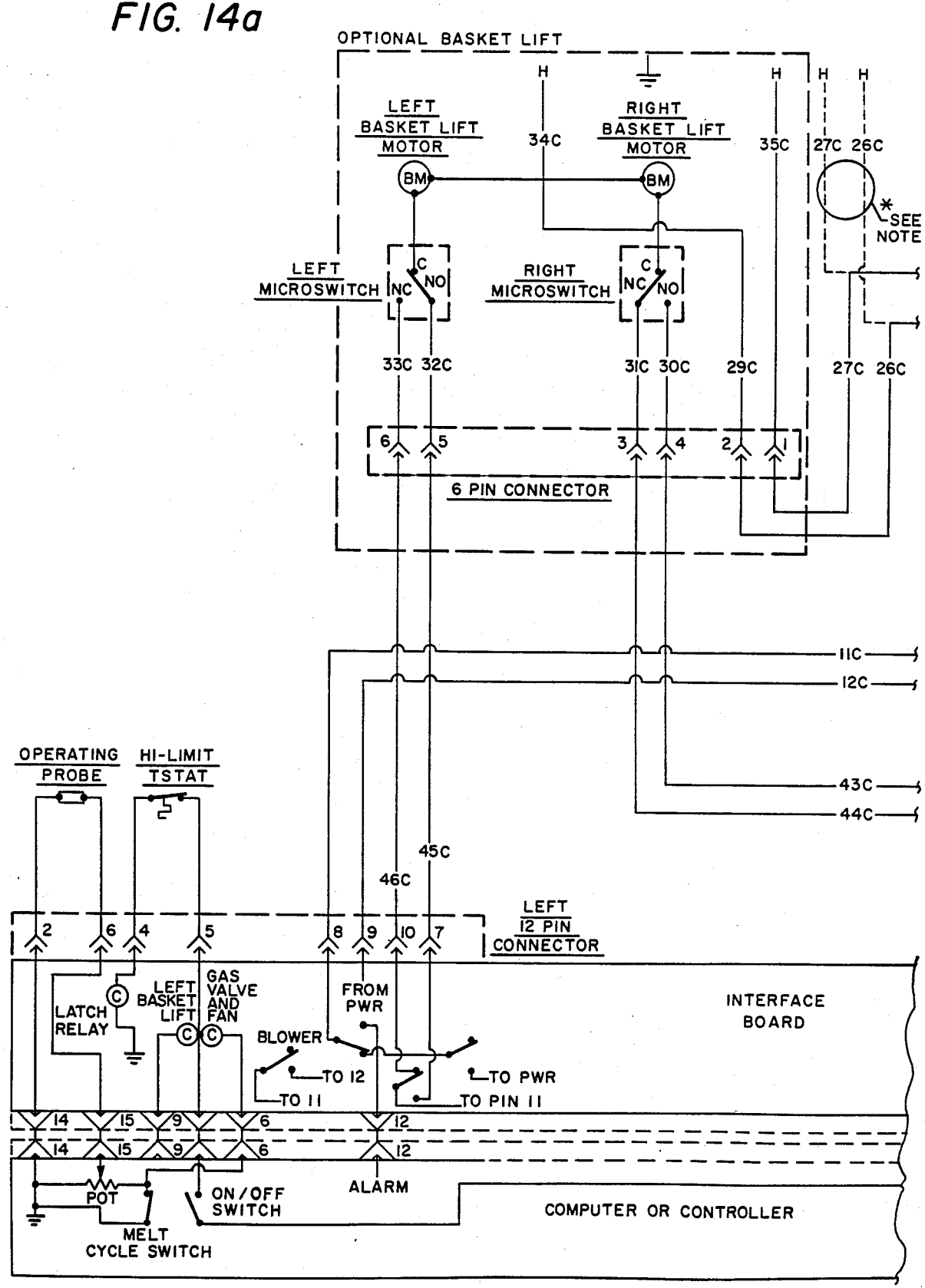
Figure 14B:
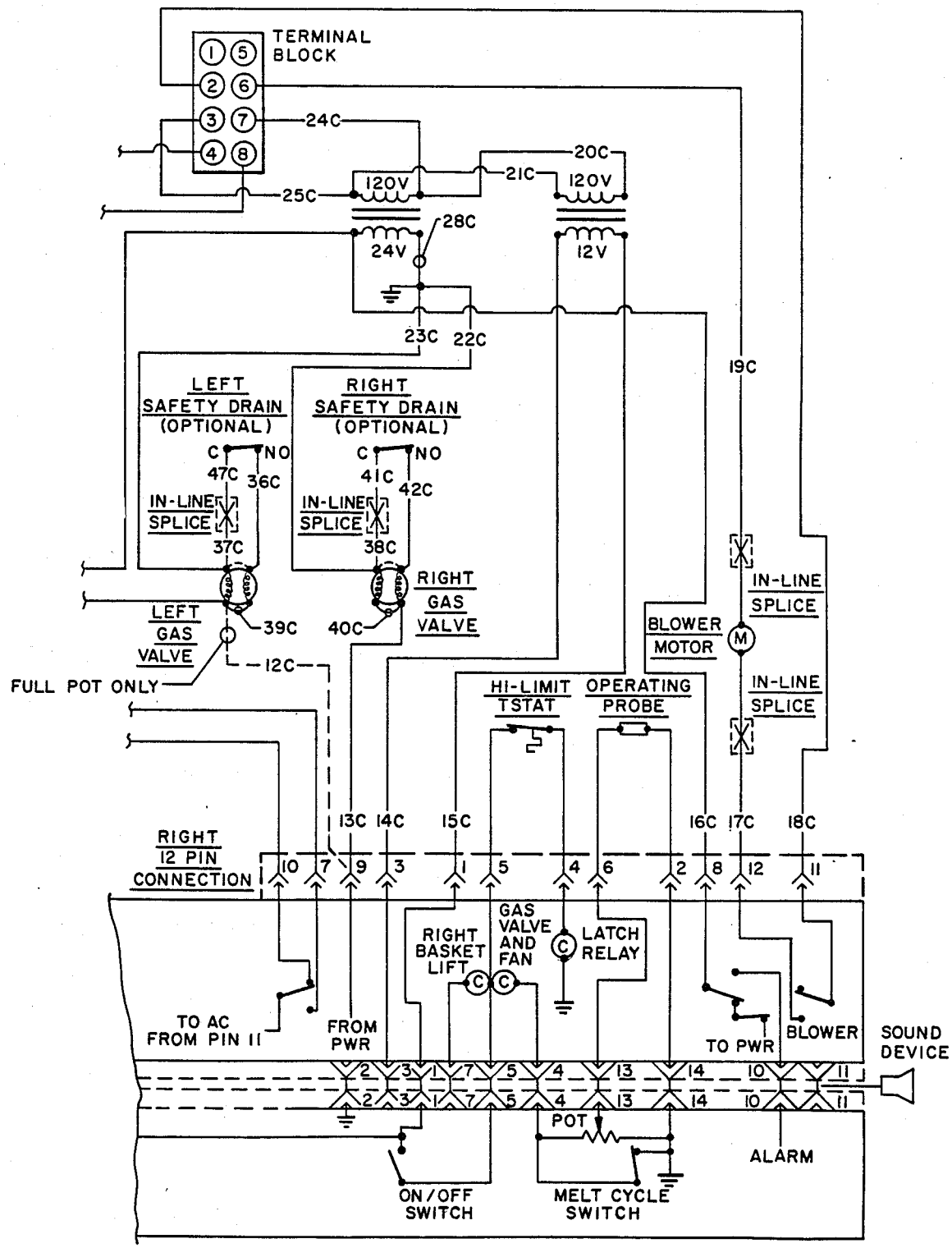
Figure 14C:
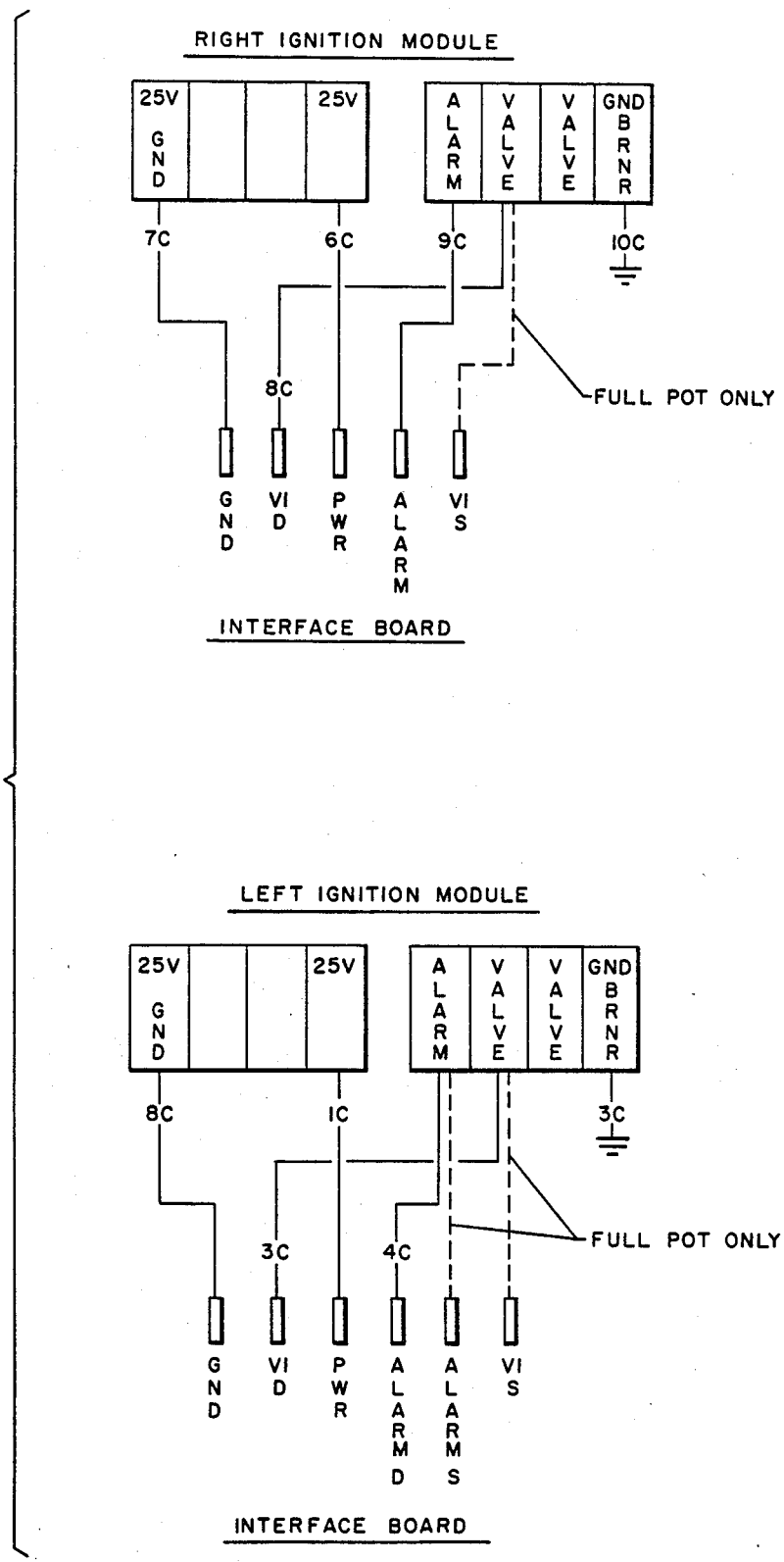

FIGS. 13a-b illustrate the schematic for an interface board that contains several relays controlled by the CPU 41 through the connection illustrated in FIG. 11. FIGS. 14a-d are schematic diagrams for the general power wiring of the cooking device.

Figure 15:
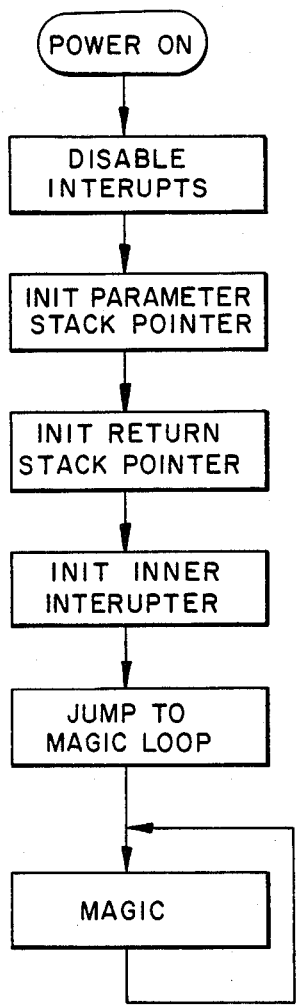
FIG. 15 is a flow chart for the power up and initialization routine.
Figure 16:
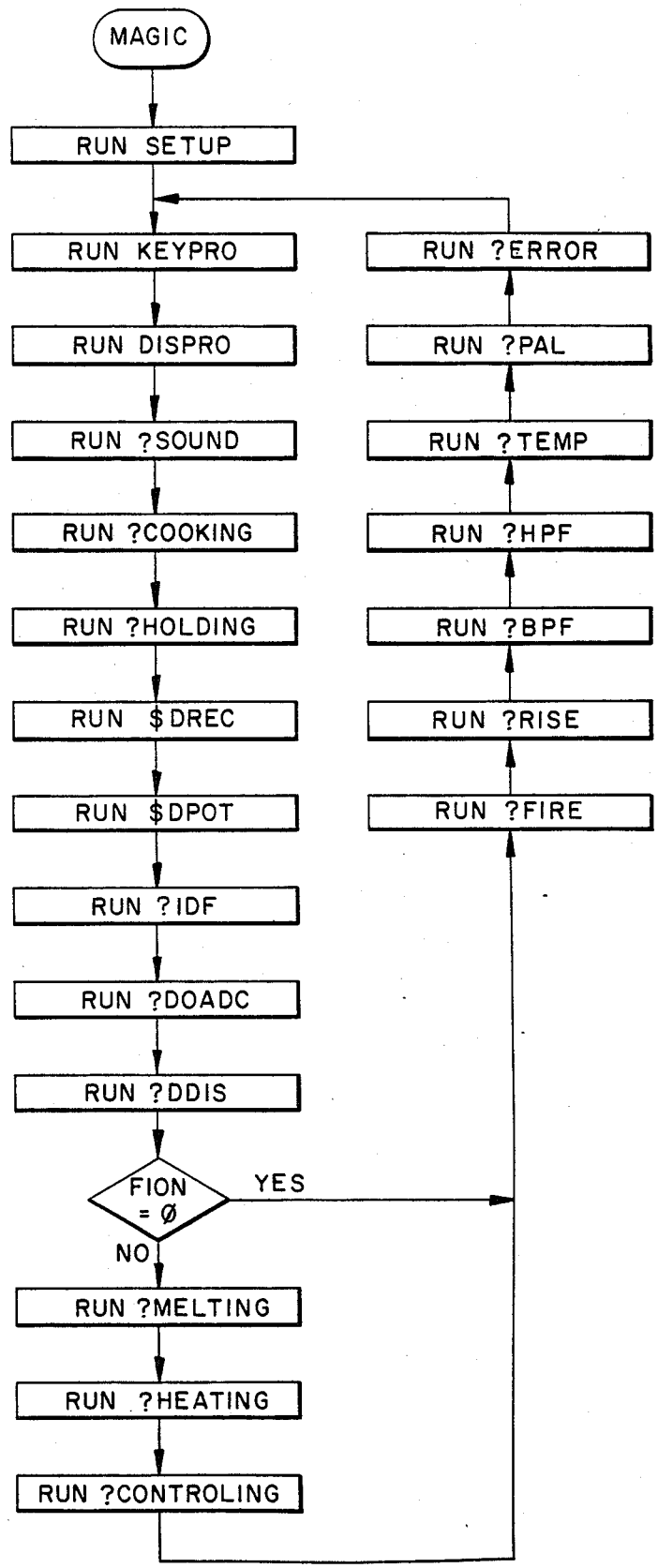
FIG. 16. is a flow chart of the Magic routine that is the principle executive operational routine.
Figure 17:
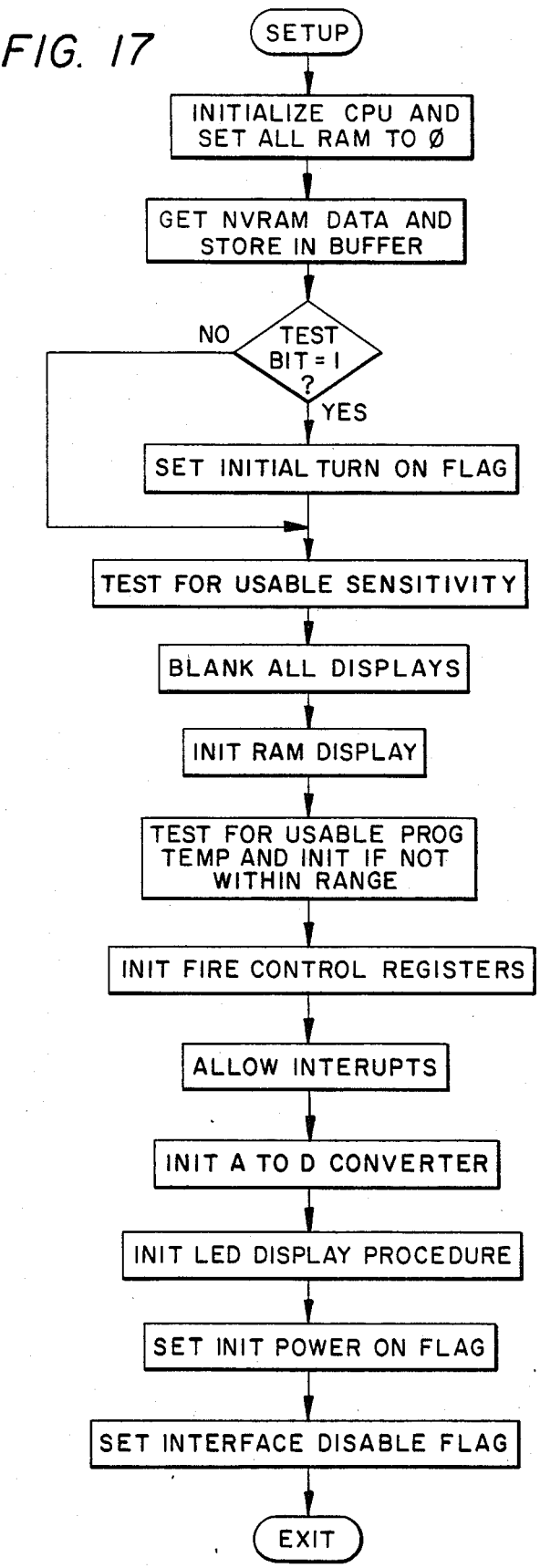
FIG. 17 is an initialization routine for the Magic executive routine.
Figure 18:
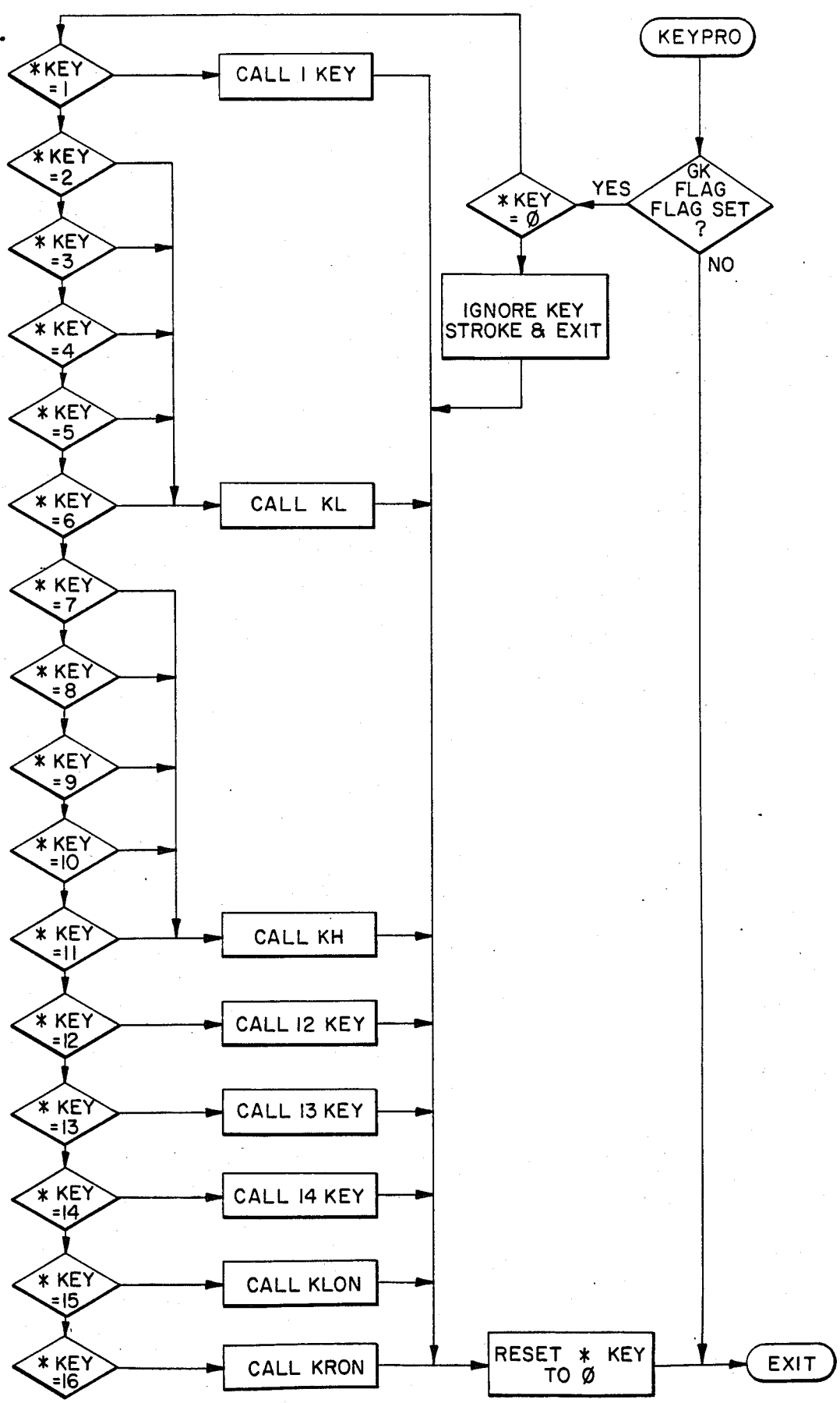
FIGS. 18 through 39 are flow charts for the keyboard processing routines.
Figure 19:
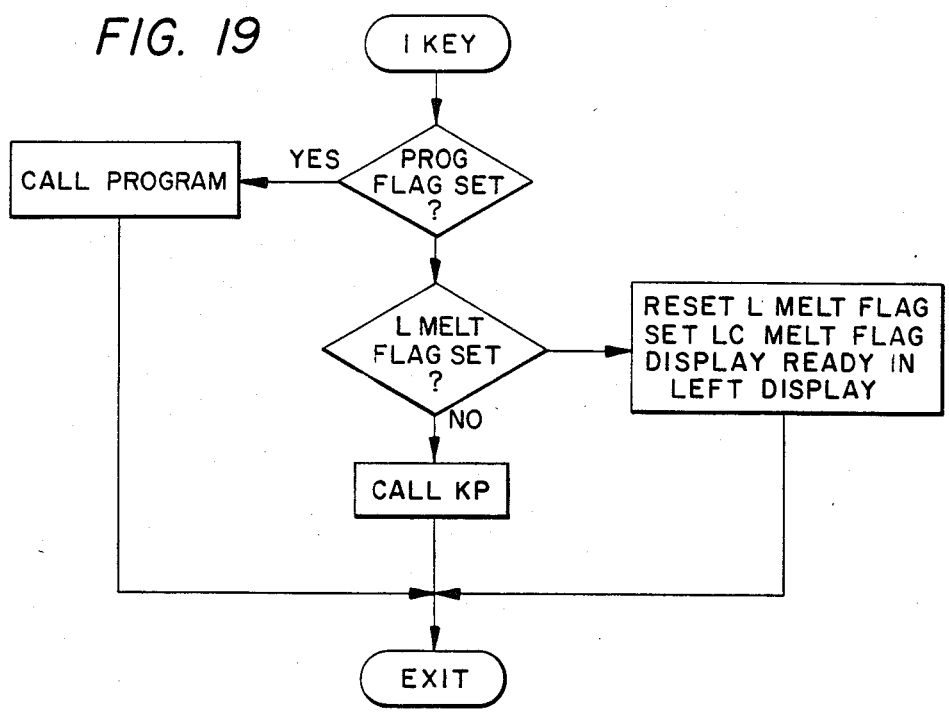
Figure 20:
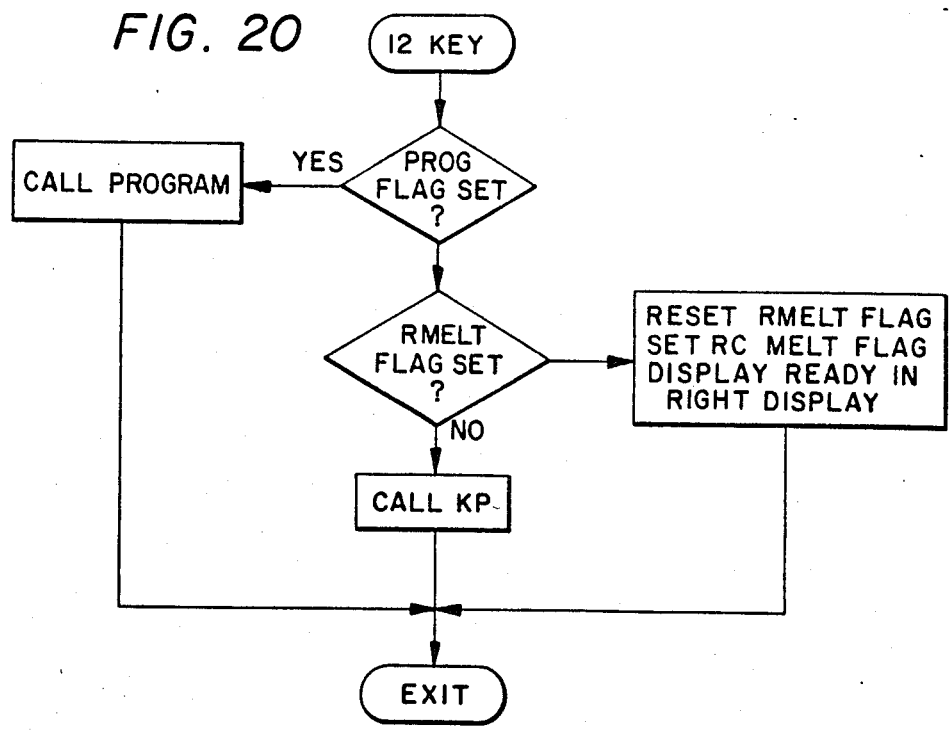
Figure 21:
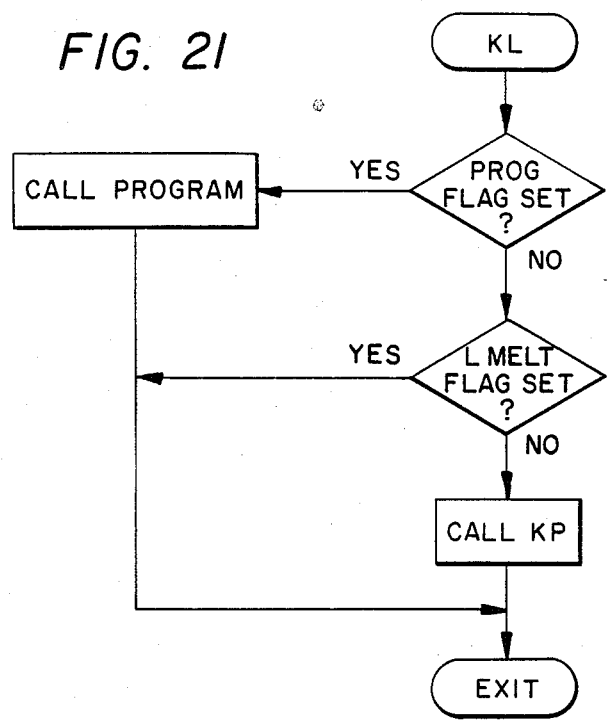
Figure 22:
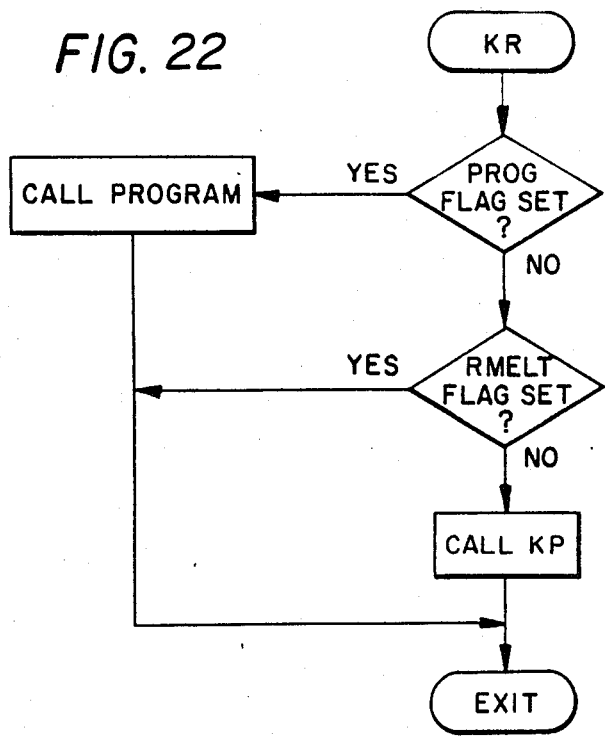
Figure 23:
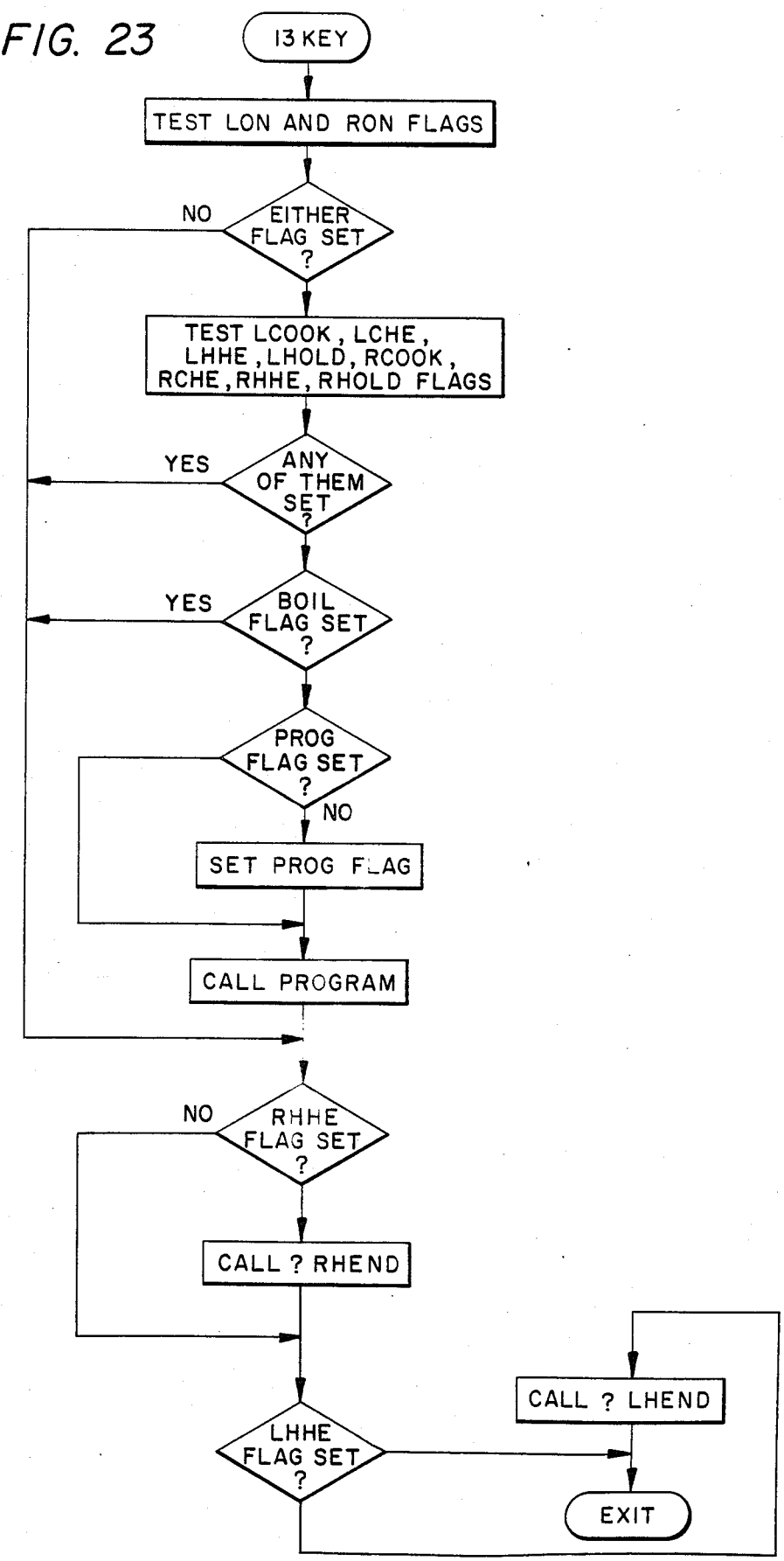
Figure 24:
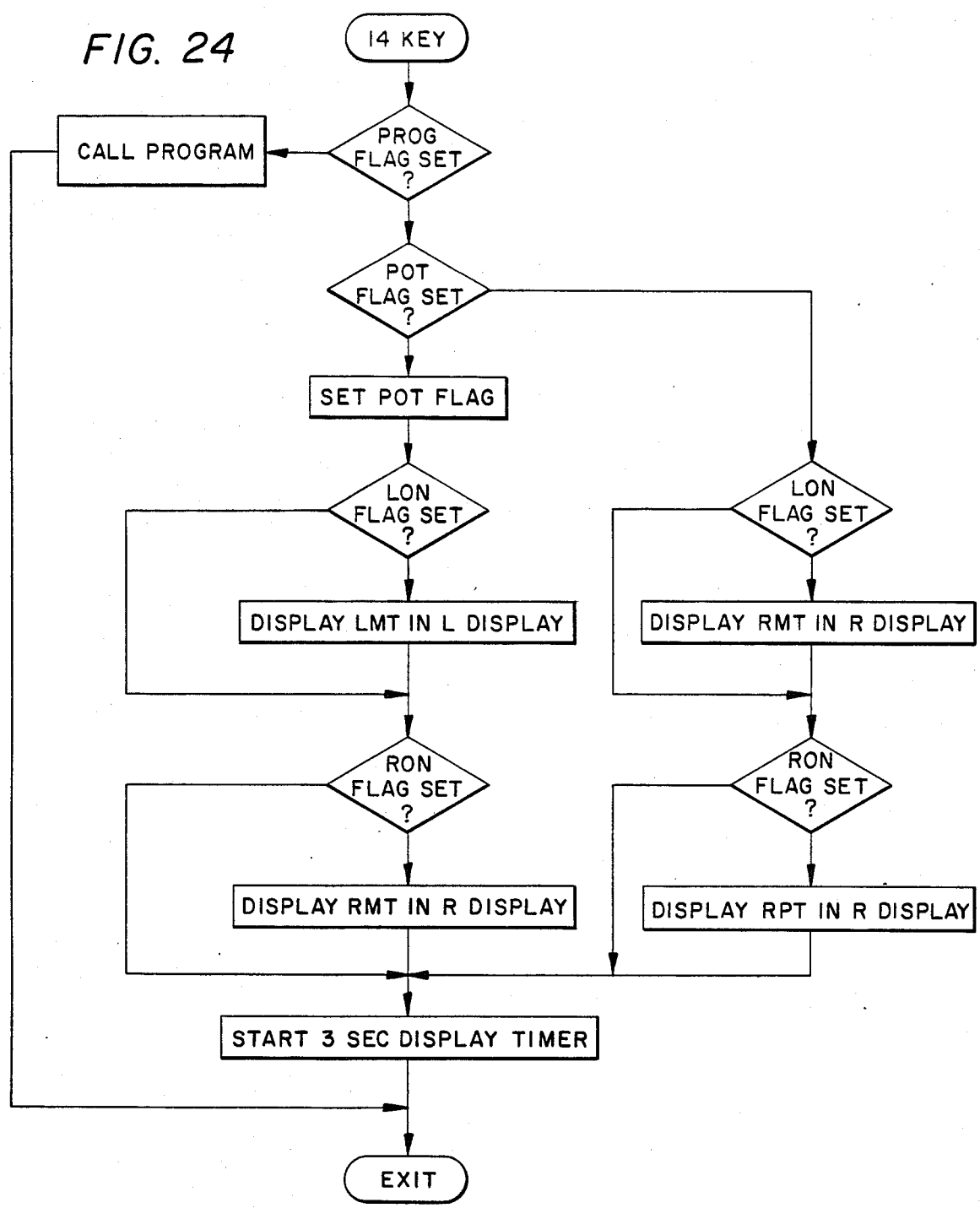
Figure 25:
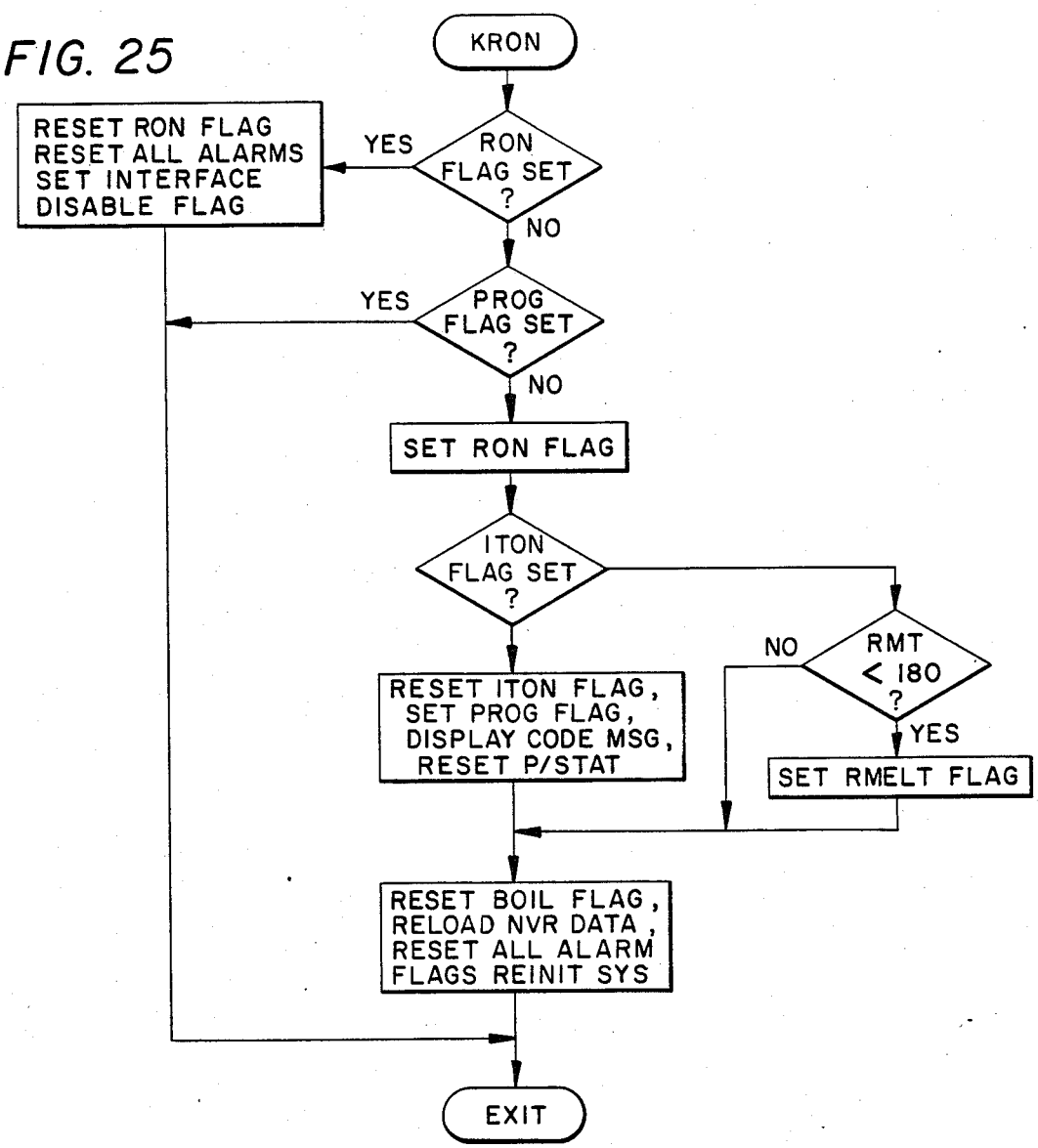
Figure 26:
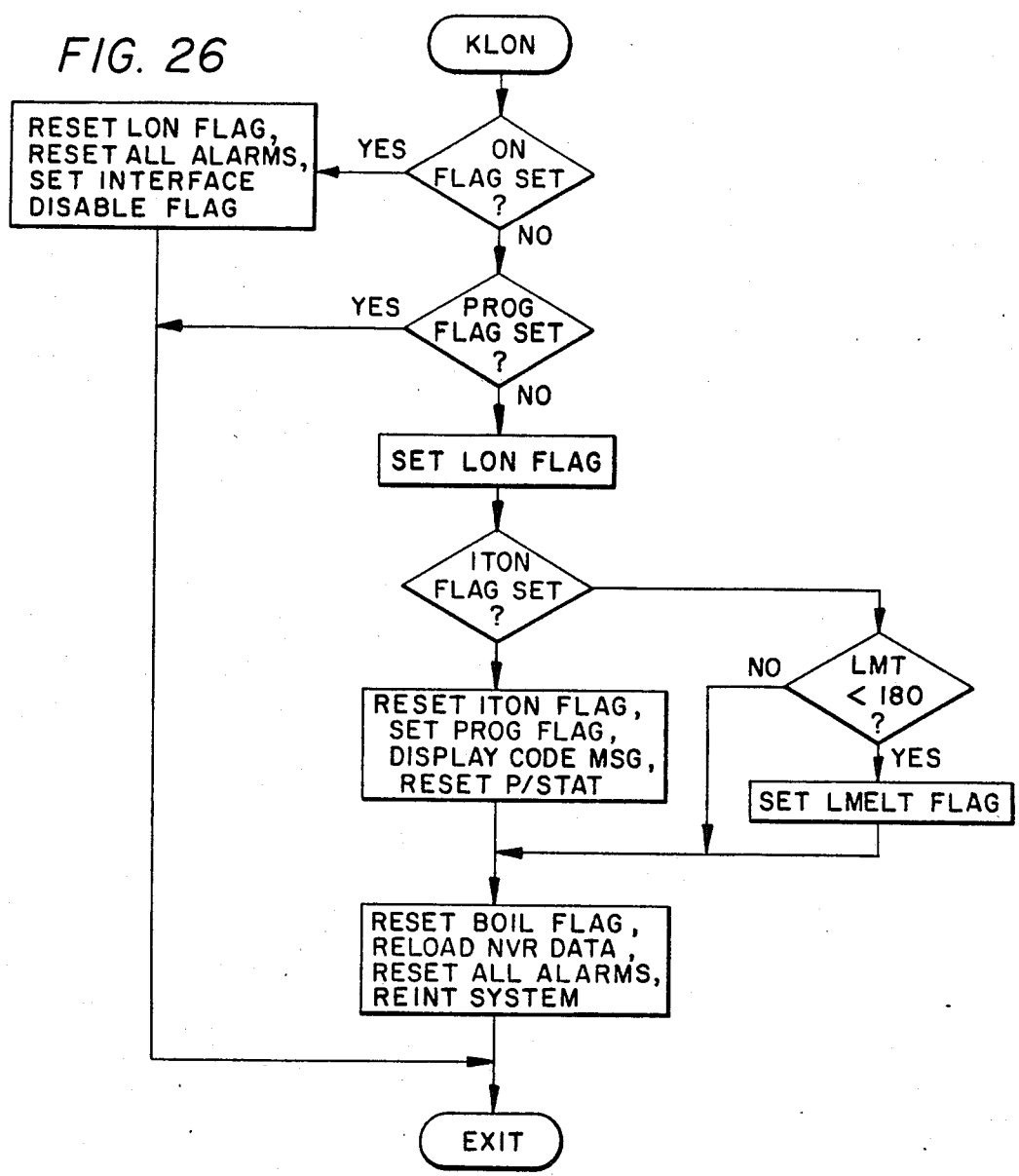
Figure 27:
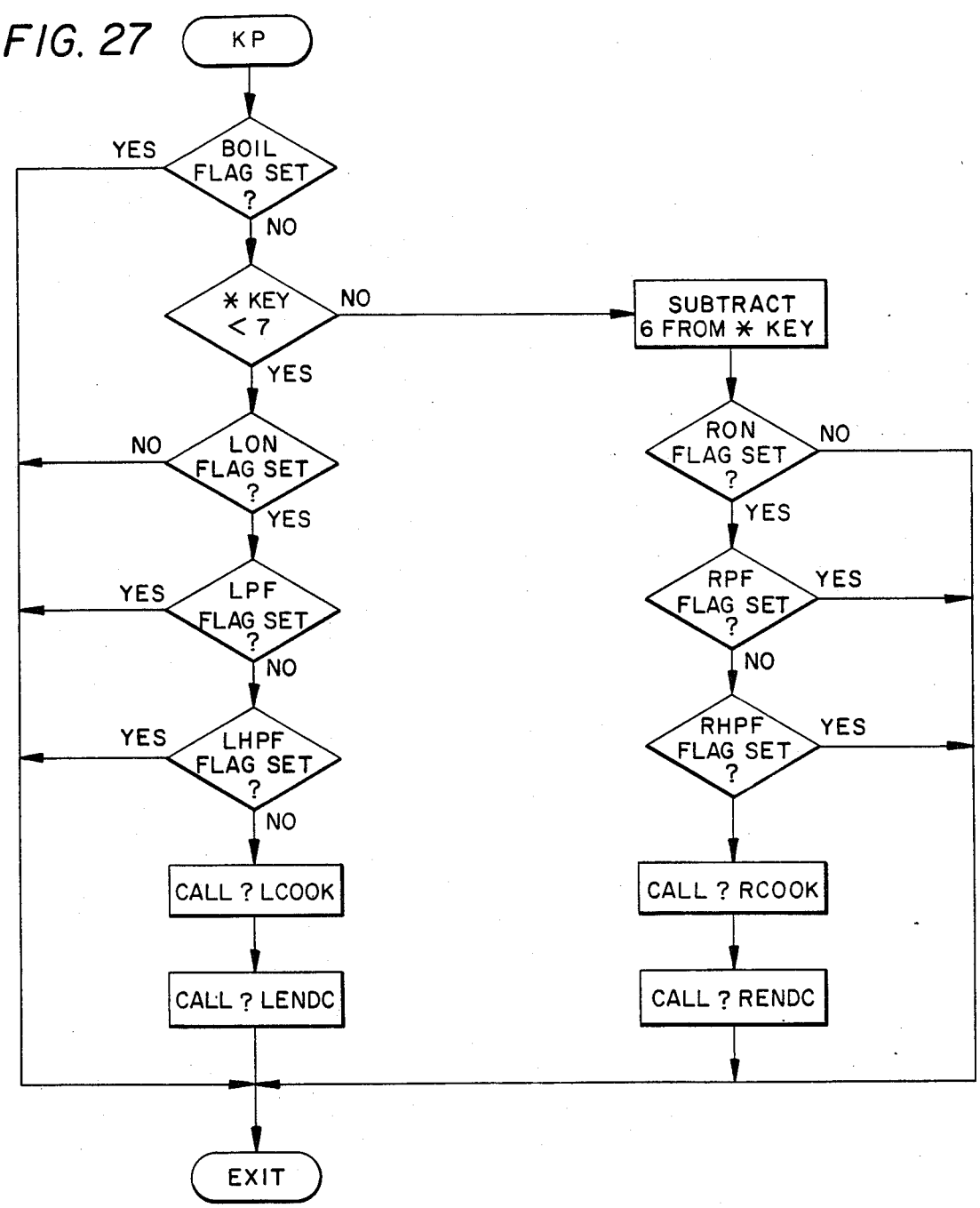
Figure 28:
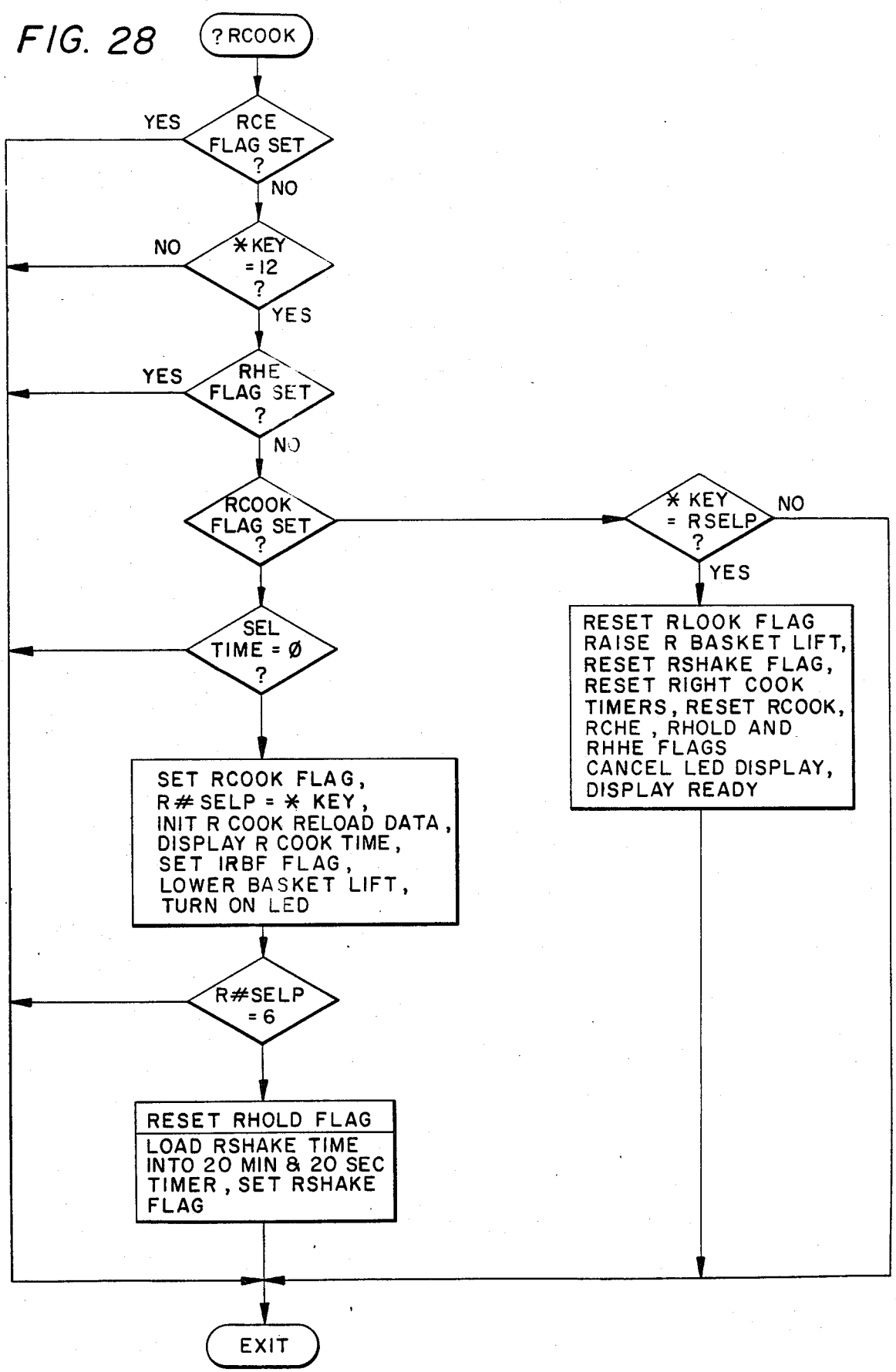
Figure 29:
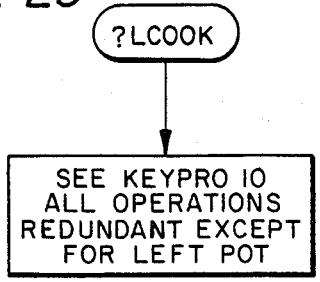
Figure 30:
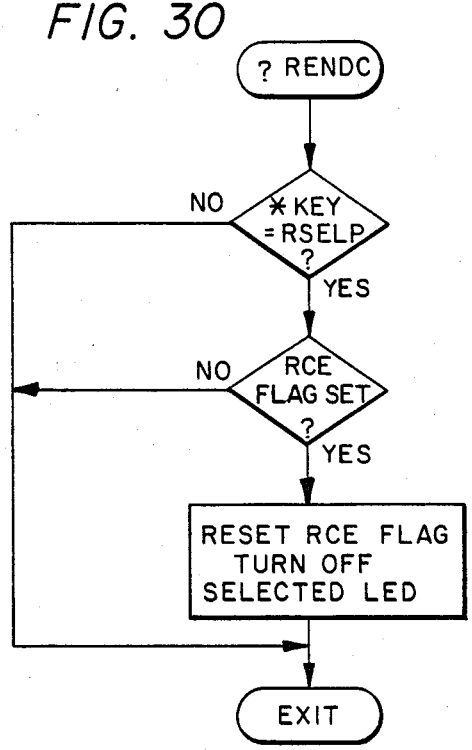
Figure 31:
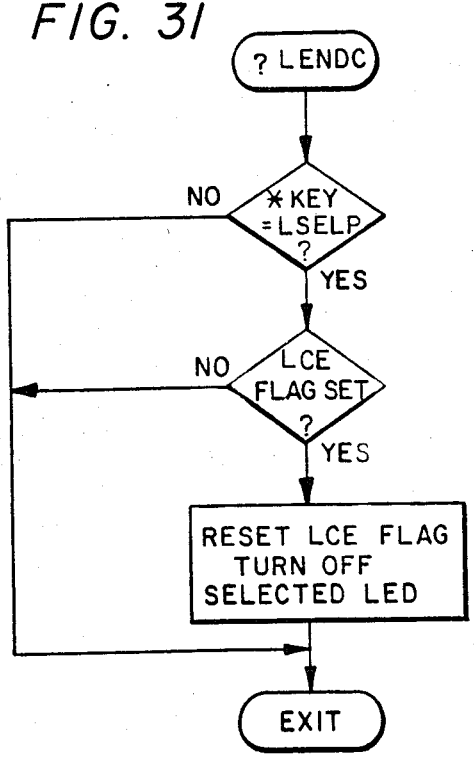
Figure 32:
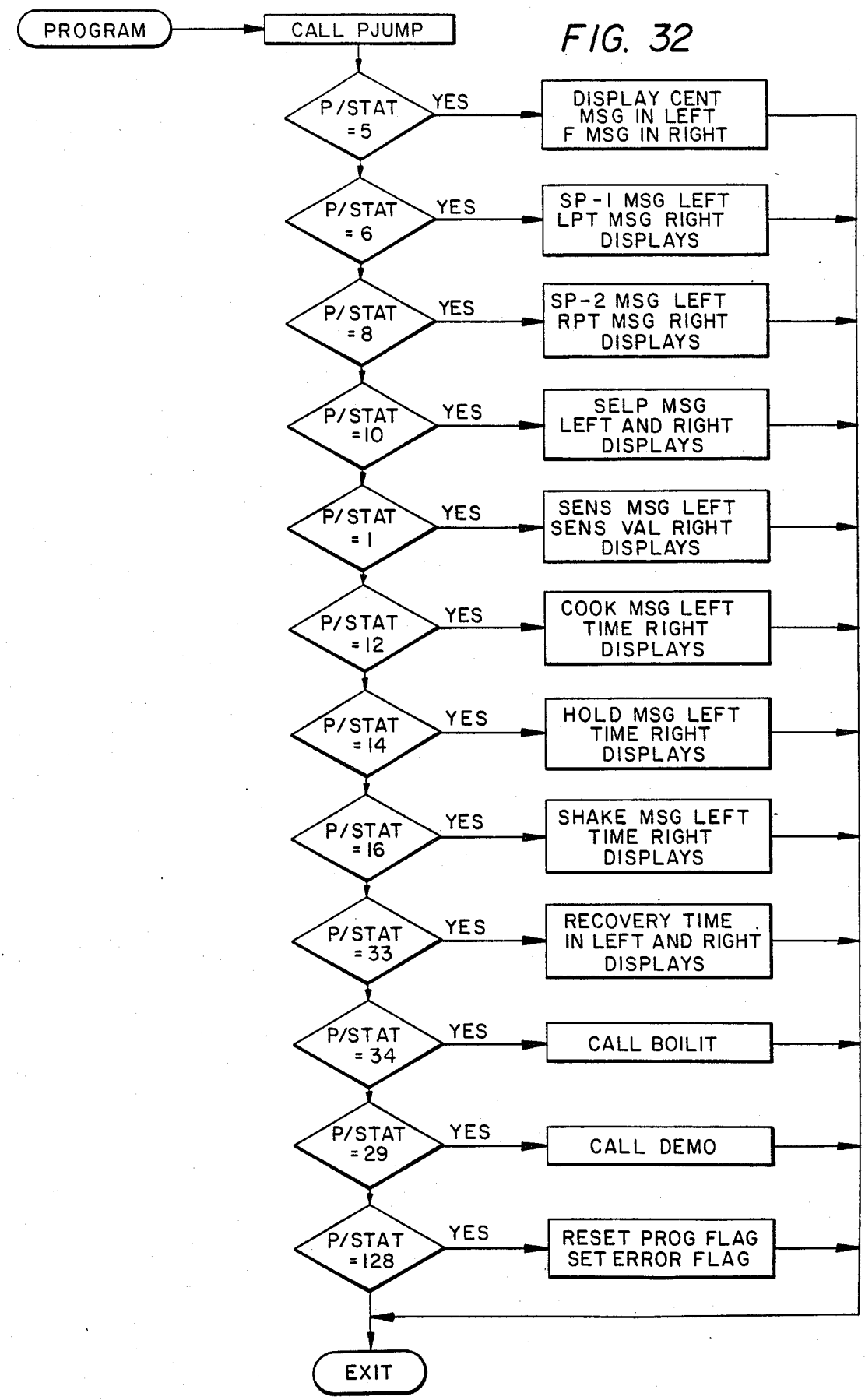
Figure 33:
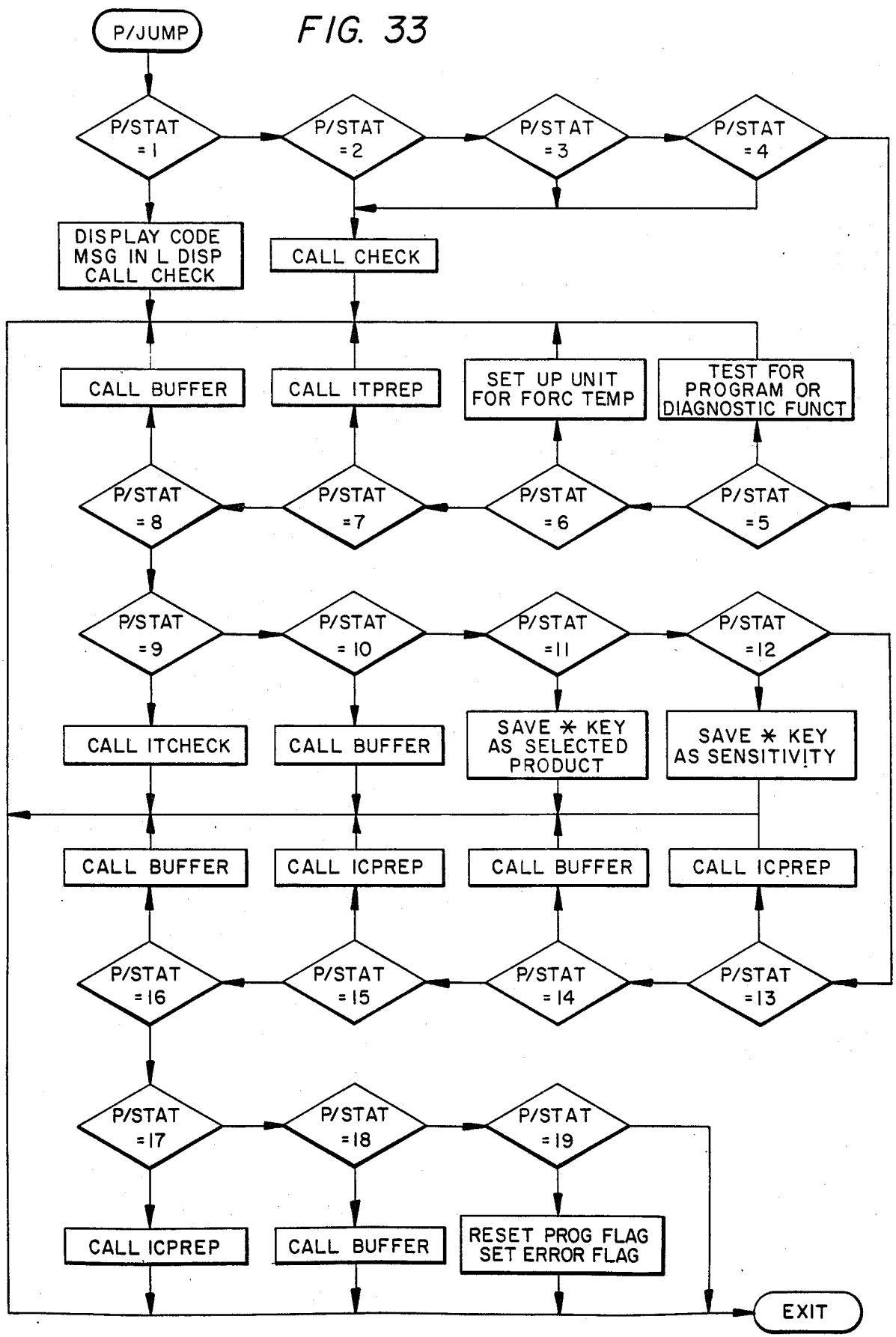
Figure 34:
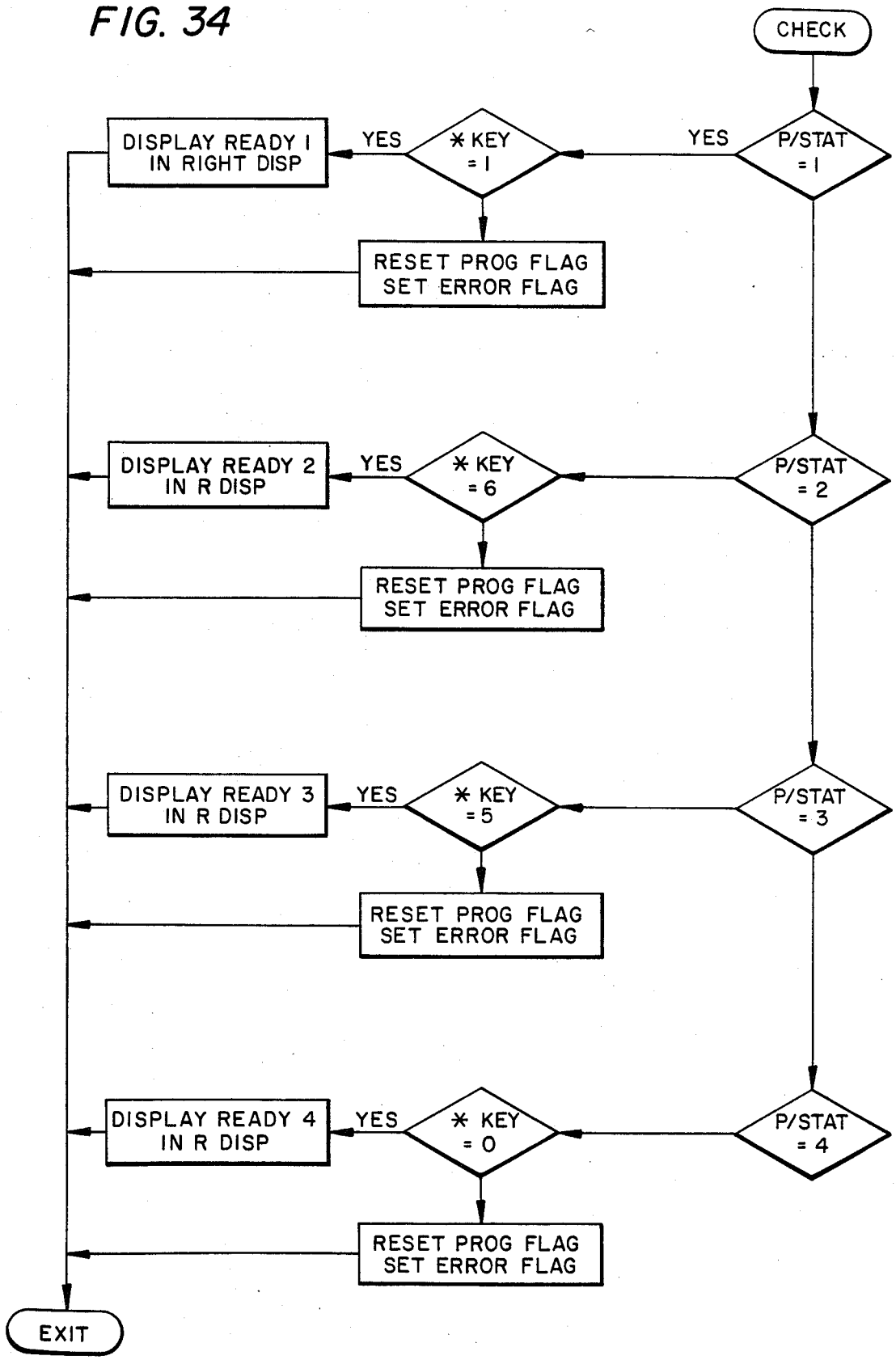
Figure 35:
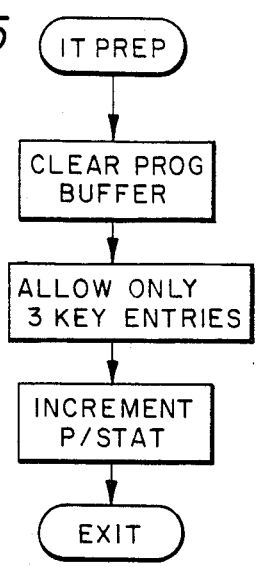
Figure 36:
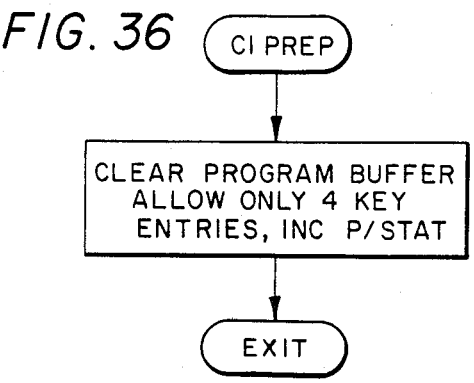
Figure 37:
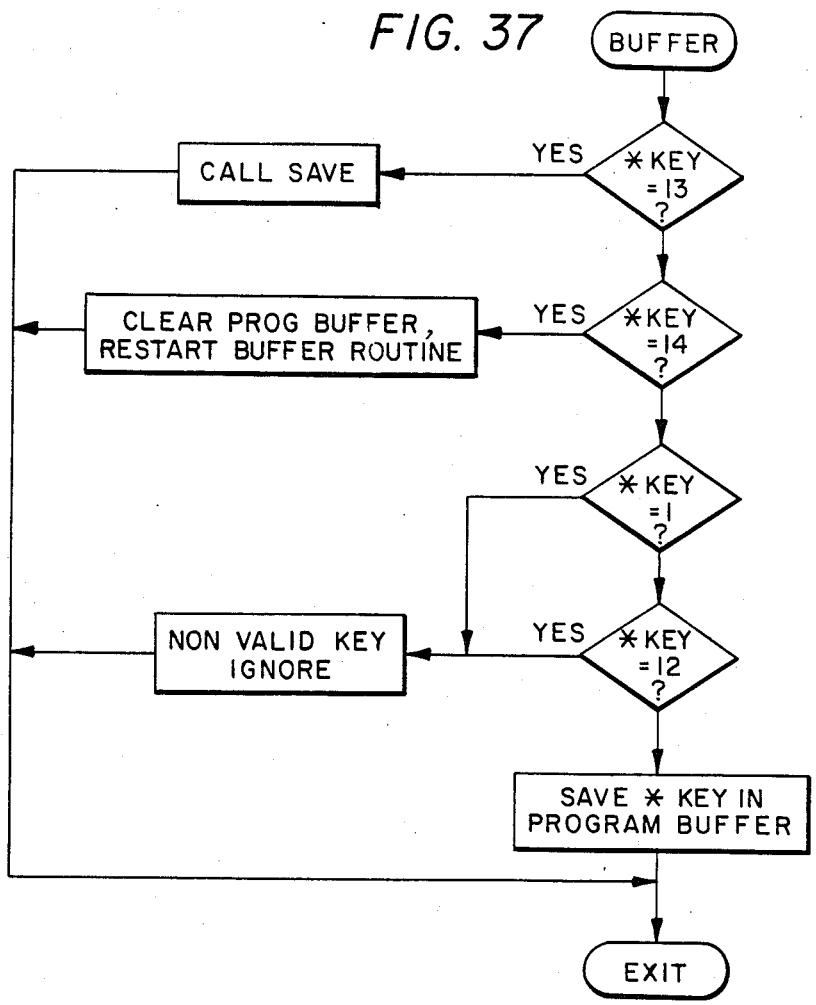
Figure 38:
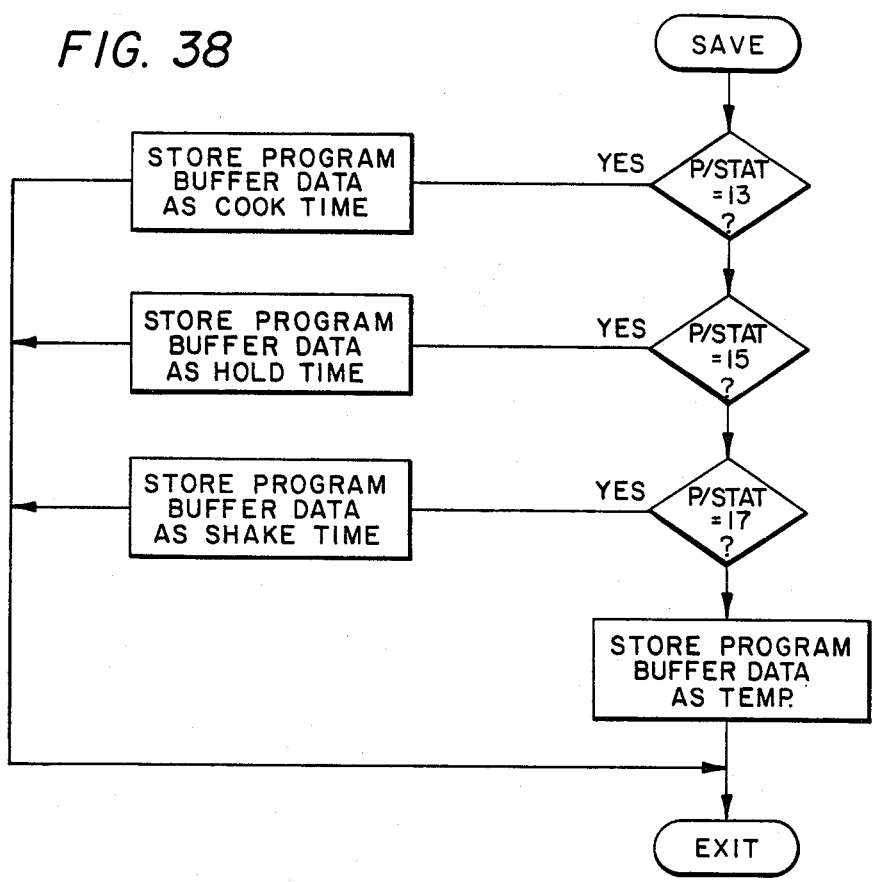
Figure 39:
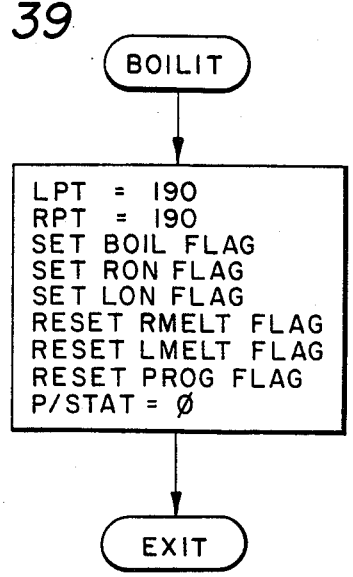
Figure 40:
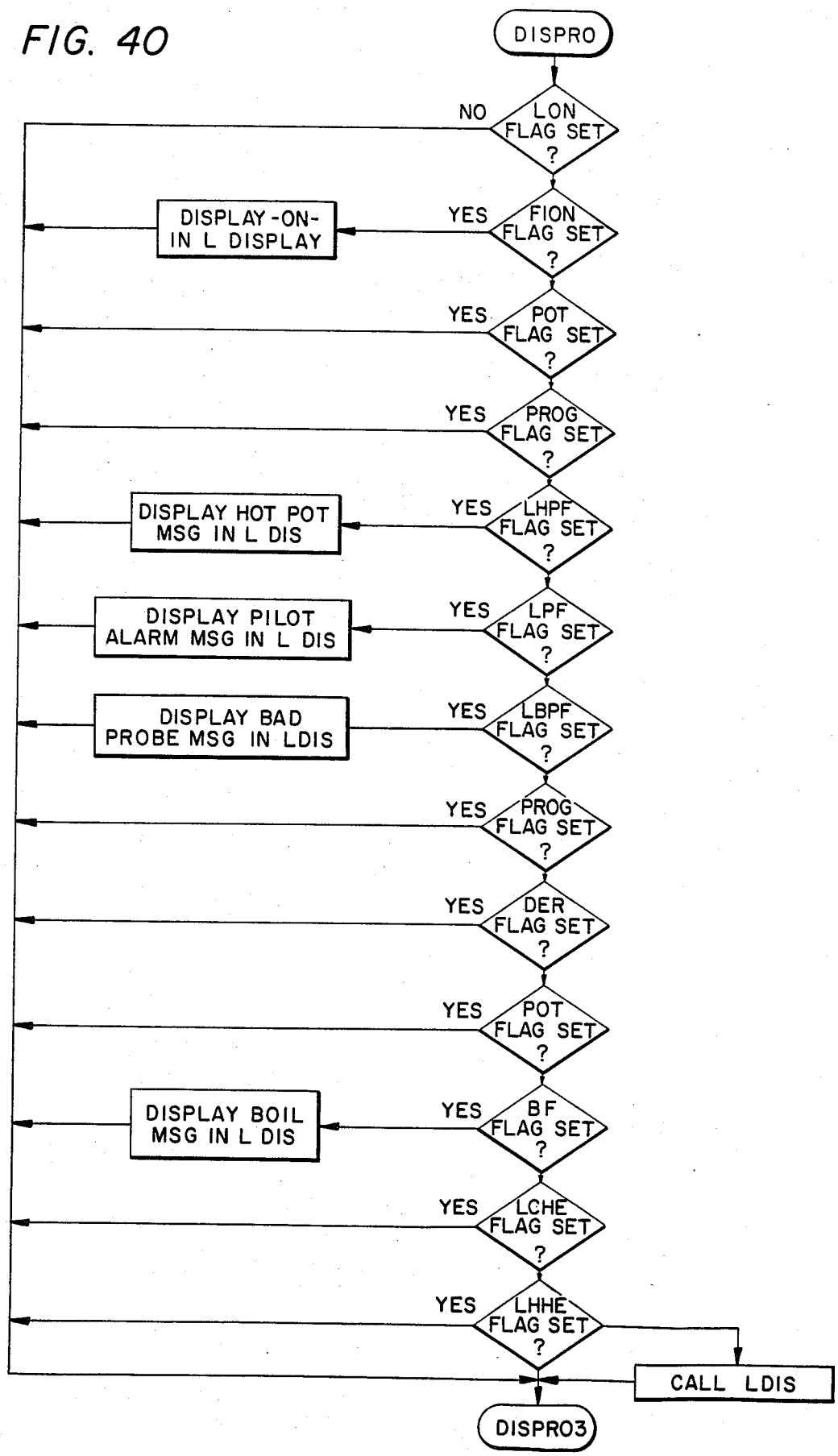
FIGS. 40 through 45 are flow charts for the operator display program.
Figure 41:
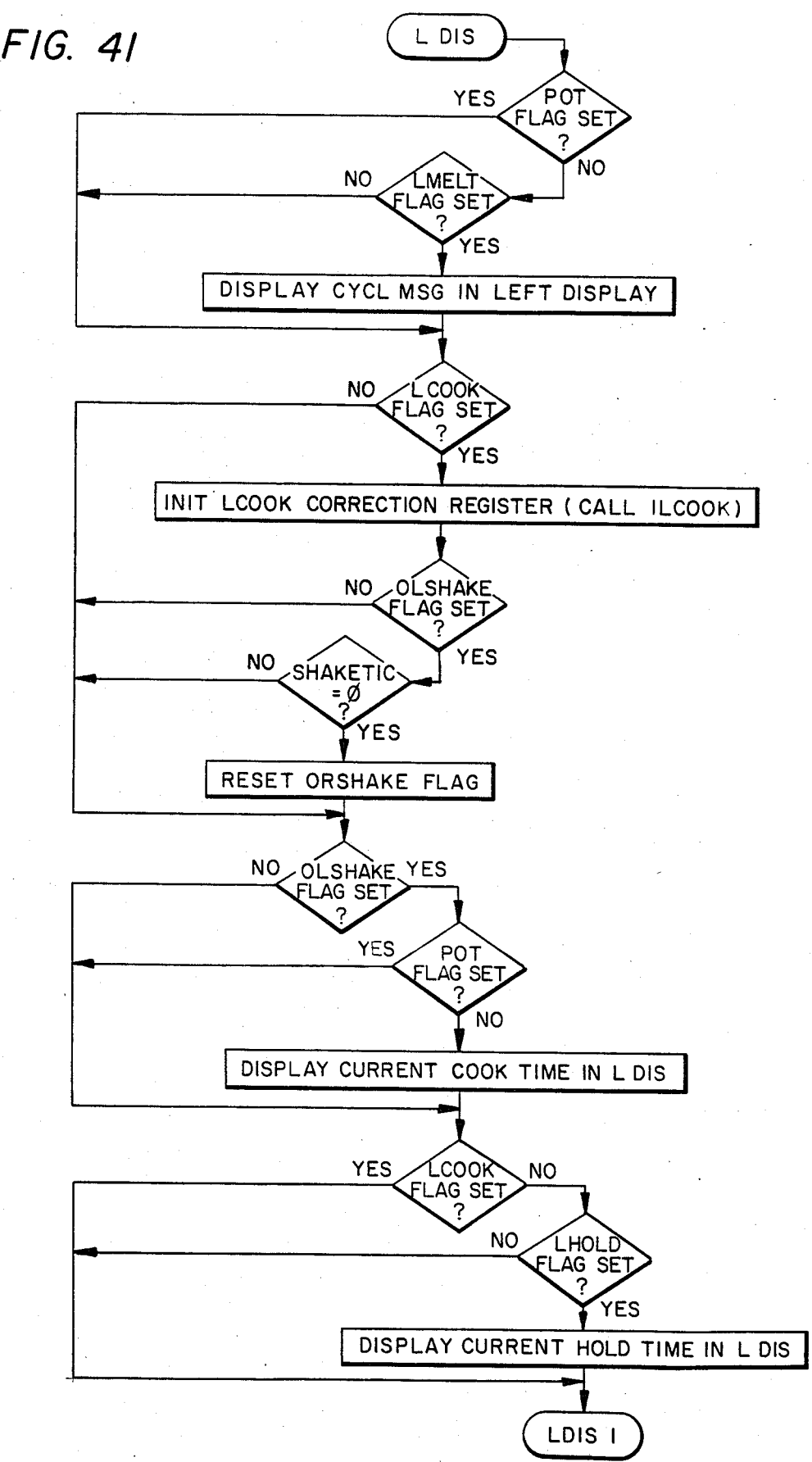
Figure 42:
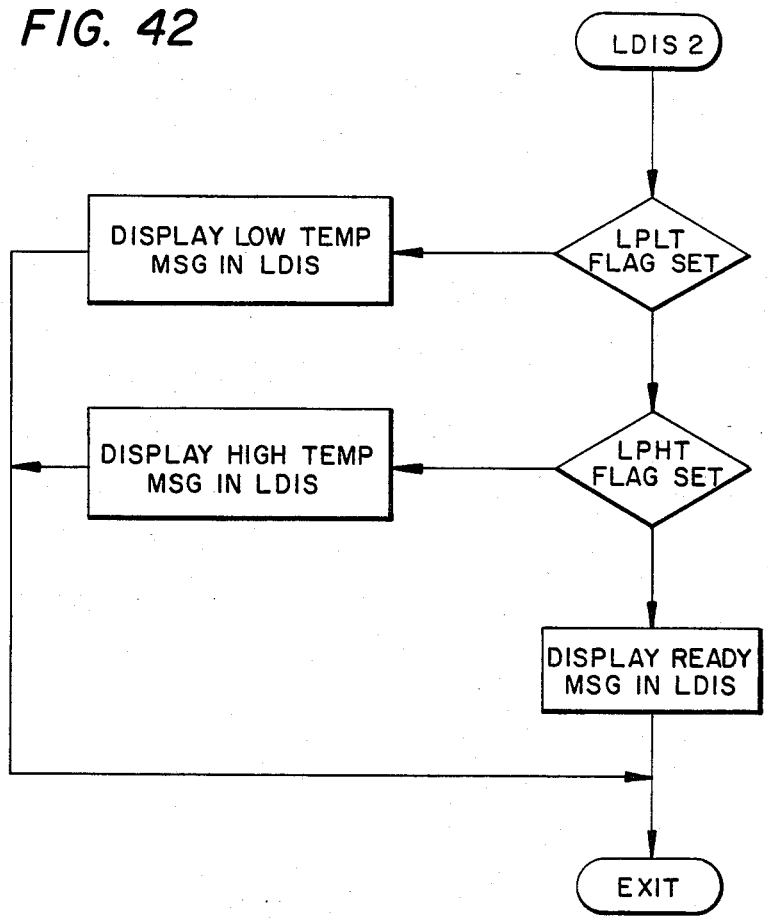
Figure 43:
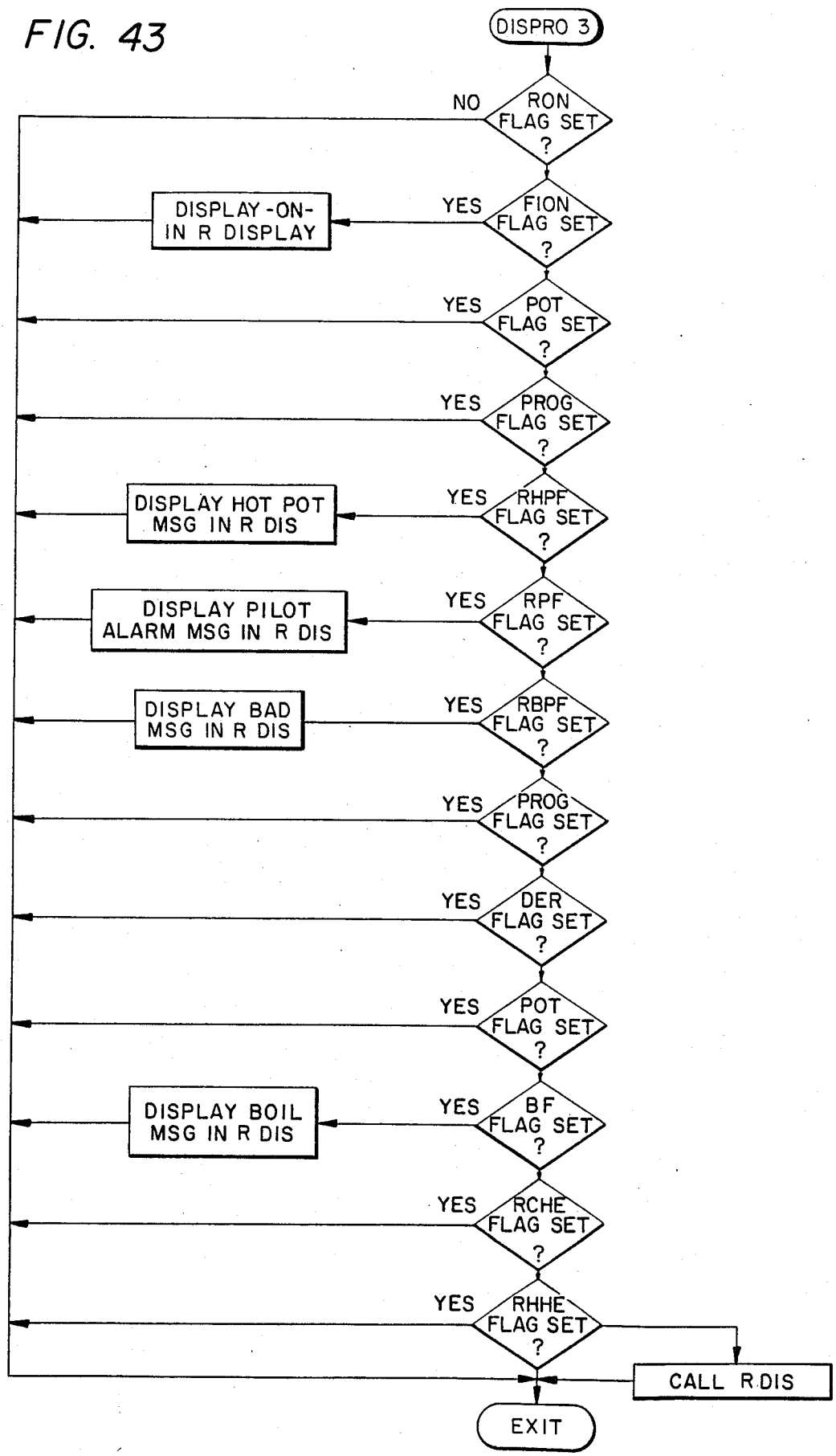
Figure 44:
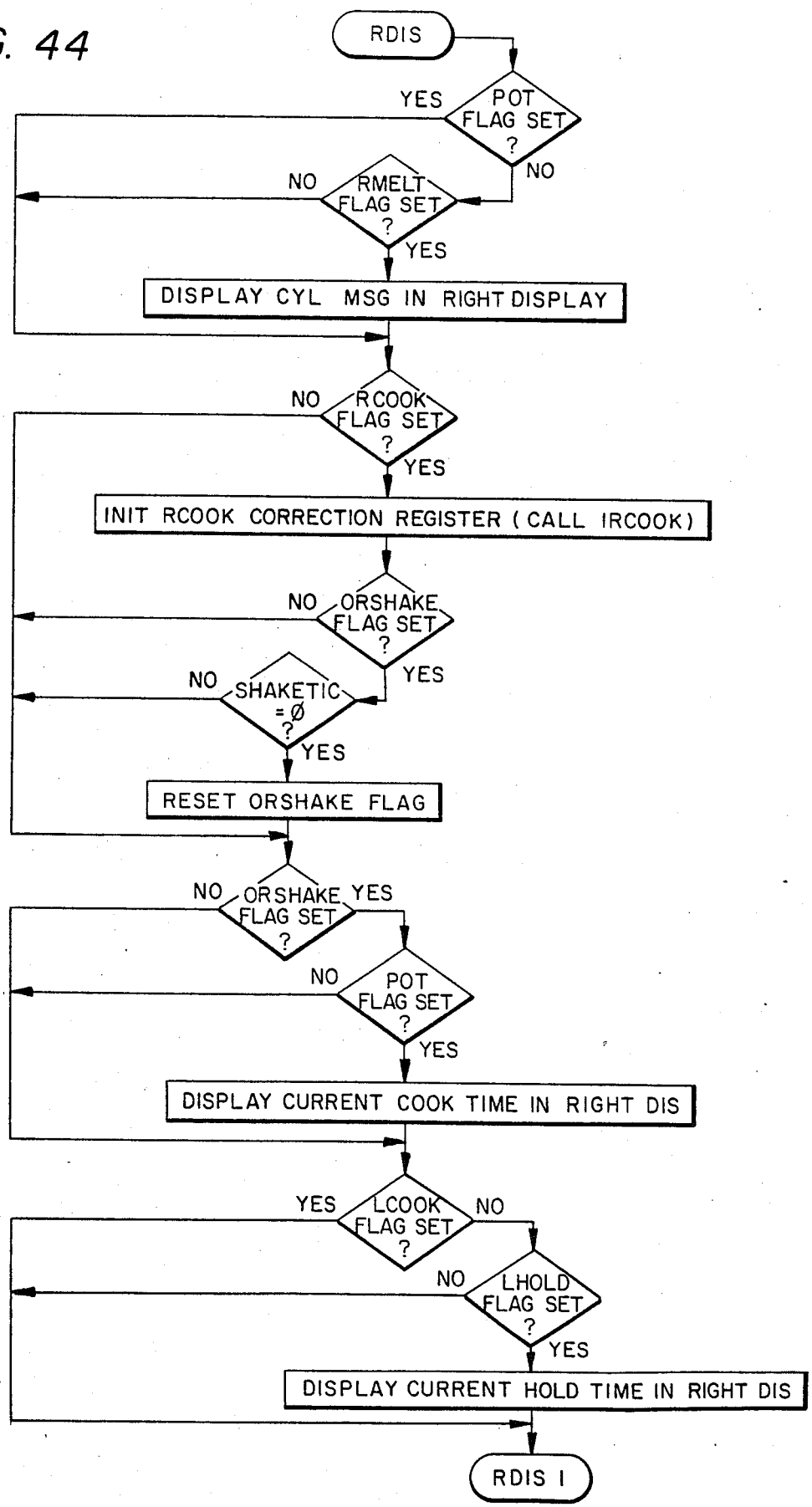
Figure 45:
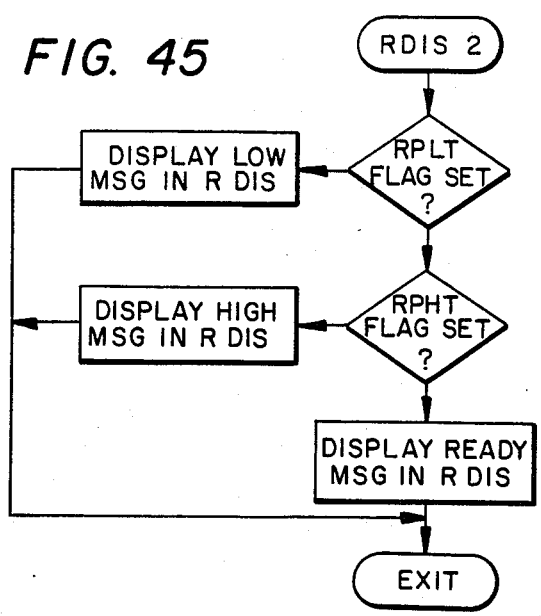
Figure 46:
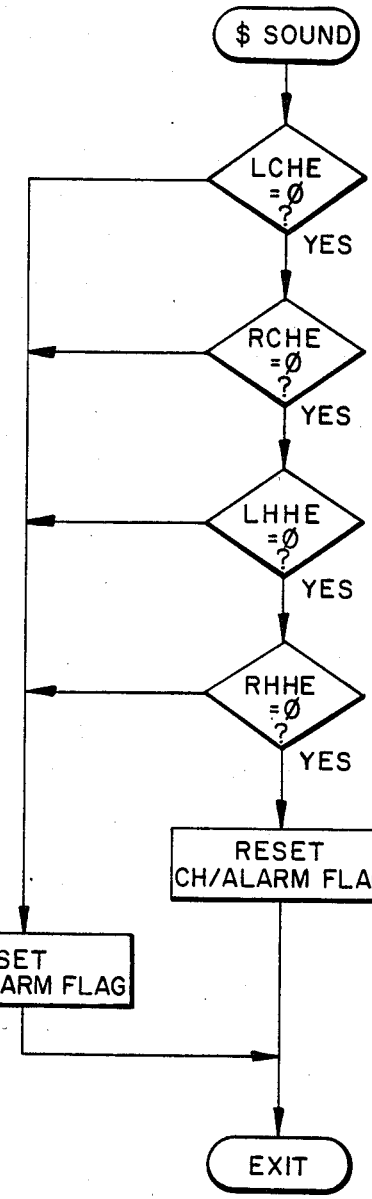
FIG. 46 is a flow chart of the sound generation routine.
Figure 47:
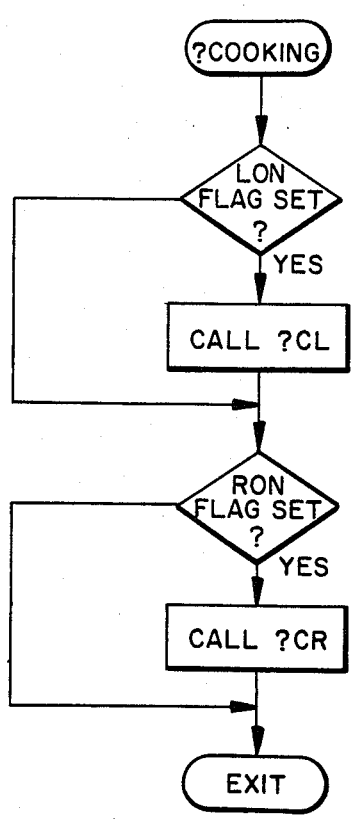
FIGS. 47 through 49 are flow charts for the cooking display routine which includes the display procedures executed during the cooking cycle.
Figure 48:
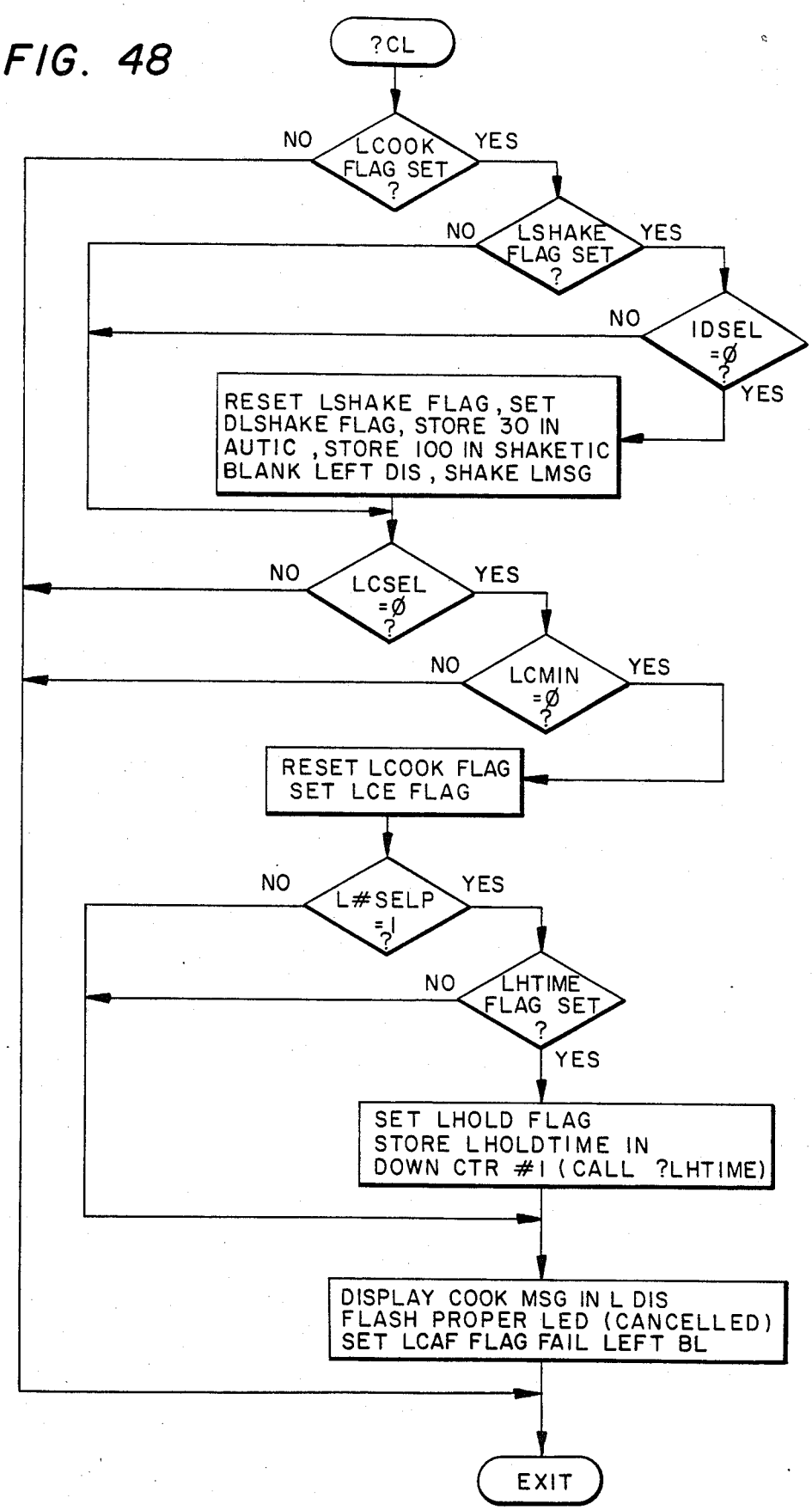
Figure 49:
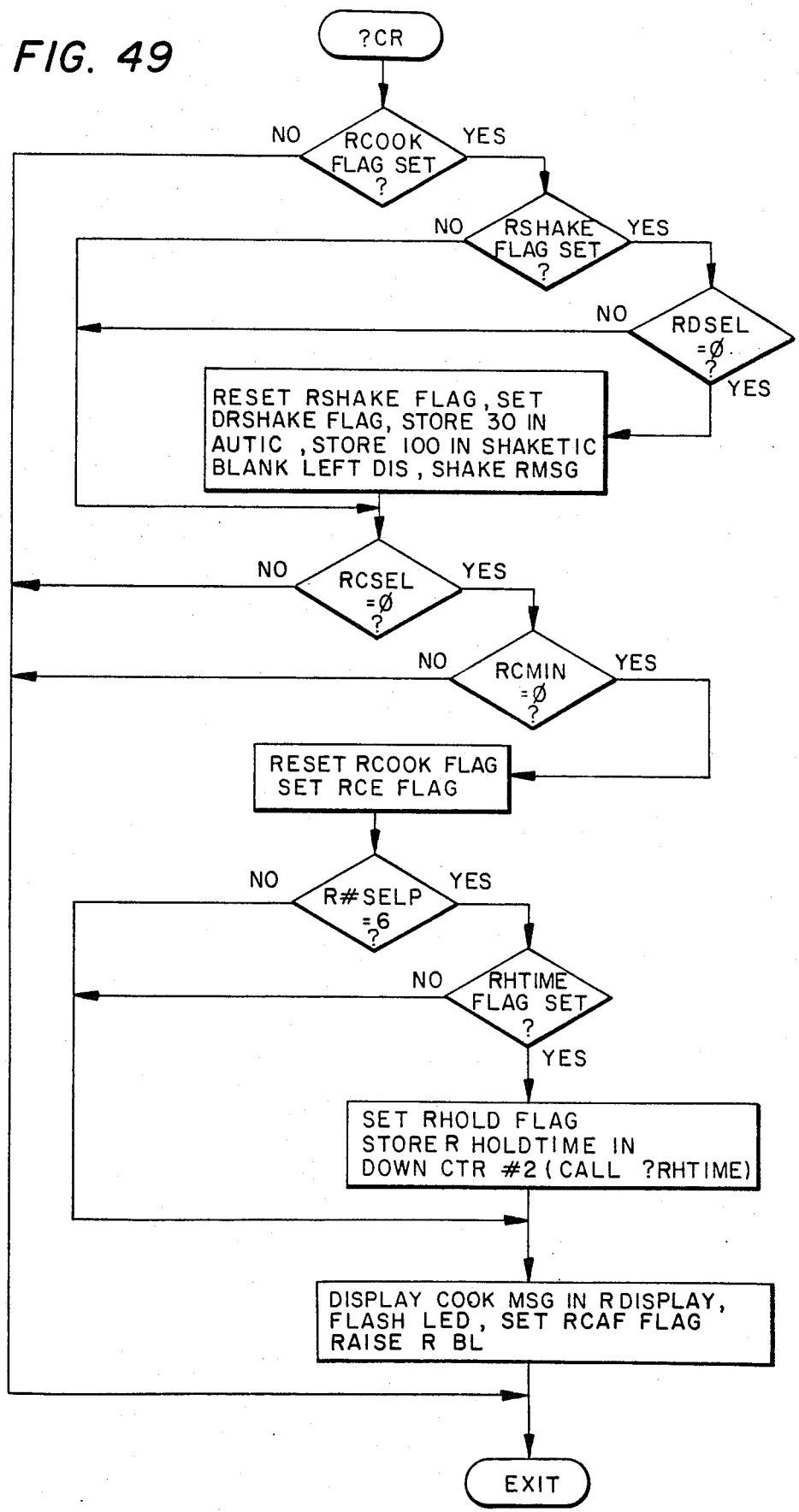
Figure 50:
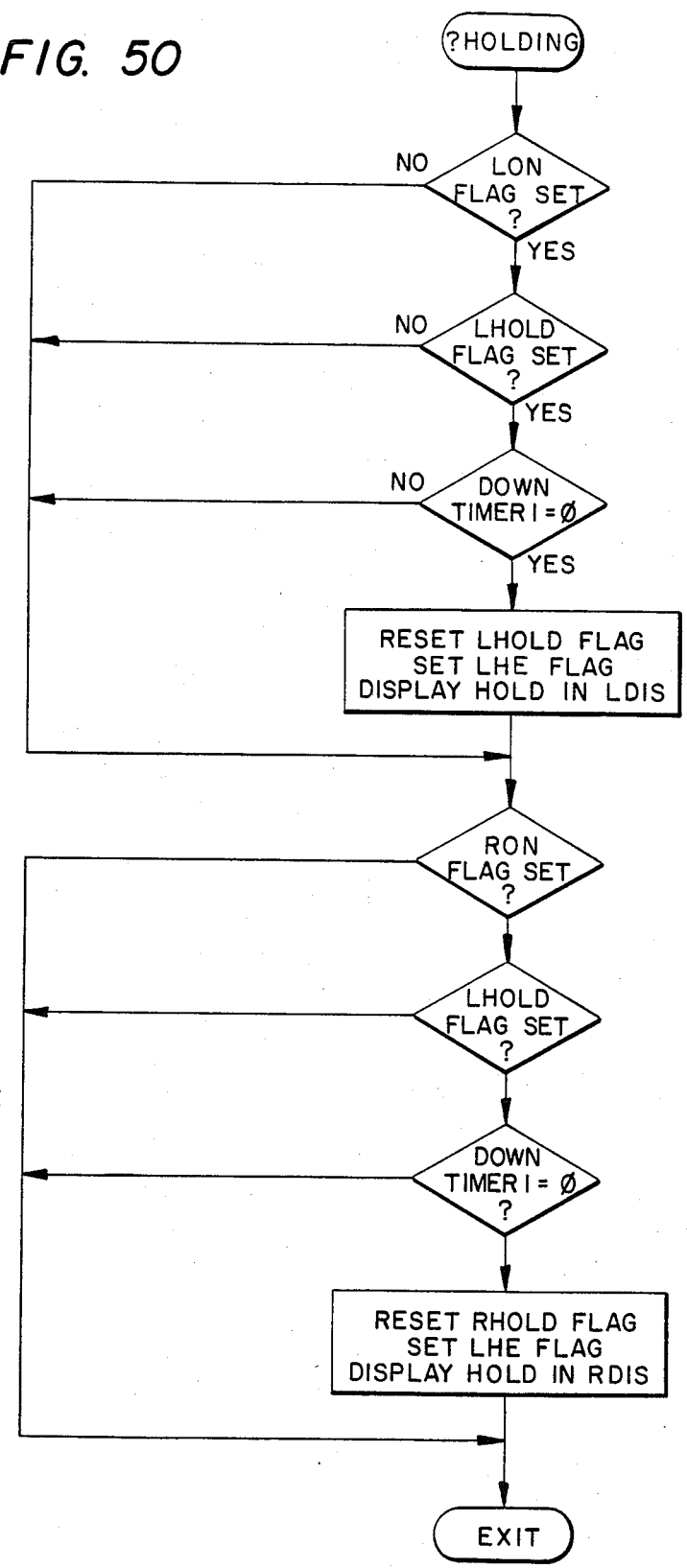
FIG. 50 is a flow chart for the holding routine which includes the display procedures during the holding cycle.
Figure 51:
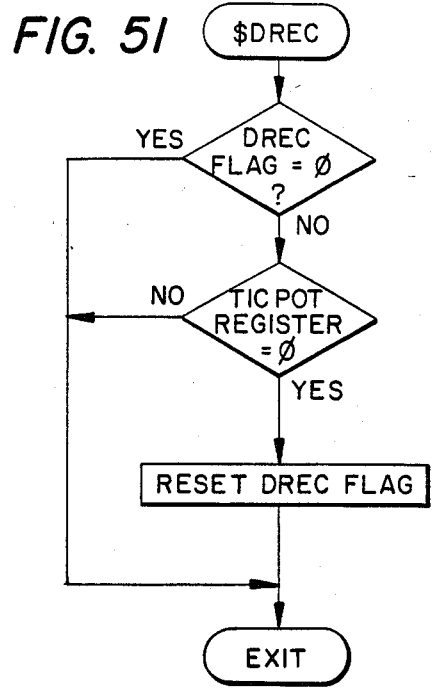
FIG. 51 is a flow chart for the recovery time display procedures routine.
Figure 52:
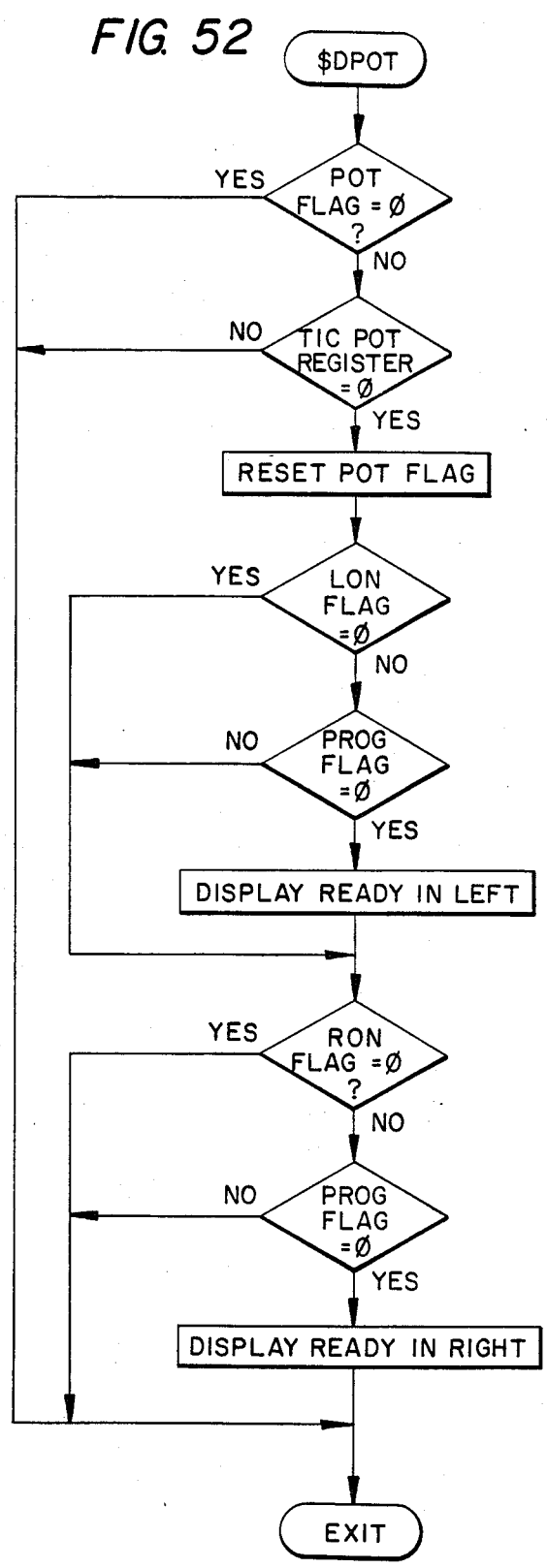
FIG. 52 is a flow chart for a display procedure routine for displaying the program temperature and the measured temperature.
Figure 53:
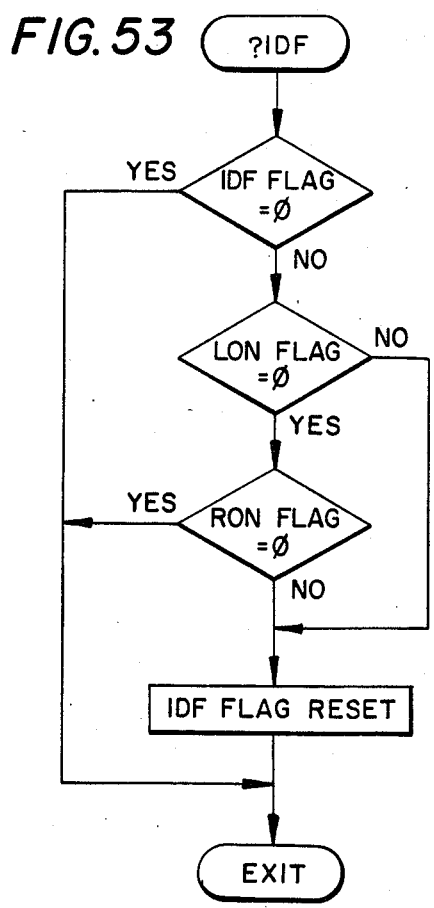
FIG. 53 is a flow chart for the interface board disable procedure routine.
Figure 54:
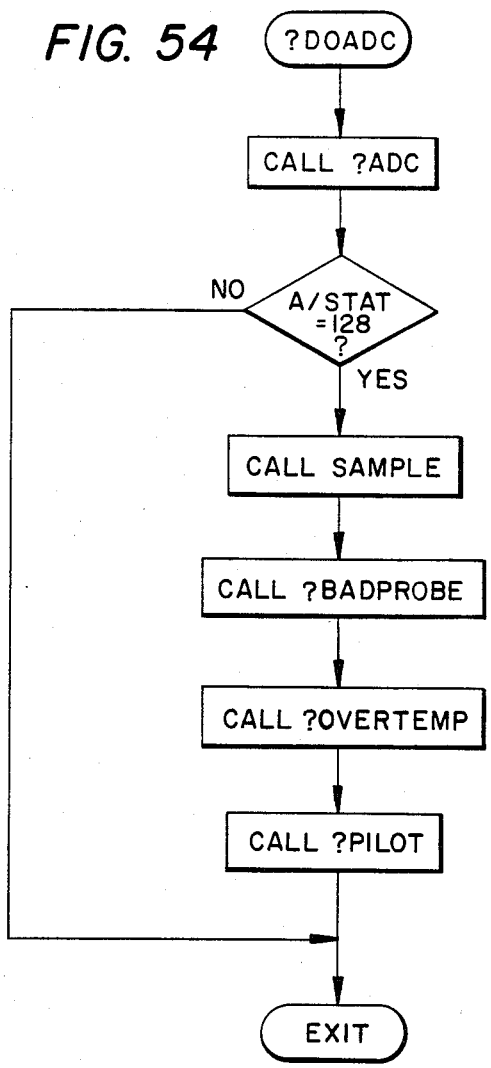
FIGS. 54 through 59 are flow charts for the analog/digital (A/O) conversion procedures routine that include the task of sampling the A/D converters, testing for a bad probe, testing for over temperature and testing for the existence of the pilot alarm.
Figure 55:
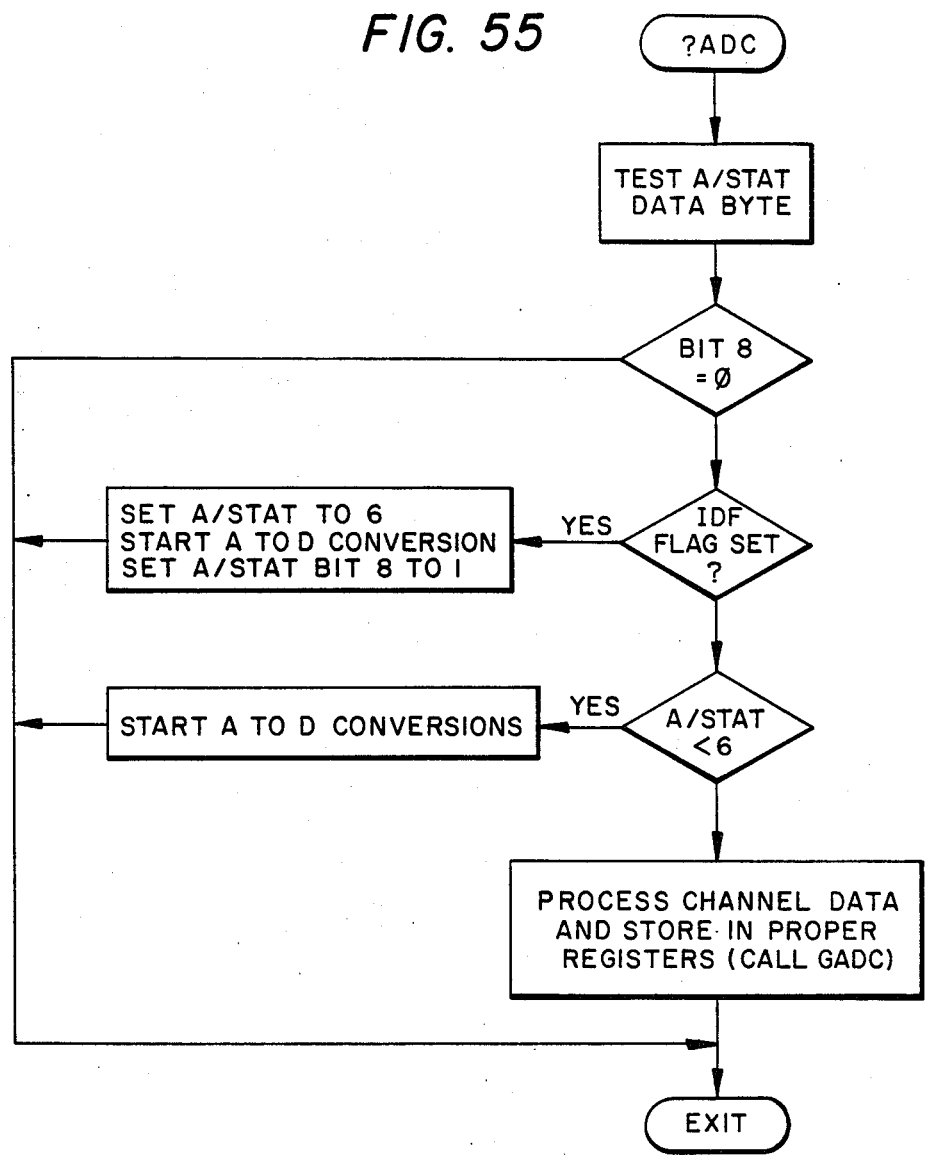
Figure 56:
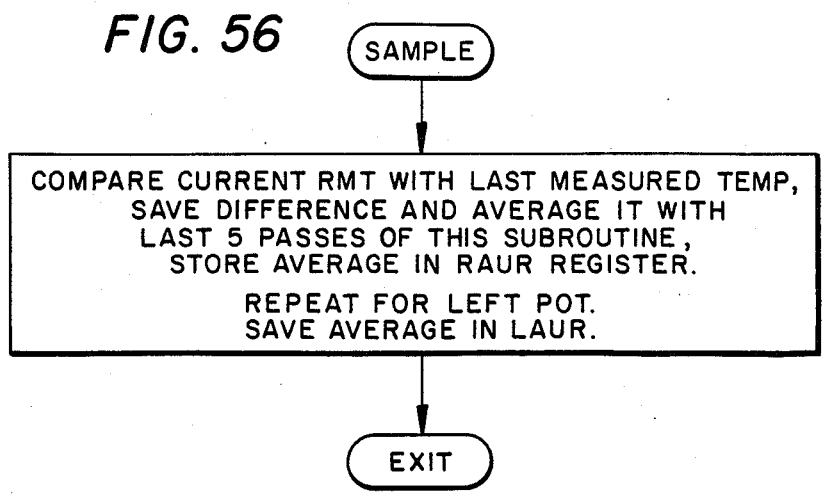
Figure 57:
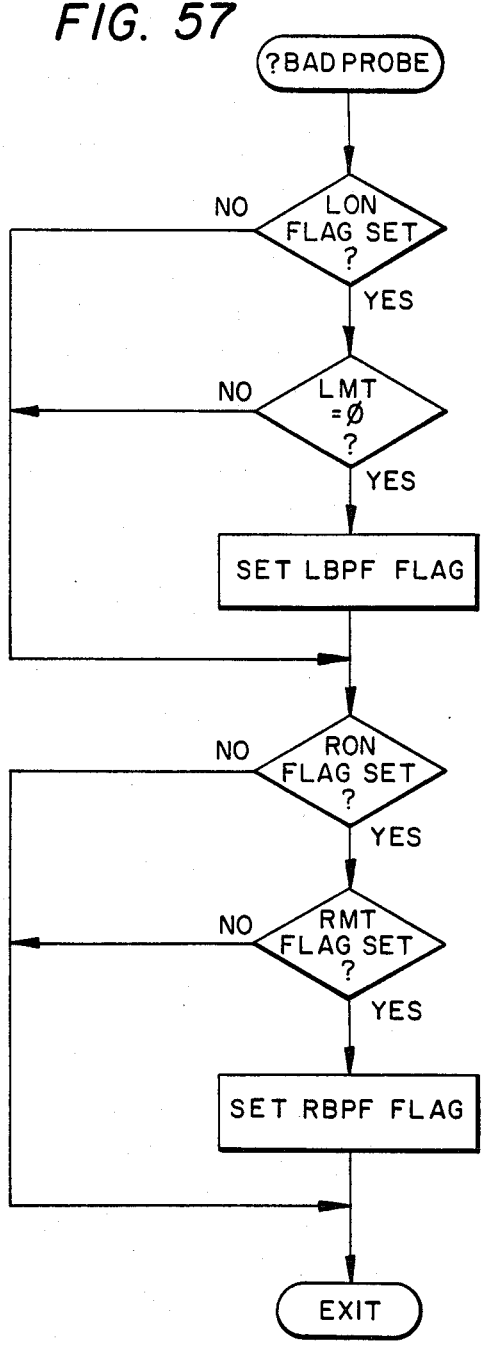
Figure 58:
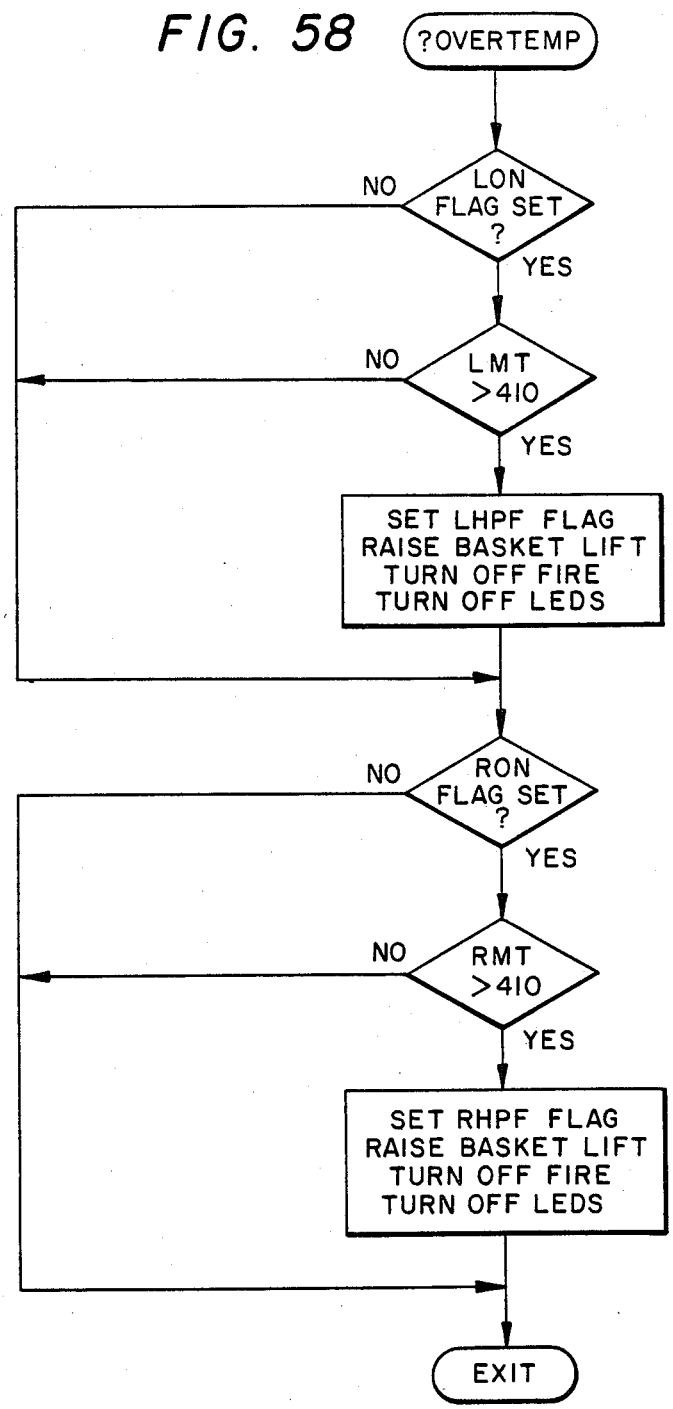
Figure 59:
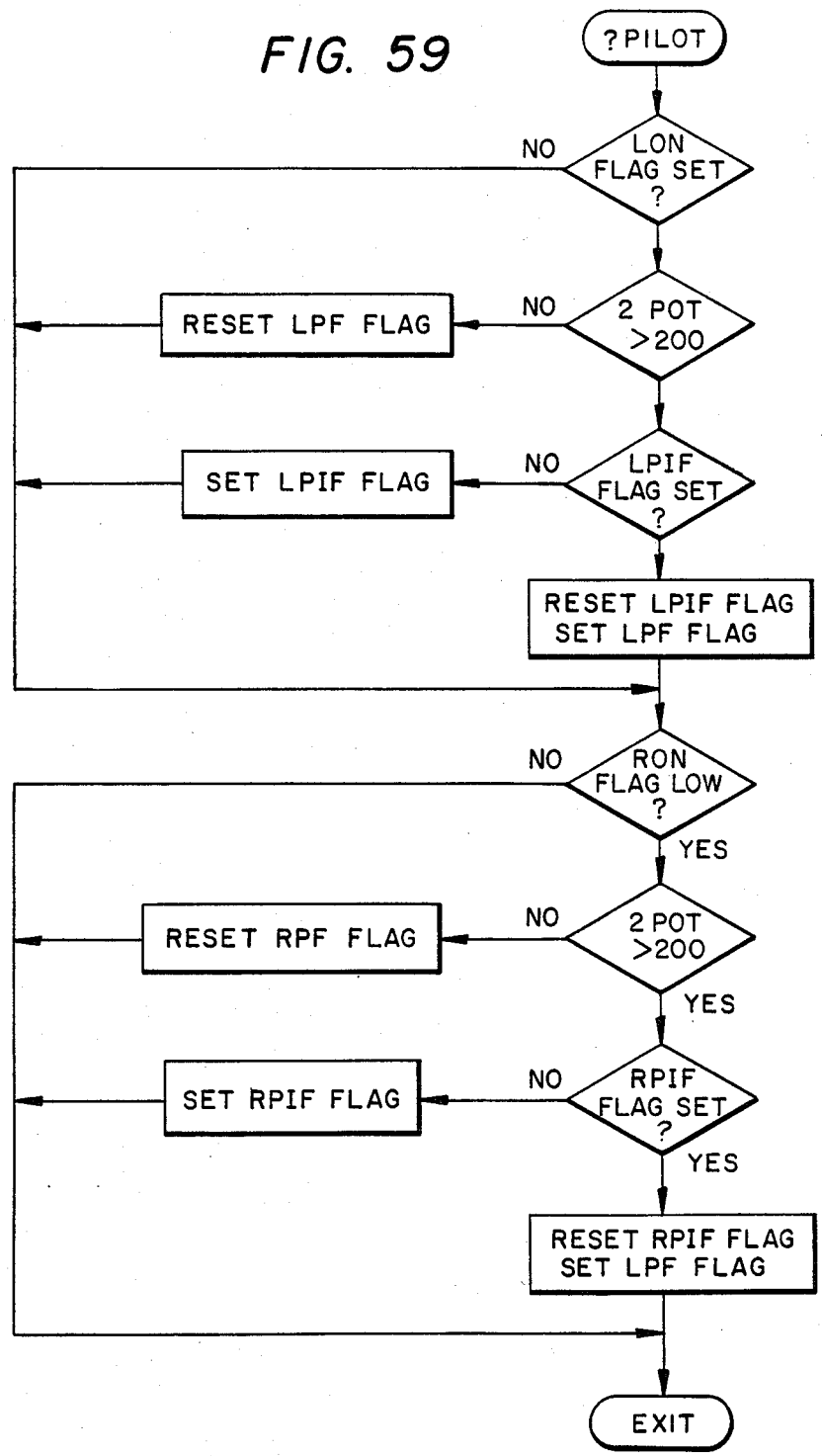
Figure 60:
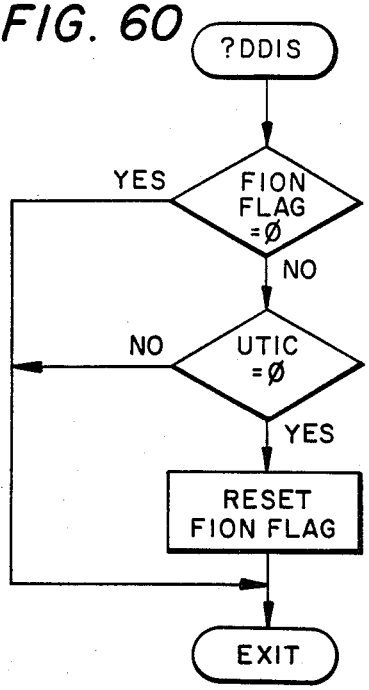
FIG. 60 is a flow chart for a delay routine.
Figure 75:
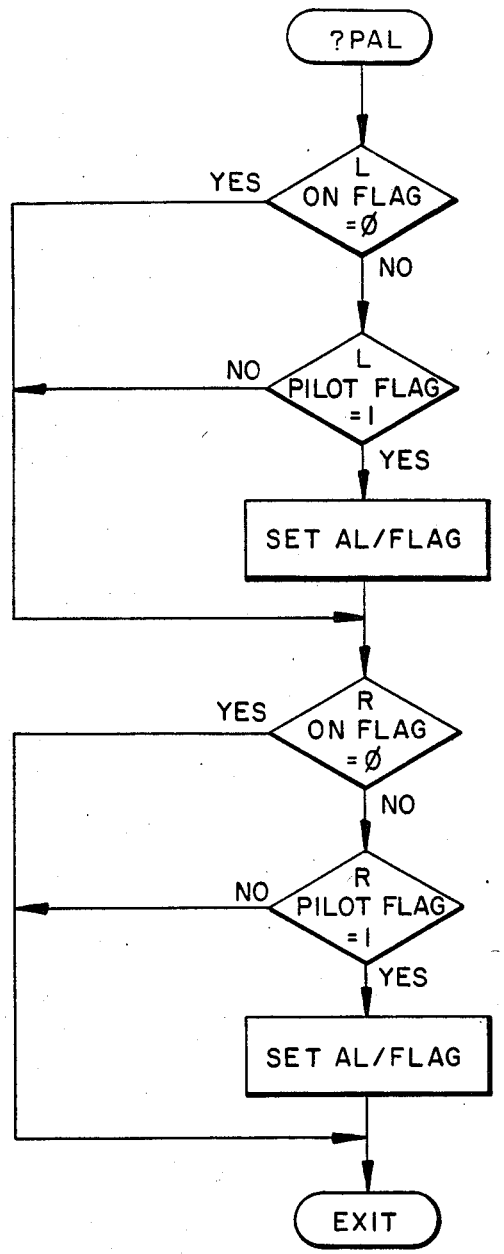
FIG. 75 is a flow chart for a procedure that sounds the alarm when the pilot is not fired.
Figure 76:
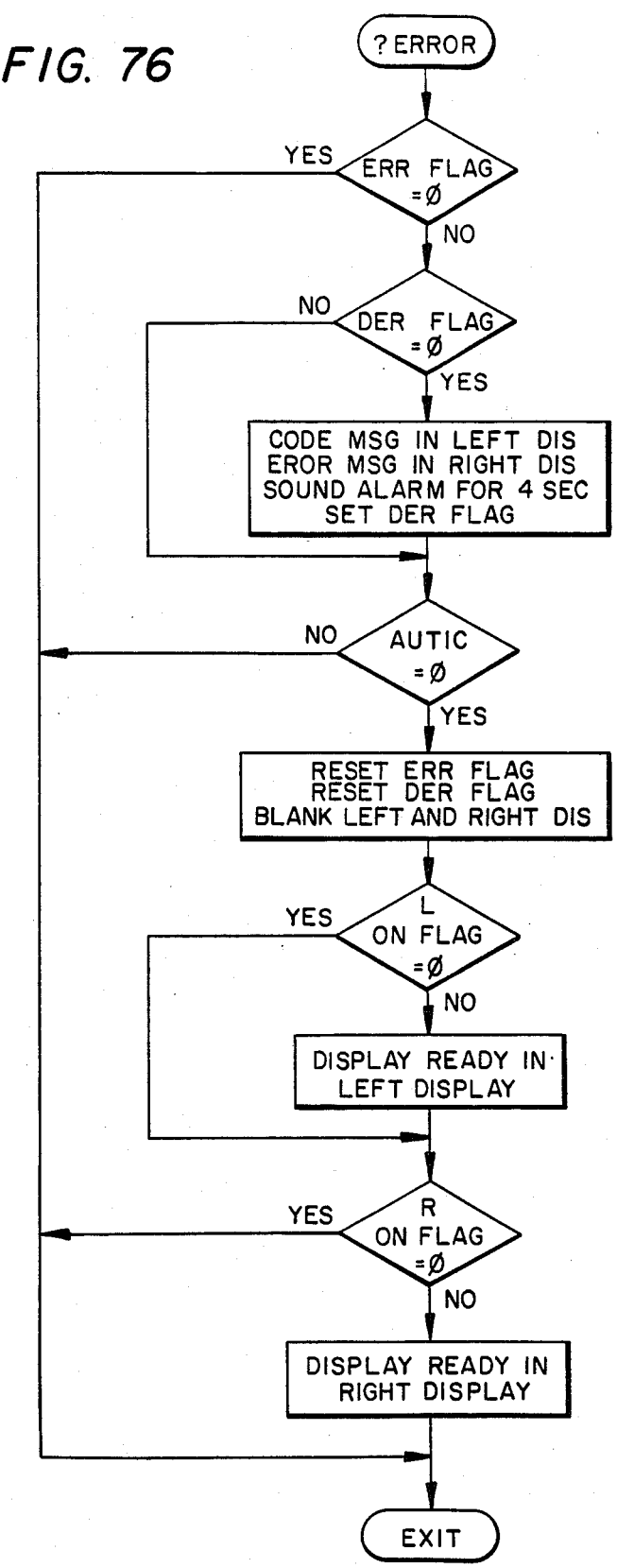

FIGS. 15 through 75 are flow charts for the system software that is contained in Appendix A. FIG. 15 is a flow chart for the power up and initialization routine. FIG. 16 is a flow chart of the Magic routine that is the principle executive operational routine. FIG. 17 is an initialization routine for the Magic executive routine. FIGS. 18 through 39 are flow charts for the keyboard processing routines. FIGS. 40 through 45 are flow charts for the operator display program. FIG. 46 is a flow chart of the sound generation routine. FIGS. 47 through 49 are flow charts for the cooking display routine which includes the display procedures executed during the cooking cycle. FIG. 50 is a flow chart for the holding routine which includes the display procedures during the holding cycle. FIG. 51 is a flow chart for the recovery time display procedures routine. FIG. 52 is a flow chart for a display procedure routine for displaying the program temperature and the measured temperature. FIG. 53 is a flow chart for the interface board disable procedure routine. FIGS. 54 through 59 are flow charts for the analog/digital (A/O) conversion procedures routine that include the task of sampling the A/D converters, testing for a bad probe, testing for over temperature and testing for the existence of the pilot alarm. FIG. 60 is a flow chart for a delay routine.

Figure 61:
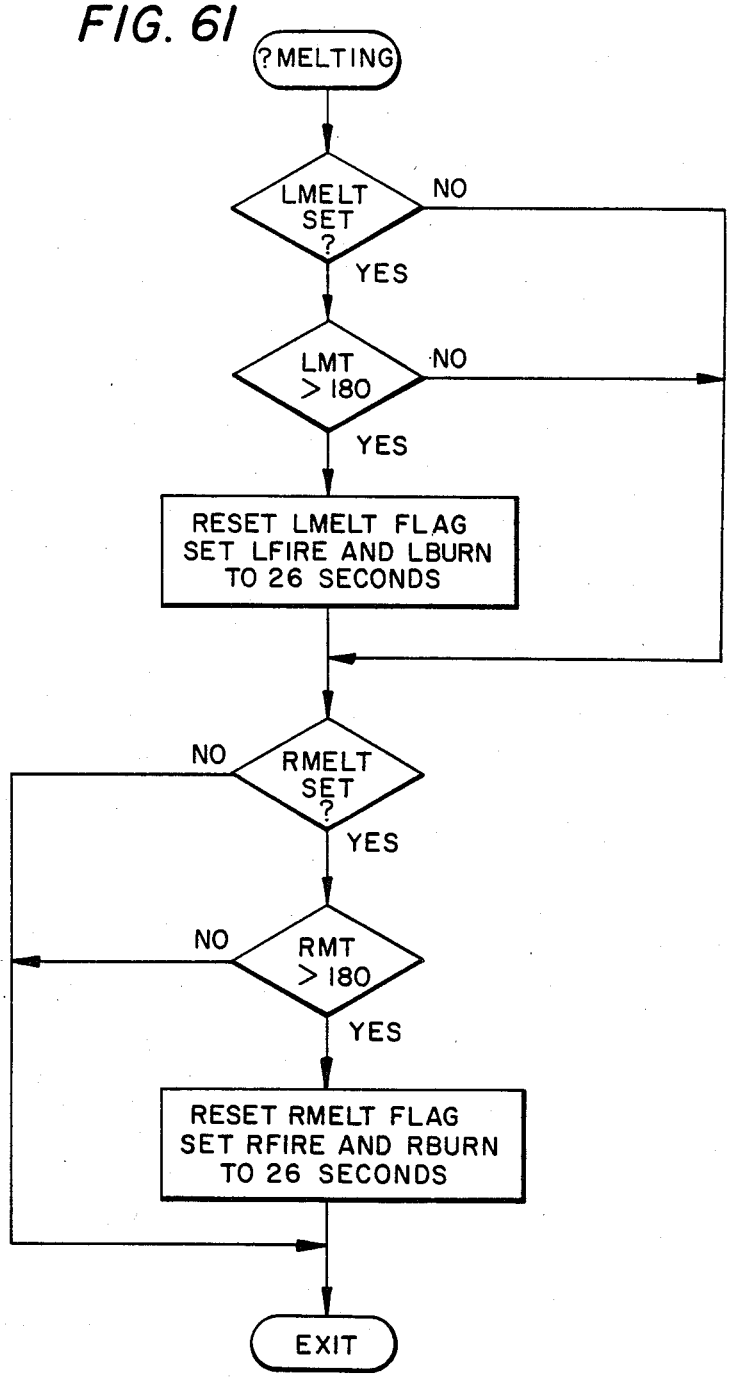
FIG. 61 is a flow chart for the melt cycle procedure routine.
Figure 62:
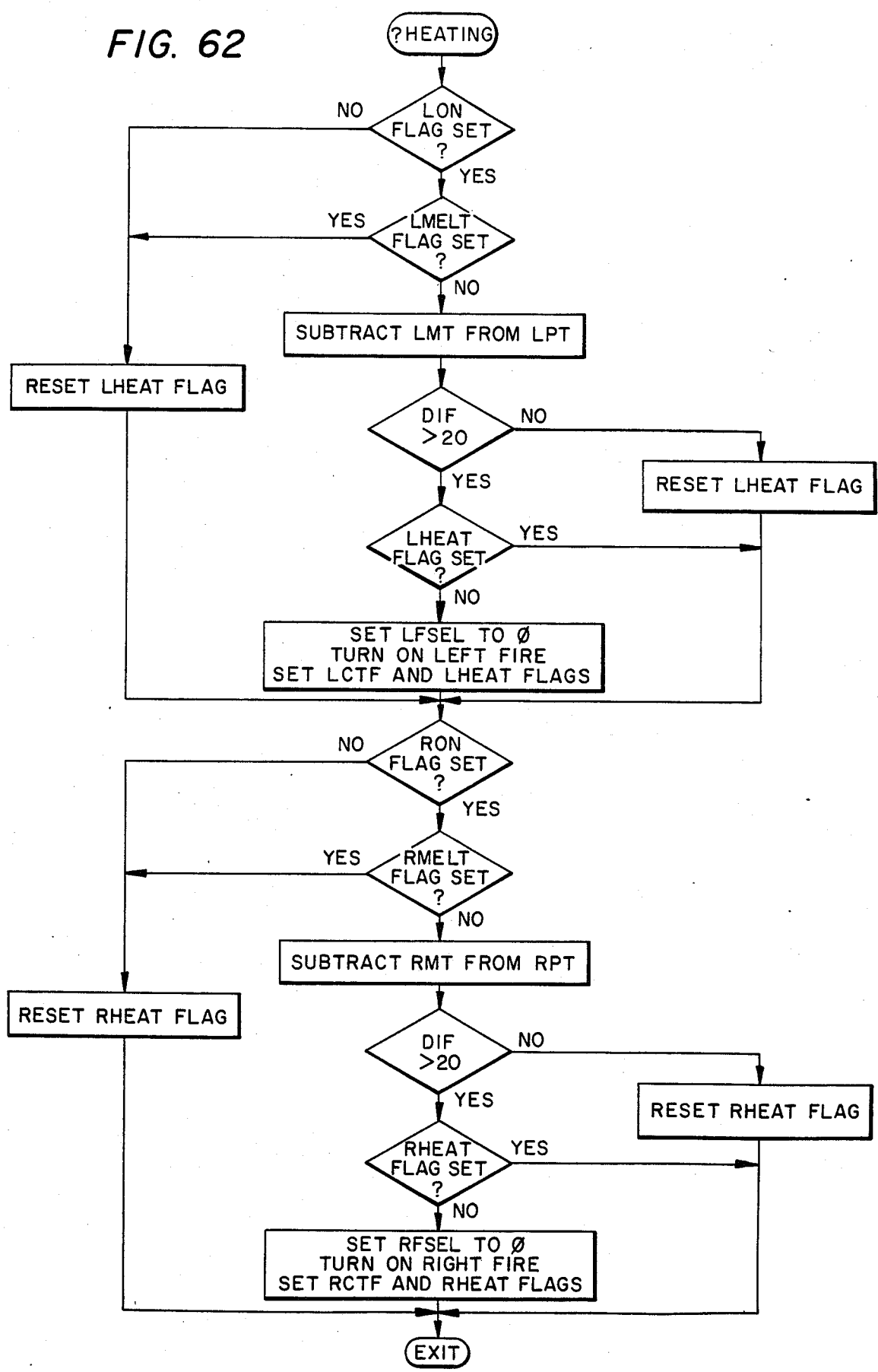
FIG. 62 is a flow chart for the heating cycle procedure that controls the heating of the vat from 180 degrees to 20 degrees below the designated operating temperature.
Figure 63:
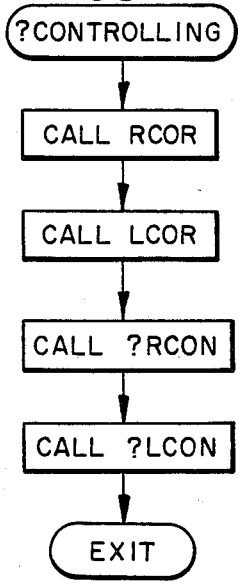
FIGS. 63 through 67 are flow charts for the controlling routine which controls the rate of temperature rise and the amount of heat provided to the cooking oil.
Figure 64:
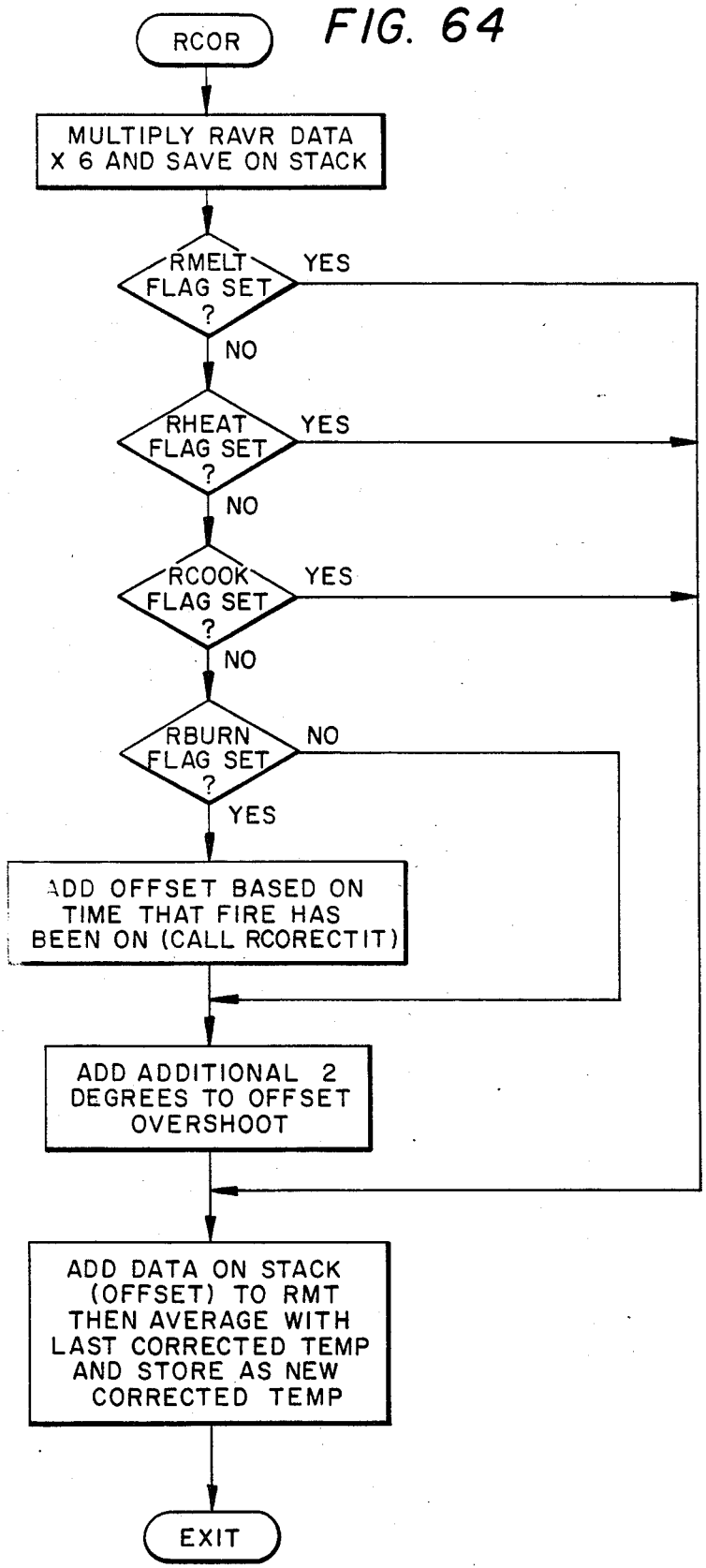
Figure 65:
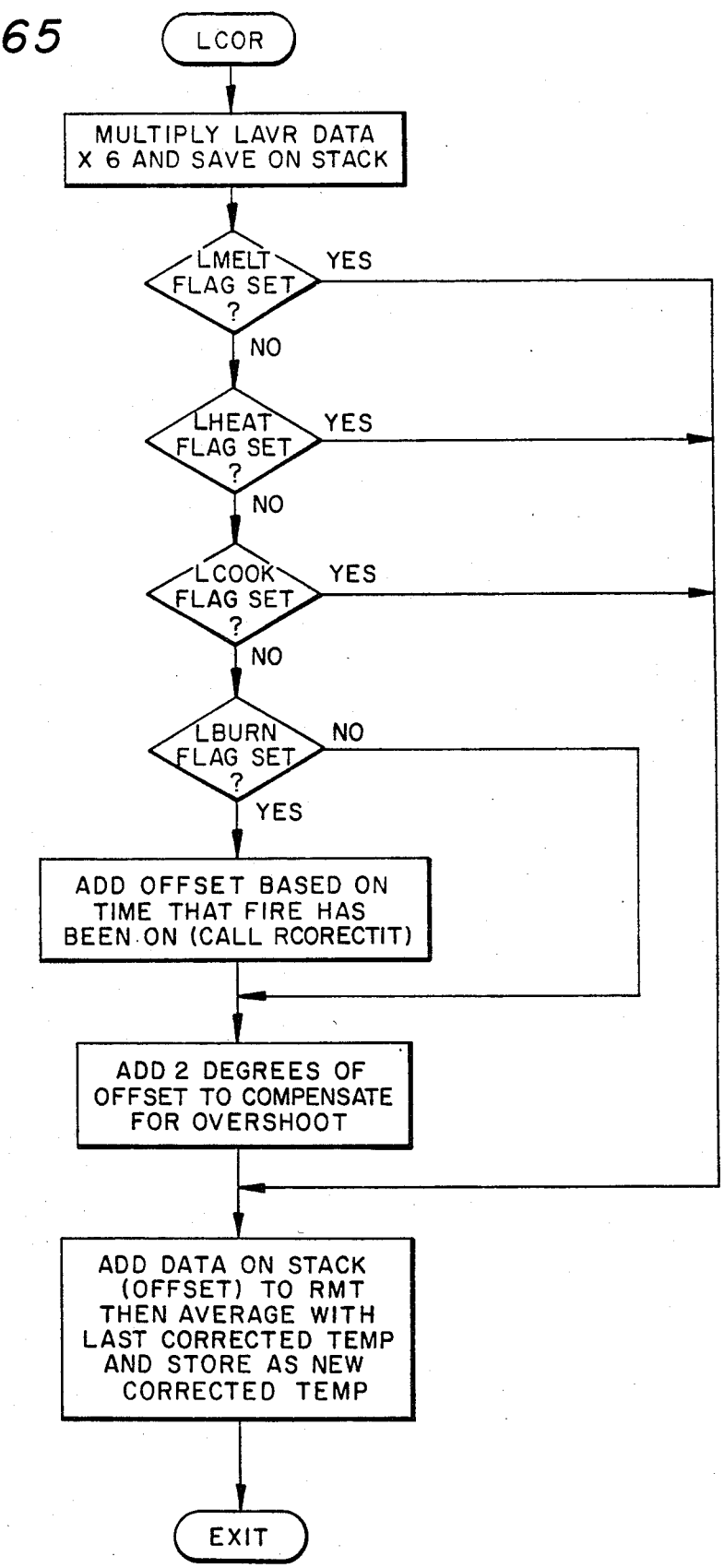
Figure 66:
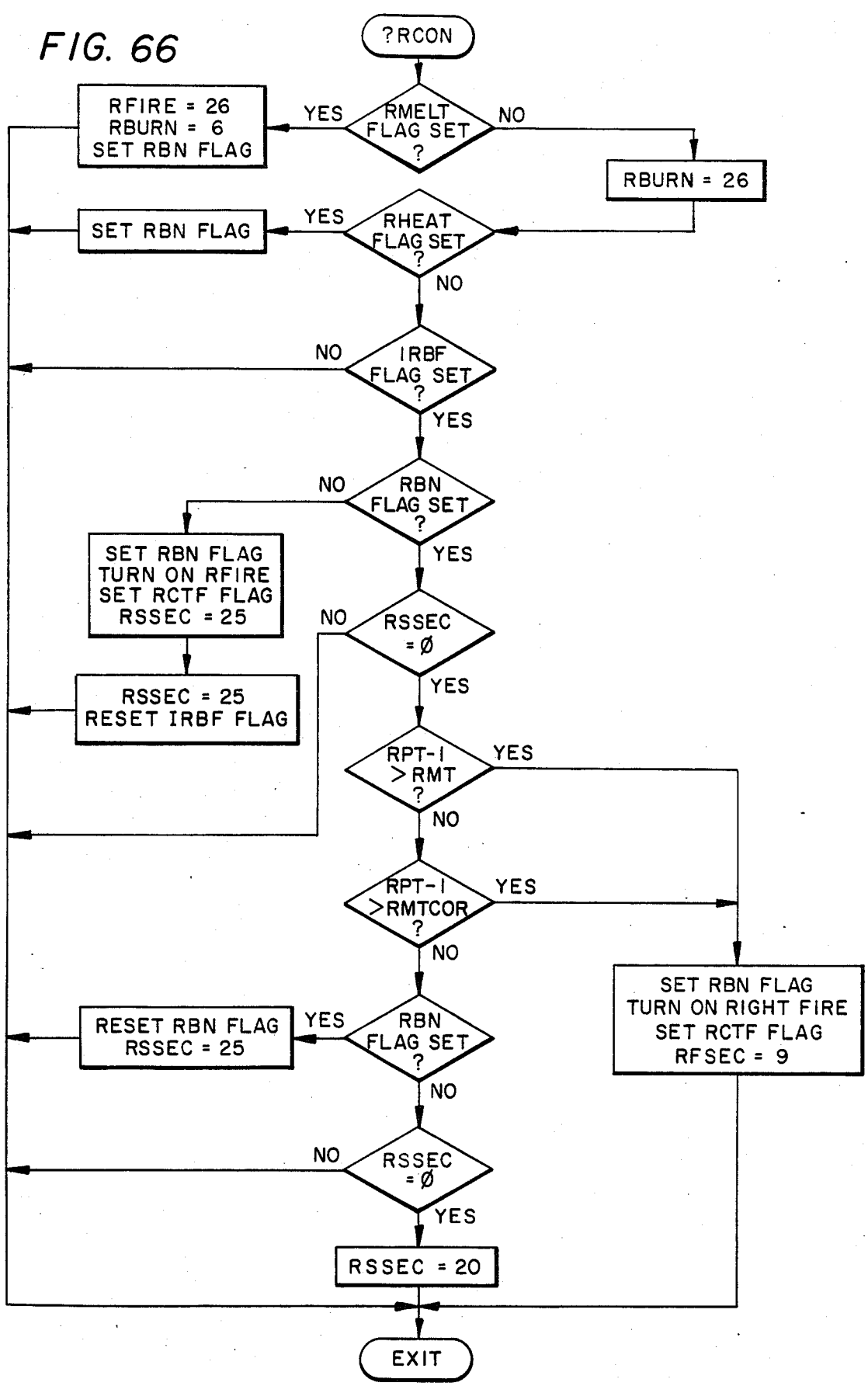
Figure 67:
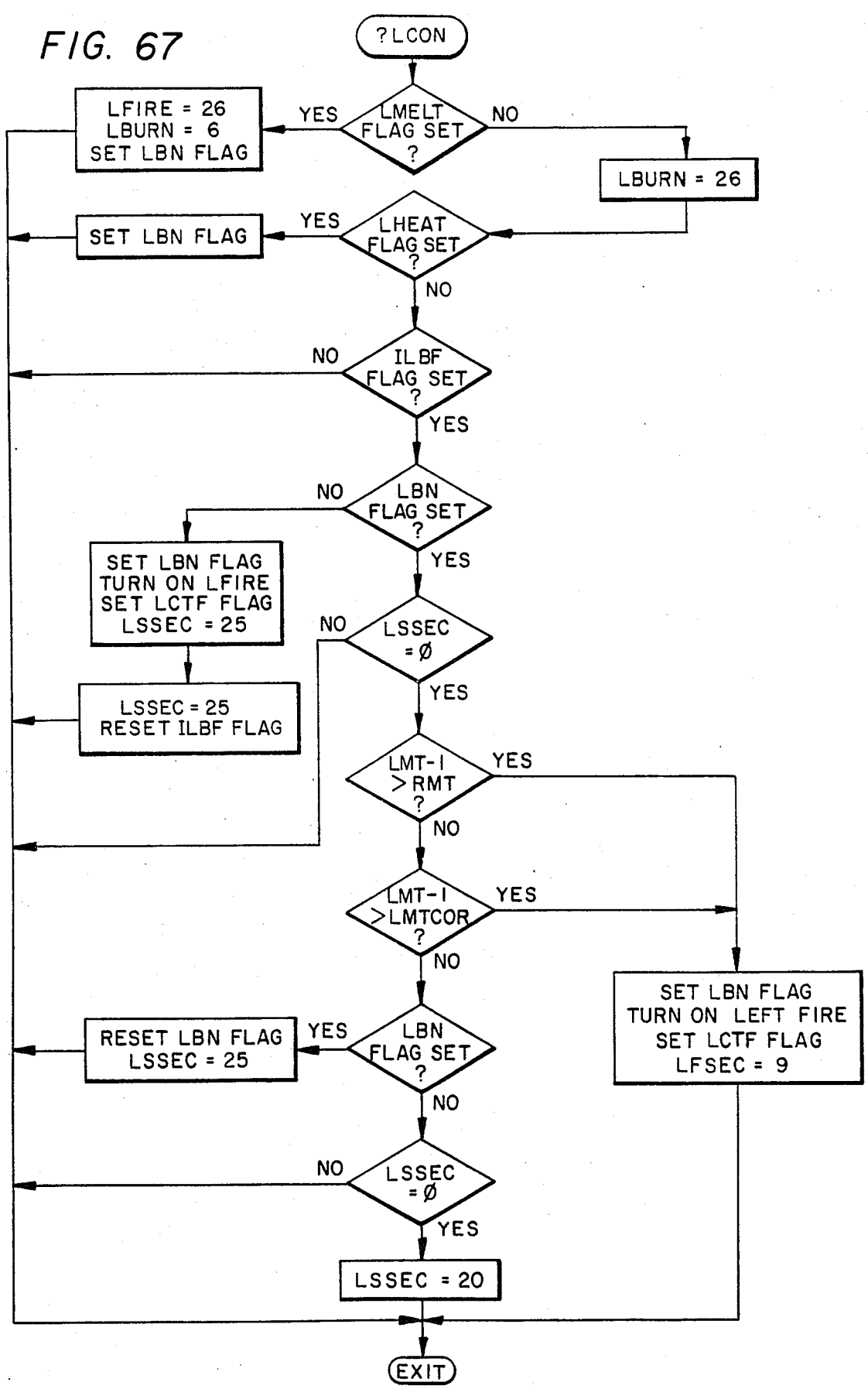
Figure 68:
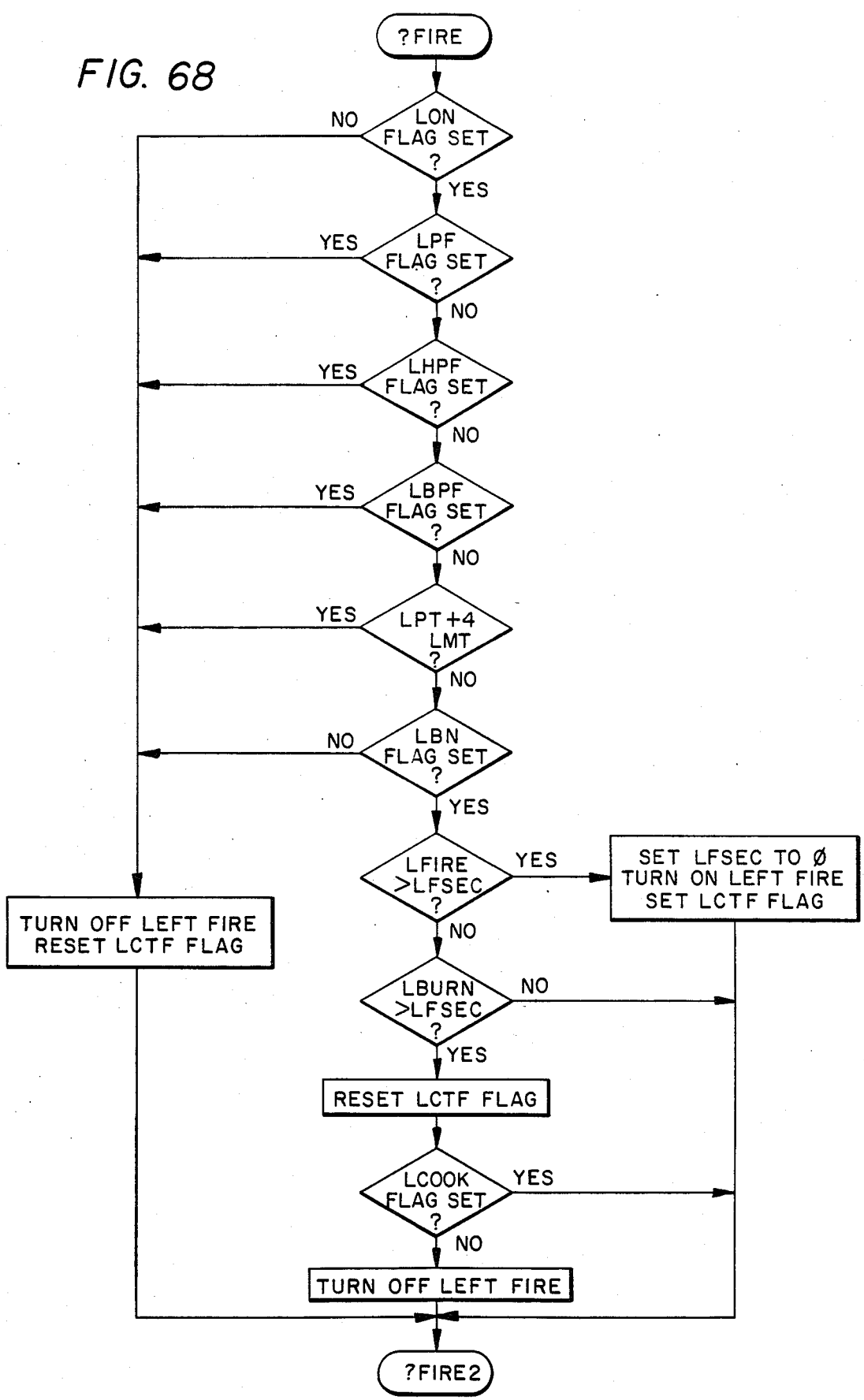
FIGS. 68 and 69 are flow charts for the gas valve control procedures routine.
Figure 69:
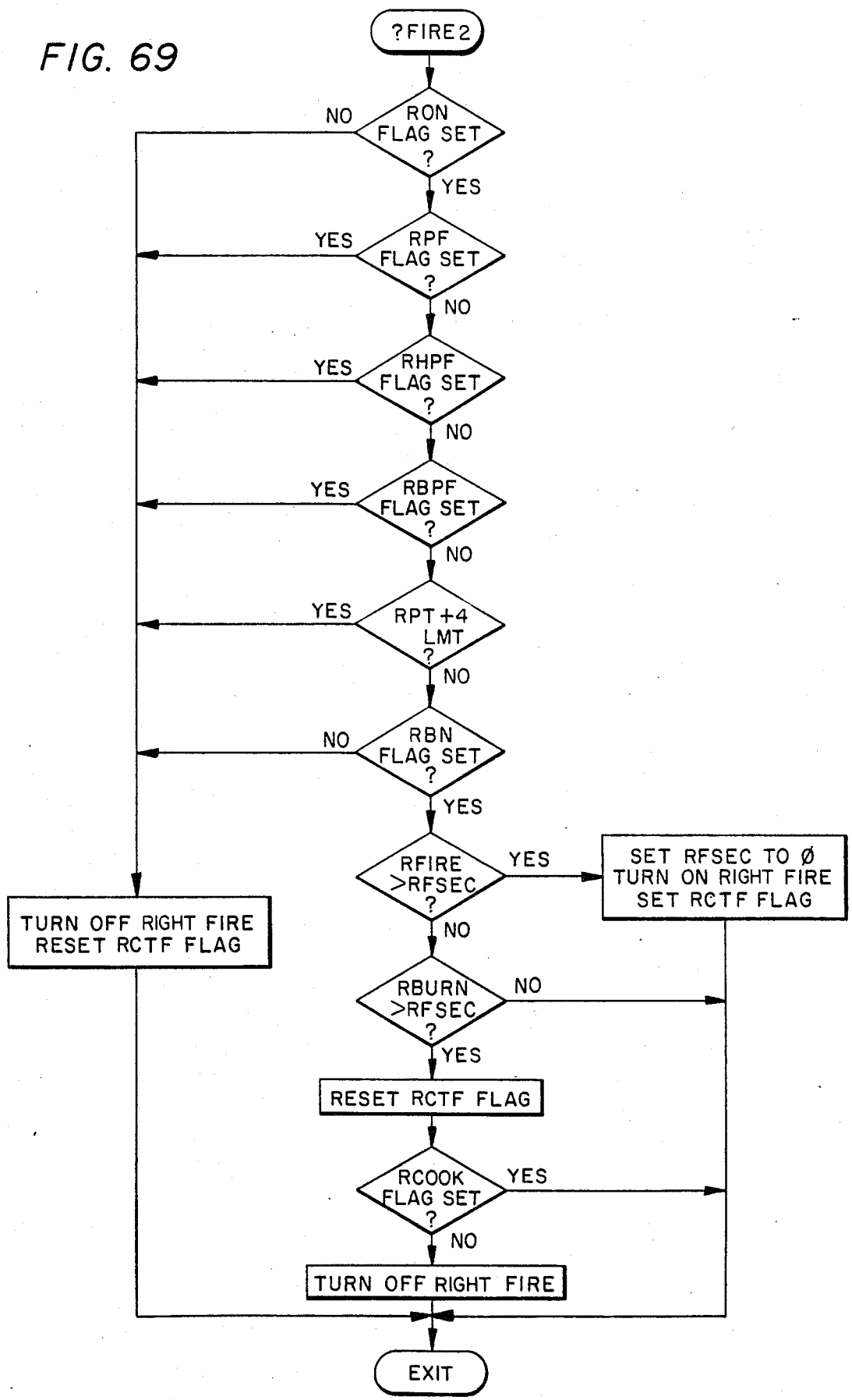
Figure 70:
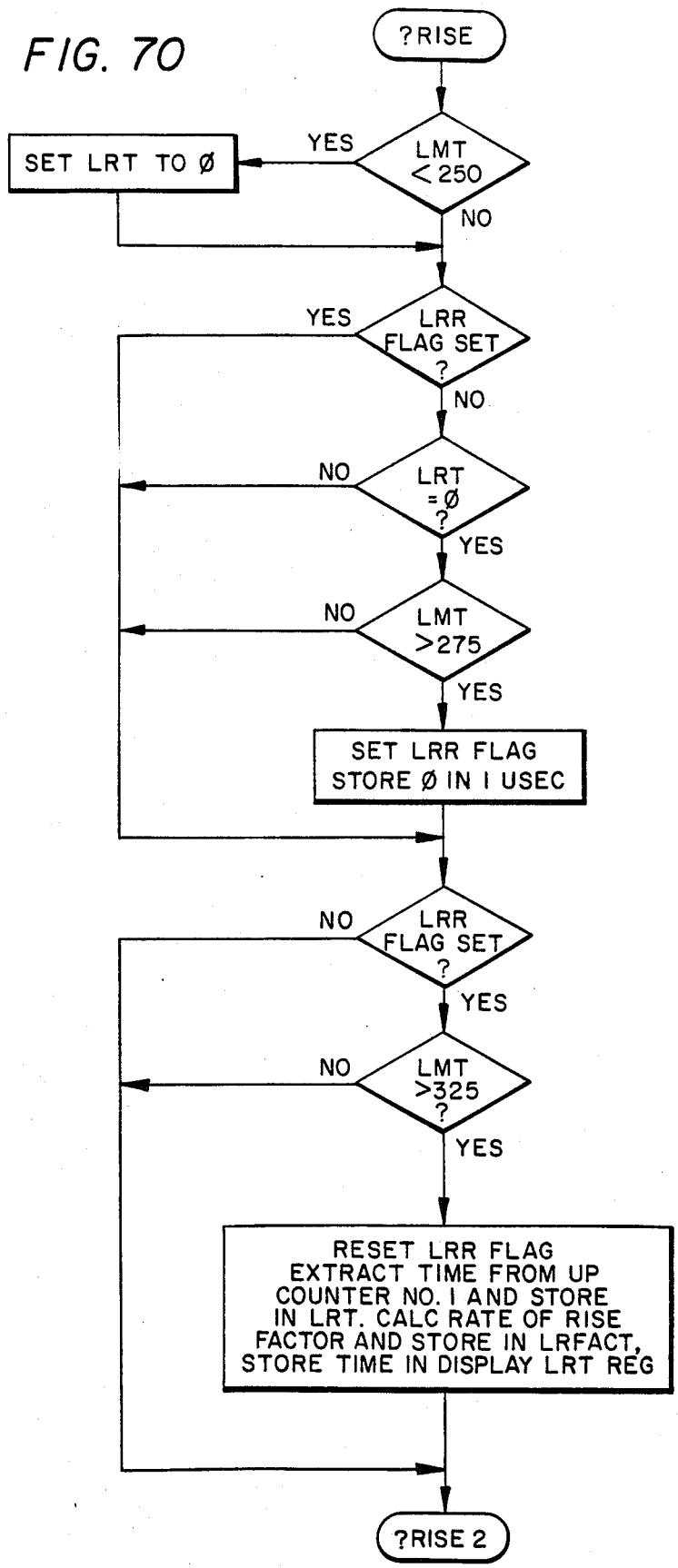
FIGS. 70 and 71 are flow charts for the procedure that computes the rate of temperature rise.
Figure 71:
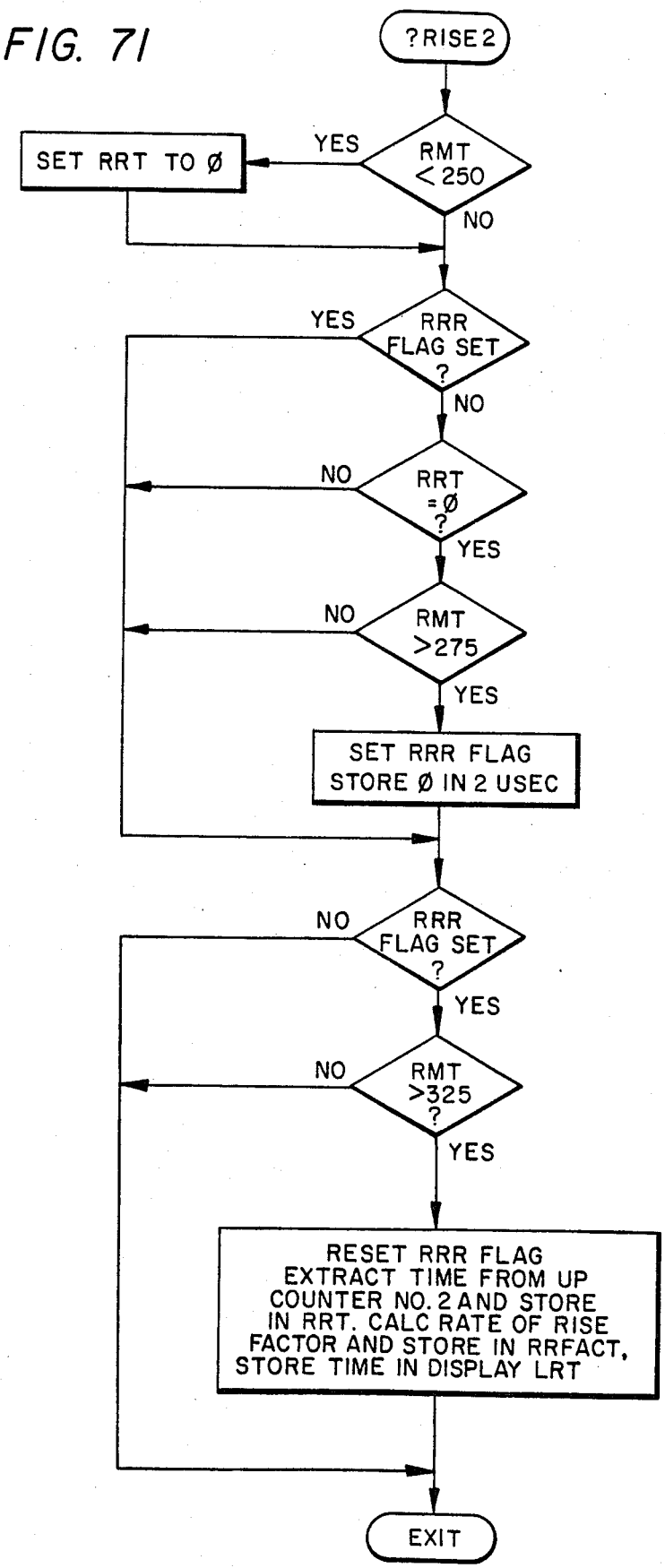
Figure 72:
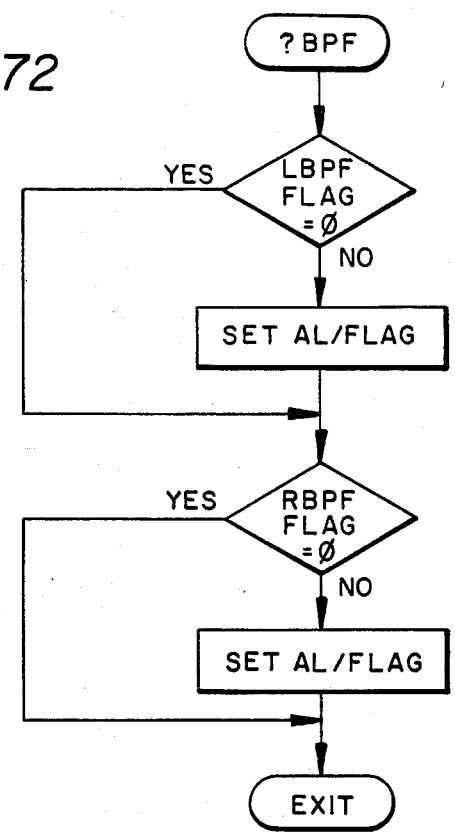
FIG. 72 is a flow chart of the procedure that sounds the alarm when a bad probe is found.
Figure 73:
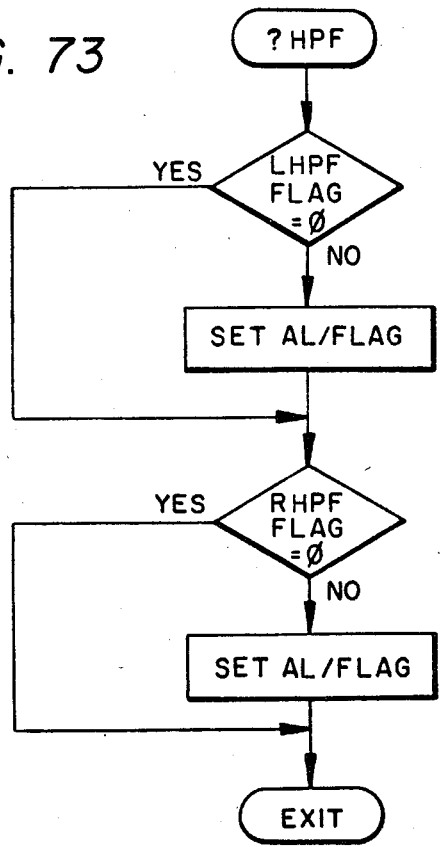
FIG. 73 is a flow chart for the routine that sounds the alarm when the cooking oil temperature exceeds a high limit of 410 degrees F.
Figure 74:
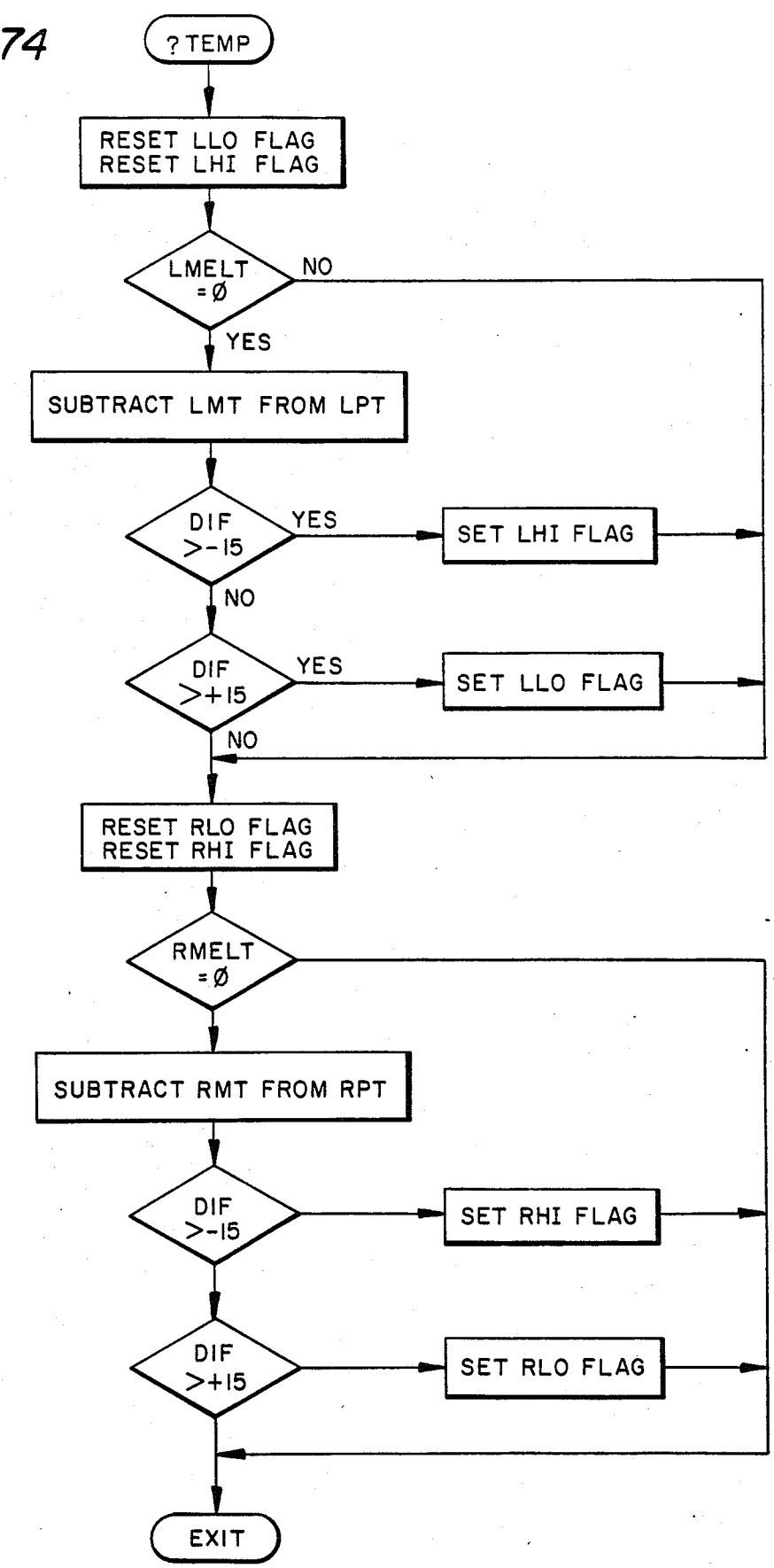
FIG. 74 is a flow chart for a procedure that displays an indication that the temperature of the cooking oil is 15 degrees above or below the set temperature point and if the temperature is within 15 degrees range of the set point dashes are displayed on the seven segment LED displays.

FIG. 61 is a flow chart for the melt cycle procedure routine. FIG. 62 is a flow chart for the heating cycle procedure that controls the heating of the vat from 180 degrees to 20 degrees below the designated operating temperature. FIGS. 63 through 67 are flow charts for the controlling routine which controls the rate of temperature rise and the amount of heat provided to the cooking oil. FIGS. 68 and 69 are flow charts for the gas valve control procedures routine. FIGS. 70 and 71 are flow charts for the procedure that computes the rate of temperature rise. FIG. 72 is a flow chart of the procedure that sounds the alarm when a bad probe is found. FIG. 72 is a flow chart for the routine that sounds the alarm when the cooking oil temperature exceeds a high limit of 410 degrees F. FIG. 74 is a flow chart for a procedure that displays an indication that the temperature of the cooking oil is 15 degrees above or below the set temperature point and if the temperature is within 15 degrees range of the set point dashes are displayed on the seven segment LED displays. FIG. 75 is a flow chart for a procedure that sounds the alarm when the pilot is not fired. Display 76 is a flow chart for a procedure that is activated when there is an input code access error.

While there has been described what are at present considered to be the preferred embodiments of this present invention, it will be obvious to those skilled in the art that various changes and modifications may be made therein without departing from the invention, and it is therefore intended to cover all such changes and modifications as fall within the spirit and scope of the invention.

```
         Split vat Multi-product

261 LIST
    0 ( CM RESIDENT LOAD)  CR  DECIMAL  261  . CR
    1 259 LOAD    P** HEX 9000 47 MOVE Z - FORGET P**
    2     : HOST FORTH ;
    3 ( COMPATABILITY LOAD)  89 . LOAD CR    HEX  A000 ALLOT
    4 CODE RCA   P SEX    1 #    1 OUT    NEXT
    5 CODE TAR   P SEX   80 #    1 OUT    NEXT
```

```
    6 Z : FIND -' ABORT" ?" SWAP ['] B/W ( ABORT" CAN'T"
    7    1-  C@  256 + LIST ;
    8 CODE IDISABLE   P SEX  33 # DIS    NEXT
    9 : BIN  2 BASE ! ;
   10 LOCAL LOAD
   11  DECIMAL ( APPLICATION LOAD)  264 277 THRU 279 283 THRU
   12 Z  285 286 THRU  289  398 THRU
   13 LOK
   14
   15
262 LIST
    0  ( CM TARGET LOAD )
    1  COMPILER LOAD  FORTH  FORGET TASK : TASK ;
    2  HEX   HOST DEFINITIONS   FORGET ALLOT : GAP DROP ;
    3 : ALLOT  'R FORTH +! ;    : PI ;
    4 : LOK    4 SPACES  Z   DUP .  ." LOK" ;
    5 : XT   0 T CR ; TARGET PAGE FR CR 30 LINECTR C!
    6 2 DICTIONARY    0 WINDOW   1B ORG   4000 ALLOT DECIMAL
    7 ( NUCLEAS) 124 LOAD   96 LOAD 123  LOAD 125 131 THRU
    8 ( COMPILER) 97  98  THRU     138 LOAD
    9 ( LEVEL 1)  132 133 THRU    151  152 THRU  32 LOAD
   10 ( VARIABLES LOAD)   264  276 THRU
   11 ( APPLICATION)   278 284 THRU Z 287 288 THRU
   12 Z  290 302 THRU Z 305 313 THRU 315 325 THRU
   13  327 340 THRU 342 358 THRU  360
   14 LOAD  362 396 THRU 399 LOAD HERE HEX U. Z 263 LOAD
   15 HEX   HERE U. THERE U. DECIMAL   HOST FLUSH LOK
263 LIST
    0
    1
    2
    3 ( POWER UP)   HEX   000 ORG  ASSEMBLER
    4 ( DISABLE INTERUPTS FOR INITIALIZATION) 71 C, 00 C,
    5
    6
    7   437F   S RLD   43FF   R RLD
    8 ' MAGIC   I RLD   'NEXT   0F RLD   NEXT
    9
   10
   11 LOK
   12
   13
   14
   15
264 LIST
    0 ( VARIABLES / CONSTANTS 1/3)   DECIMAL
    1
    2 CVARIABLE   LPDIS   3 ALLOT   ( LEFT PRIMARY DISPLAY RAM)
    3 CVARIABLE   RPDIS   3 ALLOT   ( RIGHT PRIMARY DISPLAY RAM)
    4 CVARIABLE   LADIS   3 ALLOT   ( LEFT ALTERNATE DISPLAY RAM)
    5 CVARIABLE   RADIS   3 ALLOT   ( RIGHT ALTERNATE DISPLAY RAM)
    6 VARIABLE    DUMRAM  ( LOCATION READ BY INTERRUPT DISPLAY ROUTINE)
    7 CVARIABLE   LASTKEY ( USED BY INT KEYREAD TO DETERMINE KEYDOWN)
    8 CVARIABLE   NEWKEY  (    "      "       "          " )
    9 CVARIABLE   *KEY    ( CURRENT KEY - LOAD WITH 0 TO GET NEWKEY)
   10 CVARIABLE   GKFLAG  ( GOOD KEY FLAG SET WHEN *KEY LOADED)
   11 10 ALLOT ( INTERRUPT STACK----------))   CVARIABLE  ISTACK
   12 CVARIABLE   A/STAT  ( ANALOG TO DIGITAL CONVERTER STATUS)
   13 CVARIABLE   P/STAT  ( PROGRAM MODE STATUS - DETERMINES MODE)
   14
   15              LOK
265 LIST
    0 ( CVARIABLES LED'S AND I/O)
```

```
    1
    2 CVARIABLE  IOBYTE      ( DATA TO I/O PORT)
    3 CVARIABLE  L/LED       ( LEFT SIDE LED INDICATORS)
    4 CVARIABLE  R/LED       ( RIGHT SIDE LED INDICATORS)
    5 CVARIABLE  L/FLED      ( LEFT SIDE FLASH LED)
    6 CVARIABLE  R/FLED      ( RIGHT SIDE  FLASK LED)
    7
    8 CVARIABLE  P#SELP         ( SELECTED PRODUCT ( PROGRAM)
    9 CVARIABLE  L#SELP
   10 CVARIABLE  R#SELP      ( RIGHT SELECTED PRODEUCT)
   11 408 CONSTANT HI-LIMIT  ( HI TEMPERATURE LIMIT)
   12
   13
   14 LOK
   15
266 LIST
    0 ( TIMER CONSTANTS)  ( USE CAUTION IN REARANGING)
    1 CVARIABLE  LCTIC    ( LEFT COOKING TIC  150 /SEC/0 DELTA T)
    2 CVARIABLE  RCTIC    ( RIGHT COOKING TIC 150 /SEC/0 DELTA T)
    3 CVARIABLE  TIC      ( MASTER TIC -0= .1 SEC RELOAD 15)
    4 CVARIABLE  ADCTIC   ( ADC TIMER RELOAD 2 = 20 MS)
    5 CVARIABLE  CYCTIC   ( MELT & RATE/RISE TIMER)
    6 CVARIABLE  UTIC     ( UTILITY TIC)
    7 CVARIABLE  TICPOT   ( POT DISPLAY TIMER)
    8 CVARIABLE  SHAKETIC ( SHAKE DISPLAY TIMER)
    9 CVARIABLE  AUTIC    ( ALARM TIC)
   10 CVARIABLE  FDUTIC   ( FLASH 7 SEG DISPLAYS)
   11 CVARIABLE  FUTIC    ( FLASH LED'S)
   12 CVARIABLE  SECTIC   ( MASTER .1 SECONDS TIMER RELOAD 15 )
   13 LOK
   14
   15
267 LIST
    0 ( TIMER CONSTANTS) ( USE CAUTION IN REARANGING)
    1
    2 CVARIABLE  LRTIC    ( RELOAD DATA FOR LEFT COOKING TIMER)
    3 CVARIABLE  LCSEC    ( LEFT COOKING SECONDS)
    4 CVARIABLE  LCMIN    ( LEFT COOKING MINUTES)
    5
    6
    7 CVARIABLE  RRTIC    ( RELOAD DATA FOR RIGHT COOK TIMERS( TIC)
    8 CVARIABLE  RCSEC    ( RIGHT COOK TIME SECONDS )
    9 CVARIABLE  RCMIN    ( RIGHT COOK TIME MINUTES )
   10
   11 LOK
   12
   13
   14
   15
268 LIST
    0 ( TIMER CONSTANTS) ( USE CAUTION IN REARANGING)
    1
    2 CVARIABLE  1DSEC    ( DOWN TIMER SECONDS - MINUTES ( HOLD)
    3 CVARIABLE  1DMIN
    4 CVARIABLE  2DSEC
    5 CVARIABLE  2DMIN
    6
    7 CVARIABLE  LSSEC    ( UP TIMERS SECONDS - MINUTES ( STABILITY)
    8 CVARIABLE  LSMIN
    9 CVARIABLE  RSSEC
   10 CVARIABLE  RSMIN
   11
   12 LOK
```

```
     13
     14
     15
269 LIST
     0 ( TIMER CONSTANTS) ( USE CAUTION IN REARANGING)
     1
     2
     3 CVARIABLE   1USEC    ( UP TIMERS SECONDS - MINUTES ( RECOVERY)
     4 CVARIABLE   1UMIN
     5 CVARIABLE   2USEC
     6 CVARIABLE   2UMIN
     7
     8 CVARIABLE   LFSEC    ( LEFT FIRE INTERVAL COUNTER  ( SECONDS)
     9 CVARIABLE   LFMIN
    10 CVARIABLE   RFSEC    ( RIGHT FIRE INTERVAL TIMER ( SECONDS)
    11 CVARIABLE   RFMIN
    12 LOK
    13
    14
    15
270 LIST
     0 ( ADC CONSTANTS 2/3)
     1 VARIABLE   CH0      ( ANALOG MUX CHANEL 0 LO REFERANCE)
     2 VARIABLE   CH1      ( ANALOG MUX CHANEL 1 HIGH REFERENCE)
     3 VARIABLE   CH2      ( ANALOG MUX CHANEL 2 LEFT PROBE)
     4 VARIABLE   CH3      ( ANALOG MUX CHANEL 3 RIGHT PROBE)
     5 VARIABLE   CH4      ( ANALOG MUX CHANEL 4 LEFT PILOT)
     6 VARIABLE   CH5      ( ANALOG MUX CHANEL 5 RIGHT PILOT)
     7 VARIABLE   CH6      ( ANALOG MUX CHANEL 6 SPARE)
     8 VARIABLE   CH7      ( ANALOG MUX CHANEL 7 SPARE)
     9 VARIABLE   LMT      ( LEFT POT MEASURED TEMPERATURE)
    10 VARIABLE   RMT      ( RIGHT POT MEASURED TEMPERATURE)
    11 VARIABLE   1POT
    12 VARIABLE   2POT
    13 VARIABLE   L-R/R    ( LEFT POT RATE OF RISE)
    14 VARIABLE   R-R/R    ( RIGHT POT RATE OF RISE)
    15 VARIABLE   SLOPE    ( ARITHMATIC  RTD SLOPE OF CURVE)  LOK
271 LIST
     0 ( NVR CONSTANTS 1/1)
     1
     2 VARIABLE   #NVR    THERE 2- 'R !
     3 CVARIABLE  1SENS   11 ALLOT
     4 VARIABLE   1TIME   22 ALLOT
     5 VARIABLE   LSTIME
     6 VARIABLE   RSTIME
     7 VARIABLE   LHTIME
     8 VARIABLE   RHTIME
     9 VARIABLE   LPT
    10 VARIABLE   RPT
    11 CVARIABLE  FORC
    12 CVARIABLE  TEST
    13 LOK
    14
    15
272 LIST
     0
     1
     2
     3
     4
     5
     6
     7
```

```
        8
        9
       10  LOK
       11
       12
       13
       14
       15
273 LIST
        0  ( MASTER CONTROL FLAGS)
        1
        2  CVARIABLE      FLAG    47      ALLOT
        3  ( FLAG 1           INITIAL TURN ON
        4    FLAG 2           PROGRAM
        5    FLAG 3           DISLPAY POT
        6    FLAG 4           INITIAL POWER ON FLAG
        7    FLAG 5           ERROR
        8    FLAG 6           COMPLETE PROGRAM ENTRY)
        9
       10
       11
       12
       13  LOK
       14
       15
274 LIST
        0  ( MASTER CONTROL FLAGS)
        1  ( FLAG 7           LEFT ON FLAG
        2    FLAG 8           LMELT
        3    FLAG 9           LEFT ALLOW COOKING
        4    FLAG 10          LCOOK
        5    FLAG 11          LEFT COOKING HAS ENDED
        6    FLAG 12          LEFT HOLDING HAS ENDED
        7    FLAG 13          LHOLD
        8    FLAG 14          LEFT POT LOW TEMP
        9    FLAG 15          LEFT POT HIGH TEMP
       10    FLAG 16          LEFT POT RATE OF RECOVERY
       11    FLAG 17          LEFT FIRE ON FLAG
       12    FLAG 18          CANCEL LMELT VIA KEYBOARD)
       13
       14  LOK
       15
275 LIST
        0  ( MASTER CONTROL FLAGS
        1    FLAG 19          RIGHT ON
        2    FLAG 20          RMELT
        3    FLAG 21          RIGHT ALLOW COOKING
        4    FLAG 22          RCOOK
        5    FLAG 23          RIGHT COOKING HAS ENDED
        6    FLAG 24          RIGHT HOLDING HAS ENDED
        7    FLAG 25          RHOLD
        8    FLAG 26          RIGHT POT LOW TEMP
        9    FLAG 27          RIGHT POT HIGH TEMP
       10    FLAG 28          RIGHT RATE OF RECOVERY
       11    FLAG 29          RIGHT FIRE ON
       12    FLAG 30          CANCEL RMELT VIA KEYBOARD)
       13  LOK
       14
       15
276 LIST
        0  ( MASTER CONTROL FLAGS
        1    FLAG 31          RIGHT AFTER COOKING FLAG
        2    FLAG 32          LEFT AFTER COOKING FLAG
```

```
        3    FLAG 33              INTERFACE DISABLE FLAG   )
        4
        5  CVARIABLE     AL/FLAG      ( ALARM CONDITON FLAG)
        6  CVARIABLE     C/H-ALARM    ( COOK AND HOLD ALARM FLAG)
        7
        8
        9
       10
       11
       12
       13
       14
       15   LOK
277 LIST
        0  ( INTERRUPT !  TIC'S 1/9)    ASSEMBLER   HEX
        1  ( INT EXIT    FF #CODE PGIT    FORGET PGIT ASSEMBLER)
        2   2A10 ORG        BEGIN    RET
        3  ( SAVE REGS)   2 DEC SAV   2 DEC STXD  +C SHR STXD
        4    5 GLO STXD   6 GLO STXD   7 GHI STXD   7 GLO STXD
        5  ( SEL GRP)      1 INP STXD   1 SEX 80 #  1 OUT
        6  ( DECREMENT TIC EACH INTERRUPT AND RELOAD WITH .1 X INT FREQ)
        7  ( PREP)              TIC 5 ALD
        8  ( DEC TIC)       5 LDN   0= IF    10 # LD
        9  ( TEST 0)       THEN    1 # SM 5 STR    0= IF   ( 10)
       10
       11  ( ADC TIME)     5 INC 5 LDN 0= IF   1 # LD 5 STR
       12
       13
       14  4 SPACES DUP . Z
       15
278 LIST
        0  ( INTERRUPT !  TIC'S 1/9)    ASSEMBLER   HEX
        1   0515   ORG
        2                   BEGIN    RET
        3  ( SAVE REGS)   2 DEC SAV   2 DEC STXD  +C SHR STXD
        4    5 GLO STXD   6 GLO STXD   7 GHI STXD   7 GLO STXD
        5
        6  ( DECREMENT TIC EACH INTERRUPT AND RELOAD WITH .1 X INT FREQ)
        7  ( PREP)              TIC 5 ALD
        8  ( DEC TIC)       5 LDN   0= IF    10 # LD
        9  ( TEST 0)       THEN    1 # SM 5 STR    0= IF   ( 10)
       10
       11  ( ADC TIME)     5 INC 5 LDN 0= IF   1 # LD 5 STR
       12
       13
       14  4 SPACES DUP . Z
       15
279 LIST
        0  ( INTERRUPT !  ADC 2/9)    ASSEMBLER   HEX
        1  ( IF A/STAT BIT 7  IF Q SET DO ADC    ELSE SET Q)
        2  ( TEST A/STAT)    A/STAT 6 ALD   6 LDN 80 # AND 0= NOT IF
        3  ( IF Q DO ADC)    CD C,    0#LD   0= IF    7B C,    ELSE   5 SEX
        4  ( RESET Q)        7A C,   ( RESET Q)
        5  ( GET CHANEL #)   6 LDN 07 # AND    SHL
        6  ( ADD OFFSET)     CH0 A/LD 1+ # ADD    5 PLO
        7  ( SAVE DATA)      0 GLO STXD    0 GHI STXD
        8  ( RESET R0)       0#LD    0 PHI 0 PLO
        9  ( RESET A/STAT)   6 LDN 7F # AND 1 # ADD 6 STR       ( 20)
       10  ( NOT Q & NOT 80)          THEN   THEN
       11  ( NOT ADC )        THEN ( DEC .1 SECOND TIMERS )
       12  ( DEC .1 SEC)    TIC 5 ALD BEGIN   5 INC 5 LDN    0= NOT IF
       13  ( NZ DEC)         1 # SM 5 STR      THEN
```

```
      14 ( TEST END)      5 GLO  SECTIC     A/LO # XOR    0= END ( 12)
      15 4 SPACES DUP . Z
280 LIST
       0 ( INT INITIAL 3/9)    HEX    ASSEMBLER
       1
       2 IOBYTE 6 ALD RPDIS 5 ALD 5 SEX 6 LDN 08 # AND 0= NOT IF
       3 7F # LD AND 5 STR ELSE 80 # LD OR 5 STR THEN LPDIS 5 ALD 6 LDN
       4 10 # AND 0= NOT IF 7F # LD AND 5 STR ELSE 80 # LD OR 5 STR THEN
       5 LPDIS A/LO # LD 5 PLO DUMRAM 7 RLD 7 LDA 0= IF FF # LD THEN
       6 ( NOT 0 IF PREP)   6 PLO    7 LDN 6 PHI
       7 ( SET-UP CTR)      8 # LD 7 PLO
       8 ( SEND CMD)        6 SEX    4 INP   6 GLO FF # XOR   0= IF
       9         BEGIN      5 LDA 6 PLO 6 STR ( USES MA0-MA7 PLUS MWR)
      10 ( ALL 8 DONE ?)    7 DEC 7 GLO  0= END
      11 ( RESET CMD)       DUMRAM 7 ALD 0#LD 7 STR
      12 ( RESET 6 HI)      THEN   2 GHI 6 PHI  4 SPACES  DUP . Z
      13
      14
      15
281 LIST
       0 ( INTERRUPT ! DOWN TIMERS  4/9)         ASSEMBLER    HEX
       1
       2 ( DECREMENT DOWN TIMERS IF SECTIC = 0  RELOAD SECTIC  1/SEC
       3     THESE TIMERS USED AS HOLDING TIMERS)
       4
       5 ( PREP)            SECTIC 6 ALD
       6 ( TEST SECTIC)     6 LDN   0= IF    0A # LD 6 STR   ( RESET)
       7
       8 ( SETUP FIRST)     1DSEC 6 ALD   BEGIN
       9 ( TEST SEC)        6 LDN   0= IF ( DEC MIN)   6 INC 6 LDN
      10                    0= NOT IF  1 # SM 6 STR    6 DEC ( -) SEC)
      11 ( RESET SEC)       3C # LD   SWAP THEN
      12 ( DEC SEC)         1 # SM 6 STR    ELSE 6 DEC    THEN
      13 ( SET NEXT)        6 INC 6 INC
      14 ( ALL DONE ?)      6 GLO   1USEC A/LO # XOR   0= END
      15 4 SPACES DUP . Z
282 LIST
       0 ( INTERRUPT ! UP TIMERS 5/9)    ASSEMBLER HEX
       1
       2 ( INCREMENT UPTIMERS WHEN SECTIC = 0 1/SEC  THESE TIMERS ARE
       3     USED BY THE FRYER RECOVERY ROUTINE)
       4
       5 ( UP TIMERS R6 POINTS TO FIRST)      BEGIN
       6 ( INC SEC)         6 LDN 1 # ADD 6 STR
       7 ( TEST LIMIT)      3C # XOR   0= IF   ( SEC = 0)  6 STR
       8 ( INC MIN)         6 INC 6 LDN 1 # ADD 6 STR
       9           ELSE 6 INC
      10           THEN  6 INC 6 GLO   RFMIN 1+ A/LO # XOR   0= END
      11
      12 ( TIC NOT 0)       THEN
      13 ( SECTIC NOT 0)    THEN
      14 4 SPACES DUP . Z
      15
283 LIST
       0 ( INTERRUPT ! TIC'S 6/9)    ASSEMBLER    HEX   ( 38 BYTES)
       1
       2
       3 ( ALT TIME) TIC 5 ALD  5 LDN  1 # AND   0= IF  ( 13.32 MS)
       4 ( PREP)            5 SEX    LRTIC 6 ALD   LCTIC 5 ALD
       5 ( DEC L/R TIC)     BEGIN    5 LDN 0= NOT IF  1 # SM 5 STR   THEN
       6 ( TEST FIRST)      5 LDN    0= IF ( RESET)   6 LDN 5 STR
       7 ( TEST SEC)        6 INC 6 LDN  0= IF ( DEC MIN)  6 INC 6 LDN
       8                    0= NOT IF  1 # SM 6 STR   6 DEC ( -) SEC)
```

```
      9   ( RESET SEC)      3C # LD        SWAP      THEN
     10   ( DEC SEC)        1 # SM 6 STR ELSE 6 DEC    THEN    6 DEC
     11   ( SET NEXT)       THEN   6 INC 6 INC 6 INC 5 INC
     12   ( ALL DONE ?)     6 GLO  RCMIN 1+ A/LO # XOR    0= END
     13  4 SPACES DUP . Z
     14
     15
284 LIST
      0   ( KEY ROUTINES)    HEX
      1   ( ?KEY)       *KEY 6 ALD 6 LDN   0= IF FF # LD  2 STR 2 SEX
      2  0#LD 7 PLO 7 PHI SHL BEGIN FF # ADD  2 LDN  +C SHL   2 STR
      3  ( STROBE)    4 OUT 2 DEC   7 GLO
      4  ( CHECK F)   1 EFL IF   1 # LD   ELSE   2 EFL IF   2 # LD   ELSE
      5              3 EFL IF  .3 # LD   ELSE   4 EFL IF   4 # LD
      6  ( ? DATA)   THEN THEN THEN THEN   7 PLO   0=  IF
      7  ( ITERATE)  7 GHI 4 # ADD 7 PHI    10 # XOR  SWAP 0= END  THEN
      8  ( SAVE KEY) 7 GLO 2 STR   0= NOT IF   7 GHI ADD 2 STR    THEN
      9  LASTKEY 5 ALD 5 LDN XOR 0= NOT IF 5 INC 5 LDN XOR 0= NOT IF
     10   2 LDN 5 STR ELSE 0#LD 5 STR  5 DEC 2 LDN  5 STR 0= NOT IF
     11  6 STR 6 INC 1 # LD  6 STR FLAG 5 ALD 5 GLO # 6 ADD 5 PLO 2 SEX
     12  5 LDN 2 STR 5 GLO # 0C ADD  5 PLO 5 LDN OR 0= NOT IF
     13  AUTIC 5 ALD 2 # LD 5 STR THEN THEN THEN THEN THEN THEN
     14  4 SPACES DUP . Z
     15
285 LIST
      0   ( KEY ROUTINES)    HEX
      1   ( ?KEY)       *KEY 6 ALD 6 LDN  0= IF 3F # LD 2 STR 2 SEX 0#LD
      2               7 PLO 7 PHI SHL BEGIN  2 LDN   C0 # OR  +C SHL
      3               3F # AND 2 STR . ( STROBE) 4 OUT 2 DEC   7 GLO
      4  ( CHECK F)   1 EFL IF   1 # LD   ELSE   2 EFL IF   2 # LD   ELSE
      5              3 EFL IF   3 # LD   ELSE   4 EFL IF   4 # LD
      6  ( ? DATA)   THEN THEN THEN THEN   7 PLO   0=  IF
      7  ( ITERATE)  7 GHI 4 # ADD 7 PHI    10 # XOR  SWAP 0= END  THEN
      8  ( SAVE KEY) 7 GLO 2 STR   0= NOT IF   7 GHI ADD 2 STR    THEN
      9  LASTKEY 5 ALD 5 LDN XOR 0= NOT IF 5 INC 5 LDN XOR 0= NOT IF
     10   2 LDN 5 STR ELSE 0#LD 5 STR  5 DEC 2 LDN  5 STR 0= NOT IF
     11  6 STR 6 INC 1 # LD  6 STR FLAG 5 ALD 5 GLO # 6 ADD 5 PLO 2 SEX
     12  5 LDN 2 STR 5 GLO # 0C ADD  5 PLO 5 LDN OR 0= NOT IF
     13  AUTIC 5 ALD 2 # LD 5 STR THEN THEN THEN THEN THEN THEN
     14  4 SPACES DUP . Z
     15
286 LIST
      0      ( INTERRUPT ! LED'S 8/9)   HEX   ASSEMBLER
      1   ( FLASH LED'S   XOR  LED REG WITH FLED REGS STORE LED)
      2   ( CHECK TIME)      FUTIC 5 ALD   5 LDN 0= IF AL/FLAG 7 RLD
      3   ( 0 IF RELOAD)     7 LDN 0= IF 3 # LD ELSE 2 # LD THEN 5 STR
      4   ( XOR FLED & LED)  L/FLED 5 ALD   L/LED 6 ALD   6 SEX
      5       BEGIN          5 LDA XOR 6 STR 6 INC
      6   ( BOTH DONE ?)     6 GLO R/LED A/LO 1+ # XOR    0= END
      7   ( ALARMS?)         AUTIC 5 ALD C/H-ALARM 6 ALD 6 LDN 0= NOT IF
      8                      2 # LD   5 STR THEN
      9                      7 LDN 0= NOT IF 1 # LD 5 STR   THEN
     10   ( FUTIC NOT 0)     THEN
     11   ( MUXED LED)       R/LED 6 ALD   2 SEX
     12   ( ? LEFT/RIGHT)    TIC 5 ALD   5 LDN 01 # AND
     13   ( 0= LEFT LED)     0= IF   6 DEC
     14   ( OUTPUT DATA)     THEN  6 LDN FF # XOR 2 STR 4 OUT   2 DEC
     15   4 SPACES   DUP . Z
287 LIST
      0      ( INTERRUPT ! LED'S 8/9)   HEX   ASSEMBLER
      1   ( FLASH LED'S   XOR  LED REG WITH FLED REGS STORE LED)
      2   ( CHECK TIME)      FUTIC 5 ALD   5 LDN 0= IF AL/FLAG 7 RLD
      3   ( 0 IF RELOAD)     7 LDN 0= IF 3 # LD ELSE 2 # LD THEN 5 STR
```

```
  4 ( XOR FLED & LED)    L/FLED 5 ALD  .L/LED 6 ALD    6 SEX
  5       BEGIN          5 LDA XOR 6 STR 6 INC
  6 ( BOTH DONE ?)       6 GLO R/LED A/LO 1+ # XOR   0= END
  7 ( ALARMS?)           AUTIC 5 ALD C/H-ALARM 6 ALD 6 LDN 0= NOT IF
  8                      2 # LD  5 STR THEN
  9                      7 LDN 0= NOT IF 1 # LD 5 STR   THEN
 10 ( FUTIC NOT 0)       THEN
 11 ( MUXED LED)         R/LED 6 ALD  2 SEX
 12 ( ? LEFT/RIGHT)      TIC 5 ALD   5 LDN 01 # AND
 13 ( 0= LEFT LED)       0= IF   6 DEC
 14 ( OUTPUT DATA)       THEN  6 LDN ( FF # XOR) 2 STR 4 OUT  2 DEC
 15   4 SPACES DUP . Z
288 LIST
  0 ( INT INITIAL 9/9)    HEX    ASSEMBLER
  1
  2      ( CHECK ALARM TIMER AND DETRMINE ON / OFF)
  3 ( OFFSET)            C4 C, C4 C, C4 C, C4 C, C4 C, C4 C,
  4 ( PREP)              IOBYTE 6 ALD 6 SEX
  5 ( TIMER 0 ?)         AUTIC 5 ALD   5 LDN 0= IF   7F # LD AND
  6 ( ON/OFF)            ELSE   80 # LD OR   THEN 6 STR  2 OUT
  7                      2 INC   2 SEX  LDXA 7 PLO   LDXA 7 PHI
  8                      LDXA 6 PLO   LDXA 5 PLO   LDXA SHL   LDXA
  9                      DUP BR  ( TO EXIT)
 10
 11 CODE IENABLE   1+ ( OVER EXIT)   1 RLD   P SEX  33 # RET NEXT
 12 LOK
 13
 14
 15
289 LIST
  0 ( INT INITIAL 9/9)    HEX    ASSEMBLER
  1
  2      ( CHECK ALARM TIMER AND DETRMINE ON / OFF)
  3 ( OFFSET)            C4 C,  C4 C,
  4 ( PREP)              IOBYTE 6 ALD 6 SEX
  5 ( TIMER 0 -?)        AUTIC 5 ALD   5 LDN 0= IF   7F # LD AND
  6 ( ON/OFF)            ELSE   80 # LD OR   THEN 6 STR  2 OUT
  7    2 INC   2 SEX  1 OUT ( GRP)  LDXA 7 PLO   LDXA 7 PHI
  8                      LDXA 6 PLO   LDXA 5 PLO   LDXA SHL   LDXA
  9                   DUP BR  ( TO EXIT)
 10
 11 CODE IENABLE   1+ ( OVER EXIT)   1 RLD   P SEX  33 # RET NEXT
 12 LOK
 13
 14
 15
290 LIST
  0 ( NUMBER & MESSAGE TABLES)  HEX
  1 CREATE #TAB  FBB0 , EDF5 , B6D7 , DFF0 , FFF6 , FE9F , CBBD ,
  2             CFCE , F7BE ,
  3 CREATE *CODE   CB9D , BDCF ,     CREATE SELP    D7CF , 8BEE ,
  4 CREATE 0-LO    E684 , 8B9D ,     CREATE 0-HI    E684 , BE9D ,
  5 CREATE 1-SP    D7EE , 84B0 ,     CREATE 2-SP    D7EE , 84ED ,
  6 CREATE HOLD    BE9D , 8ABD ,     CREATE EROR    CF8C , 9D8C ,
  7 CREATE CODC    CBFB , FBCB ,     CREATE SENS    D7CF , 7AD7 ,
  8 CREATE HOUR    BE9D , 998C ,     CREATE PROB    EE8C , 9D9F ,
  9 CREATE POT     EE84 , 8B8F ,     CREATE CYCL    CBB7 , CB8B ,
 10 CREATE HOT     BE9D , 8F80 ,     CREATE BAD     9F1D , BD80 ,
 11 CREATE SHAKE   D7BE , FECB ,     CREATE BOIL    9F9D , 908B ,
 12 CREATE PROG    84EE , DB84 ,     CREATE DEGREE  E6CB , 36CE ,
 13 CREATE ALARMS  84FE , 8B84 ,     CREATE OPRATE  84FB , EE84 ,
 14 CREATE -ON-    80FB , 7A80 ,
 15 LOK
```

```
291 LIST
     0 ( FLAG OPERATORS)
     1 : FFL   1 - FLAG + ;
     2 : SET    FFL  01 SWAP C! ;
     3 : RESET  FFL   0   SWAP   C! ;   ( RESET A FLAG)
     4 : ?KEY  0 *KEY C! 0 GKFLAG C!  ;  ( EMPTY THE KEYSTROKE BUFFER)
     5 : GKEY   *KEY C@ ;
     6 : GIT    FFL  C@ ;
     7 : D/MSG   4 MOVE   ;
     8 HEX
     9 CODE D/BLANK   ( XDIS) T SEX 4 # LD 7 PLO   BEGIN   80 #  LD
    10     T STR T INC   7 DEC 7 GLO   0= END   POP BR
    11 CODE 3/BLANK    T SEX 3 # LD 7 PLO    BEGIN   80 # LD T STR
    12                   T INC   7 DEC   7 GLO   0= END POP BR
    13
    14 LOK
    15
292 LIST
     0 ( DISPLAY ROUTINES 1/4)    HEX
     1
     2
     3 CODE IDISABLE    P SEX   33 # DIS     NEXT
     4
     5
     6  ( WRITE 4 7-SEG DIGITS TO DISRAM SET DP FOR COLONS IF REQUIRED)
     7 CODE DDIS    0#LD 2 STR  S INC   4 # LD 7 PLO
     8          BEGIN   S INC 2 LDN   0= IF   S LDN 7B # XOR   0= IF
     9              0#LD S STR  ELSE    S LDN FB # XOR   0= IF   80 # LD
    10              S STR  ELSE 2 STR    SWAP THEN    THEN    THEN
    11         S LDA T STR T INC   7 DEC 7 GLO  0= END
    12           S DEC    POP BR
    13
    14 LOK
    15
293 LIST
     0 VARIABLE   LRT       ( LEFT RECOVERY TIME)
     1 VARIABLE   RRT       ( RIGHT RECOVERY TIME)
     2 VARIABLE   DLRT      ( LEFT RECOVERY DISPLAY DATA)
     3 VARIABLE   DRRT      ( RIGHT RECOVERY DISPLAY DATA)
     4 VARIABLE   LLMT      ( LAST LEFT MEASURED TEMP)
     5 VARIABLE   LRMT      ( LAST RIGHT MEASURED TEMP )
     6 VARIABLE   LDMT      ( DIFFERENCE BETWEEN LAST AND CURRENT TEMP)
     7 VARIABLE   RDMT      ( DIFFERANCE BETWEEN LAST AND CURRENT TEMP)
     8 CVARIABLE  LBURN     ( LEFT BURN FLAG)
     9 CVARIABLE  RBURN     ( RIGHT BURN FLAG)
    10
    11 LOK
    12
    13
    14
    15
294 LIST
     0  ( DISPLAY ROUTINES 2/3)  HEX
     1 CODE GDIS ( XDIS) T SEX   4 # LD 7 PLO    BEGIN  84 # LD
     2       T STR T INC   7 DEC 7 GLO  0= END   POP BR
     3  Z : #SP@   P#SELP C@ 1-   #NVR  +  C@ #TAB + C@   SWAP 3 + C! ;
     4  : TEMP/D ( S D) )R 100 /MOD   SWAP   10 /MOD   SWAP
     5    #TAB + C@  SWAP    #TAB + C@    ROT #TAB  + C@    R)   DDIS ;
     6  : TEMP    FORC C@  DUP    203 = IF    SWAP @ 32 - 9 / 5 *
     7             ELSE    SWAP @    THEN   ROT    TEMP/D ;
     8  : SEGIT    C@   10 /MOD   SWAP #TAB + C@ SWAP #TAB + C@ ;  HEX
     9  : TIME/D ( S D) )R  DUP SEGIT 7F AND   ROT 1+ SEGIT
    10                SWAP 7F AND SWAP    R) DDIS ;
```

```
   11 HEX : D/OFF  6042 DUMRAM ! ; : D/ON  FF42 DUMRAM ! ;    HOST
   12 : LACOPY  LPDIS  LADIS 4 MOVE ; : RACOPY  RPDIS RADIS 4 MOVE ;
   13 : LBLANK   LPDIS D/BLANK   LACOPY   ;
   14 : RBLANK   RPDIS D/BLANK   RACOPY   ;              LOK
   15
295 LIST
    0
    1 VARIABLE    DBUFF  ( TEMP DISPLAY BUFFER)
    2 CVARIABLE   LBPF ( LEFT BAD PROBE FLAG)
    3 CVARIABLE   RBPF ( RIGHT BAD PROBE FLAG)
    4 CVARIABLE   LHPF ( LEFT HOT POT FLAG)
    5 CVARIABLE   RHPF ( RIGHT HOT POT FLAG)
    6 VARIABLE    TEMPDIS    ( TEMP DISPLAY HOLDING CELL)
    7 CVARIABLE   LSHAKE ( LEFT SHAKE FLAG)
    8 CVARIABLE   RSHAKE ( RIGHT SHAKE FLAG)
    9 CVARIABLE   DLSHAKE ( DISPLAY LEFT SHAKE)
   10 CVARIABLE   DRSHAKE ( DISPLAY RIGHT SHAKE)
   11 CVARIABLE   LRFACT  ( LEFT RATE OF RISE FACTOR)
   12 CVARIABLE   RRFACT  ( RIGHT RATE OF RISE FACTOR)
   13 CVARIABLE   LPF  ( LEFT PILOT FLAG)
   14 CVARIABLE   RPF  ( RIGHT PILOT FLAG)
   15 LOK
296 LIST
    0
    1 : GLSELP L#SELP C@ ;     : GRSELP  R#SELP C@ ;
    2 : GPSTAT P/STAT C@ ;     : GASTAT  A/STAT C@ ;
    3 : GSELP  P#SELP  C@  ;
    4 : GRMT   RMT @ ;          : GLMT    LMT @ ;
    5 : GRPT   RPT @ ;          : GLPT    LPT @ ;
    6 : G2     2 GIT ;          : G3      3 GIT ;
    7 : G7     7 GIT ;          : G8      8 GIT ;
    8 : G10    10 GIT ;         : G13     13 GIT ;
    9 : G19    19 GIT ;         : G20     20 GIT ;
   10 : G22    22 GIT ;         : G25     25 GIT ;
   11
   12 : EON    0   G7 ( LON)  IF DROP 1 ELSE
   13              G19 ( RON)  IF DROP 1 THEN THEN ;
   14
   15 LOK
297 LIST
    0 ( DISPLAY ROUTINES 3/3)   DECIMAL
    1 : LMSG    LPDIS  D/MSG ;   : RMSG   RPDIS    D/MSG ;
    2 : LAMSG   LADIS  D/MSG ;   : RAMSG  RADIS    D/MSG ;
    3 : LAPMSG   LMSG  LACOPY ;  : RAPMSG RMSG  RACOPY ;
    4 : DBLANK   LBLANK RBLANK ;
    5 : LCOOK   LCSEC  LPDIS TIME/D   COOC LAMSG ;
    6 : RCOOK   RCSEC  RPDIS TIME/D   COOC RAMSG ;
    7 : LHOLD   1DSEC  LPDIS TIME/D   HOLD LAMSG ;
    8 : RHOLD   2DSEC  RPDIS TIME/D   HOLD RAMSG ;
    9 : DLTEMP   LPDIS  LMT   TEMP    POT LAMSG ;
   10 : DRTEMP   RPDIS  RMT   TEMP    POT RAMSG ;
   11 : DLPTEMP  LPDIS  LPT TEMP LPDIS 3 + DUP C@ 128 - SWAP C! ;
   12 : DRPTEMP  RPDIS  RPT TEMP RPDIS 3 + DUP C@ 128 - SWAP C! ;
   13 : DBOIL   BOIL  LMSG  BOIL  RMSG  ;
   14 LOK
   15
298 LIST
    0
    1 : LLO    O-LO LMSG   ( POT LMSG) ;
    2 : RLO    O-LO RMSG   ( POT RMSG) ;
    3 : LHI    O-HI LMSG   ( POT LMSG) ;
    4 : RHI    O-HI RMSG   ( POT RMSG) ;
    5 : LGDIS    LPDIS GDIS  LACOPY ;
```

```
      6 : RGDIS    RPDIS GDIS   RACOPY ;
      7 : TD     @   60   /MOD    DBUFF 1+   C!   DBUFF C! DBUFF ;
      8 VARIABLE   LMTCOR   (  CORRECTED LEFT MEASURED TEMP)
      9 VARIABLE   RMTCOR   (  CORRECTED RIGHT MEASURED TEMP)
     10 VARIABLE   LFIRE
     11 VARIABLE   RFIRE
     12 CVARIABLE  LCTF   ( LEFT TIME CONSTANT FLAG)
     13 CVARIABLE  RCTF   ( RIGHT TIME CONATANT FLAG)
     14 CVARIABLE  BF     ( BOIL FLAG)
     15 LOK
299 LIST
      0 ( LED ROUTINES)    HEX
      1
      2 CODE XLED     T GLO   FF # XOR   2 STR    5 SEX AND    5 STR
      3              5 INC 5 INC   2 LDN   AND 5 STR    POP BR
      4
      5 CODE 1LED    5 SEX    T GLO  OR 5 STR    POP BR
      6
      7 CODE 1LLED   L/LED 5 ALD   ' 1LED   BR
      8 CODE 0LLED   L/LED 5 ALD   ' XLED   BR
      9 CODE 1RLED   R/LED 5 ALD   ' 1LED   BR
     10 CODE 0RLED   R/LED 5 ALD   ' XLED   BR
     11 CODE LFLED   L/FLED 5 ALD  ' 1LED   BR
     12 CODE RFLED   R/FLED 5 ALD  ' 1LED   BR
     13 CODE ?LRLED    T GLO   6 # SM  DFL NOT IF  T PLO  THEN  NEXT
     14 LOK
     15
300 LIST
      0 ( DISPLAY PROGRAM MODE)    HEX
      1 CODE C/F/DIS   LPDIS 1+   5 ALD   E6 # LD 5 STR   5 INC
      2                CB # LD 5 STR   RPDIS 1+   5 ALD
      3                E6 # LD 5 STR   5 INC    CE # LD 5 STR NEXT
      4
      5 : DCODE     DBLANK    *CODE   LAPMSG
      6               2F 0LLED   2F 0RLED   1  ( FOR P/STAT ) ;
      7 : DC/F   DBLANK   C/F/DIS   LACOPY RACOPY  1 LFLED   20  RFLED ;
      8 : D1SP   DBLANK    1-SP    LAPMSG    RPDIS LPT TEMP    RACOPY
      9             1 0LLED    20 0RLED ;
     10 : D2SP   DBLANK    2-SP    LAPMSG    RPDIS RPT   TEMP
     11    RACOPY         ;
     12 : SELPD   DBLANK    SELP  LAPMSG    LACOPY ;
     13 : SENSD   DBLANK   RPDIS #SP@  RACOPY   SENS  LMSG    LACOPY ;
     14 LOK
     15
301 LIST
      0 ( NON VOLITLE RAM READ)    HEX
      1 FORTH 8000 EQU   NVR HOST
      2 CODE  GETNVR         PUSH USE   NVR 7 RLD
      3                      #NVR A/LO # LD   5 PLO 5 SEX
      4                      BEGIN   7 LDA 0F # AND 5 STR
      5    ( SENS DONE ?)    5 INC 7 GLO 0C # XOR   0= END
      6    ( TIME/TEMP)      BEGIN   7 LDA 0F # AND 5 STR ( HIGH BYTE)
      7    ( SHIFT HI)       5 INC 7 LDA SHL SHL SHL SHL  5 STR
      8    ( NOW LO NIB)     7 LDA  0F # AND   OR 5 STR
      9    ( TIMES DONE)     5 INC 7 GLO 42 # XOR 0= END
     10    ( CONTROL BYTE)   7 LDA SHL SHL SHL SHL   5 STR
     11                      7 LDA  0F # AND  OR 5 STR 5 INC
     12    ( TEST NIBBLES)   BEGIN 7 LDA 0F # AND 5 # XOR 2 STR
     13                      7 GLO 46 # XOR 0= END
     14    ( ANY ERRORS)     2 LDN 0= NOT  IF 1 # LD
     15                  THEN   T PLO   0#LD  T PHI   NEXT 5 SPACES LOK
302 LIST
      0 ( NON-VOLITLE RAM WRITE)    HEX
```

```
  1
  2 CODE   PUTNVR              NVR 7 RLD    1SENS A/LO # LD 5 PLO  5 SEX
  3                    BEGIN   5 LDA 7 STR 7 INC 7 GLO 0C # XOR 0= END
  4    ( TIME/TEMP) BEGIN      5 LDA 0F # AND 7 STR  7 INC
  5                            5 LDN  SHR SHR SHR SHR  7 STR  7 INC
  6                            5 LDA  0F # AND   7 STR  7 INC
  7    ( FINISH ?)             7 GLO 42 # XOR    0= END
  8    ( CTRL BYTE)            5 LDN  SHR SHR SHR SHR  7 STR  7 INC
  9                            5 LDA  0F # AND  7 STR  7 INC
 10    ( TEST NIBBELS)         5 # LD  7 STR  7 INC  7 STR
 11    ( STORE STROBE)         7 SEX C000 7 RLD  1 INP    NEXT
 12
 13 5 SPACES LOK
 14
 15
303 LIST
  0 ( NON VOLITLE RAM READ)    FORGET NVR    HEX
  1 FORTH 9000 EQU  NVR HOST
  2 0FF #CODE  GETNVR           PUSH USE  NVR 7 RLD
  3                            #NVR A/LO # LD  5 PLO 5 SEX
  4                            BEGIN  7 LDA 0F # AND 5 STR
  5    ( SENS DONE ?)          5 INC 7 GLO 0C # XOR   0= END
  6    ( TIME/TEMP)            BEGIN  7 LDA 0F # AND 5 STR ( HIGH BYTE)
  7    ( SHIFT HI)             5 INC 7 LDA SHL SHL SHL SHL  5 STR
  8    ( NOW LO NIB)           7 LDA  0F # AND  OR 5 STR
  9    ( TIMES DONE)           5 INC 7 GLO 42 # XOR 0= END
 10    ( CONTROL BYTE)         7 LDA SHL SHL SHL SHL  5 STR
 11                            7 LDA  0F # AND  OR 5 STR 5 INC
 12    (.TEST NIBBLES)         BEGIN 7 LDA 0F # AND 5 # XOR 2 STR
 13                            7 GLO 46 # XOR 0= END
 14    ( ANY ERRORS)           2 LDN 0= NOT  IF 1 # LD
 15                            THEN  T PLO  0#LD  T PHI  NEXT LOK
304 LIST
  0 ( NON-VOLITLE RAM WRITE)   HEX
  1
  2 CODE  PUTNVR               NVR 7 RLD    1SENS A/LO # LD 5 PLO  5 SEX
  3                    BEGIN   5 LDA 7 STR 7 INC 7 GLO 0C # XOR 0= END
  4    ( TIME/TEMP) BEGIN      5 LDA 0F # AND 7 STR  7 INC
  5                            5 LDN  SHR SHR SHR SHR  7 STR  7 INC
  6                            5 LDA  0F # AND  7 STR  7 INC
  7    ( FINISH ?)             7 GLO 42 # XOR   0= END
  8    ( CTRL BYTE)            5 LDN  SHR SHR SHR SHR  7 STR  7 INC
  9                            5 LDA  0F # AND  7 STR  7 INC
 10    ( TEST NIBBELS)         5 # LD  7 STR  7 INC  7 STR
 11    ( STORE STROBE)         2 SEX   1 INP    NEXT
 12
 13   LOK
 14
 15
305 LIST
  0 ( IO ROUTINES)    HEX
  1
  2 CODE 0FRYER       IOBYTE 5 ALD 5 SEX   T GLO FF # XOR   AND 5 STR
  3                   2 OUT   POP BR
  4
  5 CODE 1FRYER       IOBYTE 5 ALD 5 SEX   T GLO OR 5 STR   2 OUT
  6                   POP BR
  7
  8 CODE  RFLAGS  T GLO  7 PLO  S  T RALD  T SEX
  9          BEGIN  0#LD STXD 7 DEC 7 GLO 0= END POP BR
 10
 11
 12    LOK
```

```
      13
      14
      15
306 LIST
      0 ( IO ROUTINES)
      1
      2 : ?LALARMS   0  RPF  C@  IF  DROP  1  ELSE  RBPF  C@  IF  DROP
      3       1  ELSE  RHPF  C@  IF  DROP  1  THEN  THEN  THEN   ;
      4 : ?RALARMS   0  LPF  C@  IF  DROP  1  ELSE  LBPF  C@  IF  DROP
      5       1  ELSE  LHPF  C@  IF  DROP  1  THEN  THEN  THEN   ;
      6 : ROFF  3 ( POT) RESET  FLAG  29 +   12  RFLAGS  DROP
      7       0  BF  C!  0  RPF  C!  0  RBPF  C!  0  RHPF  C!
      8    ?LALARMS 0= IF 0 AL/FLAG C! THEN 40 0FRYER 63 0RLED RBLANK ;
      9
     10 : LOFF  3 ( POT) RESET  FLAG  17 +   12  RFLAGS  DROP
     11       0  BF  C!  0  LPF  C!  0  LBPF  C!  0  LHPF  C!
     12    ?RALARMS 0= IF 0 AL/FLAG C! THEN 80 0FRYER 63 0LLED LBLANK ;
     13   LOK
     14
     15
307 LIST
      0
      1
      2   LOK
      3
      4
      5
      6
      7
      8
      9
     10
     11
     12
     13
     14
     15
308 LIST
      0 ( ADC BLOCK 1)
      1 CVARIABLE    BADPROBE
      2 CODE IDLE    00 C, NEXT
      3 : */SLOPE  CH1 @   CH0 @  -  1000  372 */   SLOPE  !  ;
      4 : */XMT   ( XMT - XCH)  @ CH0 @ -  1000  SLOPE @  */
      5        32   +       SWAP  !  ;
      6 : O/S-TEST   DUP @ 460 >  IF DUP 0 SWAP ! THEN
      7              DUP @ 32 <  IF  DUP 0 SWAP ! THEN  DROP ;
      8   HEX
      9 CODE CH-SELECT  00 C,  A/STAT 5 ALD   IOBYTE 7 RLD  7 SEX
     10       7 LDN F8 # AND 7 STR  5 LDN  OR 7 STR 2 OUT   NEXT
     11
     12   LOK
     13
     14
     15
309 LIST
      0 ( ADC BLOCK 2/3)    HEX
      1
      2 : IADC     CH-SELECT  80 A/STAT C! ; ( START CH0 FIRST)
      3 : 0ADC     CH-SELECT  GASTAT 80 OR A/STAT C! ; ( COUNT CH. #)
      4 : 6ADC    */SLOPE  RMT  CH2 */XMT    LMT  CH3 */XMT
      5     1POT  CH4 */XMT  2POT  CH5 */XMT
      6        LMT  O/S-TEST  RMT  O/S-TEST
      7        0  A/STAT C!  CH-SELECT  80 . ;
```

```
        8    LOK
        9
       10
       11
       12
       13
       14
       15
310 LIST
        0 ( ADC 3/3 )
        1
        2
        3
        4 : ?ADC  GASTAT  128  AND  0= IF  33 ( IDF) BIT
        5    IF  6 A/STAT C!  0ADC  ELSE  GASTAT  6 < IF
        6    0ADC  ELSE  6ADC  A/STAT C!  THEN  THEN  THEN  ;
        7
        8 LOK
        9
       10
       11
       12
       13
       14
       15
311 LIST
        0 ( COOK INTEGRATOR )  DECIMAL
        1 : GLSELP-   GLSELP 1- ;
        2 : GRSELP-   GRSELP 1- ;
        3 : MMIN     @    60    /MOD ;
        4 : LSENS    GLSELP-    1SENS + ;
        5 : RSENS    GRSELP-    1SENS + 6 + ;
        6 : STIME    2*  1TIME  +  +  MMIN  150 ;
        7 : LTIME  0  GLSELP-  STIME LCTIC C!  LCMIN C!  LCSEC C! ;
        8 : RTIME  12  GRSELP-  STIME RCTIC C!  RCMIN C!  RCSEC C! ;
        9 : LTD  GLPT  GLMT  - ;  : RTD  GRPT  GRMT  - ;
       10 : ?RHTIME  RHTIME  MMIN  2DMIN C!   2DSEC C! ;
       11 : ?LHTIME  LHTIME  MMIN  1DMIN C!   1DSEC C! ;
       12
       13  LOK
       14
       15
312 LIST
        0
        1 : GLSEN  LSENS C@ ;    : GRSEN  RSENS C@ ;
        2 : SQUARE  DUP * ;
        3 : ICOOK   BADPROBE  C@  1 = IF  DROP  75  ELSE
        4    DUP  7 < IF  DROP  7  ELSE  DUP  255  >
        5     IF  DROP  255  THEN  THEN  THEN ;
        6 : KOP  M*   340   M/MOD  SWAP   DROP  SWAP
        7    0 < IF  -1  *  THEN  75  + ICOOK ;
        8 : ILCOOK  LTD  DUP  SQUARE  GLSEN  SQUARE  KOP  LRTIC C! ;
        9 : IRCOOK  RTD  DUP  SQUARE  GRSEN  SQUARE  KOP  RRTIC C! ;
       10 LOK
       11
       12
       13
       14
       15
313 LIST
        0 ( INITIALIZE 1/2)    HEX
        1
        2
```

```
  3
  4 CODE   ICPU               5 SEX
  5      ( ZERO RAM)          42FF 5 RLD    ( HIGH PAGE RAM FOR STACKS)
  6                           0#LD 0 PHI 0 PLO
  7          BEGIN BEGIN      0#LD  STXD  5 GLO  0= END
  8                           5 GHI    40 # XOR   0= END    5 STR
  9                           5 GHI    6 PHI   2 PHI    ISTACK 2 ALD
 10                           NEXT
 11
 12
 13 LOK
 14
 15
314 LIST
  0 ( INITIALIZE 1/2)      HEX
  1
  2  FORGET  ICPU
  3
  4 CODE  ICPU              P SEX
  5      ( SELECT GROUP)    80 # 1 OUT
  6                         5 SEX
  7      ( ZERO RAM)        A2FF 5 RLD    ( HIGH PAGE RAM FOR STACKS)
  8                         0#LD 0 PHI 0 PLO
  9          BEGIN BEGIN    0#LD  STXD  5 GLO  0= END
 10                         5 GHI    A0 # XOR   0= END    5 STR
 11                         5 GHI    6 PHI   2 PHI    ISTACK 2 ALD
 12                         P SEX 1 # 1 OUT    NEXT
 13
 14
 15 LOK
315 LIST
  0 ( DEMONSTRATION LOAD BLOCK  1/3)
  1
  2 : HOLD-DISP  300  0  DO ?ADC  LOOP  ;
  3 : DISIT   RMSG  HOLD-DISP ;
  4 : ADEMO    ALARMS LMSG  POT DISIT HOT DISIT  BAD DISIT ;
  5 : PDEMO    PROG  LMSG *CODE DISIT  DEGREE DISIT 1-SP DISIT
  6   HOLD  DISIT SHAKE  DISIT  SENS   DISIT COOK DISIT
  7   EROR  DISIT  ;
  8 : ODEMP  OPRATE  LMSG  CYCL DISIT  BOIL  DISIT
  9    O-LO  DISIT  RGDIS  HOLD-DISP  O-HI  DISIT
 10   COOK  DISIT  SHAKE  DISIT  HOLD  DISIT RGDIS   ;
 11 : VOCAB  ADEMO  PDEMO  ODEMO  ;
 12
 13
 14  LOK
 15
316 LIST
  0
  1 HEX
  2 CREATE $TAB  01 C,  02 C,  04 C,  08 C,  10 C,  20 C,  40 C,  80 C,
  3 Z
  4 : ~L#   GLSELP-   $TAB  +  C@ ;
  5 : ~R#   GRSELP-   $TAB  +  C@ ;
  6
  7 : LCAN  ~L# 0LLED ;
  8 : RCAN  ~R# 0RLED ;
  9
 10 : CLLED   LCAN   ~L# 1LLED ;
 11 : CRLED   RCAN   ~R# 1RLED ;
 12
 13 : CFLLED   LCAN   ~L# LFLED ;
 14 : CFRLED   RCAN   ~R# RFLED ;
```

```
    15  LOK
317 LIST
     0   ( DEMONSTRATION LOAD BLOCK  2/3)
     1
     2 : SHORT-DISP  75 0  DO  ?ADC  LOOP  ;
     3
     4 : EXLED  7 1 DO  I  DUP  L#SELP C!  R#SELP C!
     5    CLLED  CRLED  SHORT-DISP  LCAN  RCAN  LOOP  ;
     6
     7 : SEG-LOOP  4 0  DO  2DUP  I + C!  SHORT-DISP  DBLANK
     8    OVER  255 = IF  2 AUTIC C!  THEN LOOP  DROP  DROP  ;
     9
    10 : SEQ-SEG  DUP  LPDIS  SEG-LOOP  RPDIS  SEG-LOOP  ;
    11
    12 : EXSEG   DBLANK  192 SEQ-SEG  160 SEQ-SEG  144 SEQ-SGG
    13    128 SEQ-SEG  136 SEQ-SEG  130  SEQ-SEG  132  SEQ-SEG
    14    0  SEQ-SEG  255 SEQ-SEG  ;
    15  LOK
318 LIST
     0   ( DEMONSTRATION LOAD BLOCK  2/3)
     1
     2 : EXOUT  8 1FRYER   HOLD-DISP  8 0FRYER
     3         16 1FRYER   HOLD-DISP 16 0FRYER
     4         32 1FRYER   HOLD-DISP 32 0FRYER
     5         64 1FRYER   HOLD-DISP 64 0FRYER ;
     6
     7 : EXDIS  EXSEG   EXOUT   EXLEX  ;
     8
     9 : DEMO  ?KEY  BEGIN   VOCAB  EXDIS  GKEY  END  ?KEY
    10    LGDIS  RGDIS
    11    2 ( PROG)  RESET    0  ( FOR P/STAT)  ;
    12  LOK
    13
    14
    15
319 LIST
     0
     1
     2
     3
     4
     5
     6
     7
     8
     9
    10  LOK
    11
    12
    13
    14
    15
320 LIST
     0 ( INITIALIZE 2/2)
     1
     2 : T/CHECK   )R   I @ 200 ( IF  350 I !   THEN  I @ 375 ) IF
     3          350 I !   THEN  R) DROP ;
     4
     5 : ILEDS   128 L/LED C!  64 R/LED C! ;
     6
     7 : S/CHECK  1SENS  12 0  DO  DUP  I + C@
     8    9 ) IF  5 OVER  I + C!  THEN  LOOP  DROP  ;
     9
```

```
    10 : SETUP   ICPU  GETNVR   IF 1 ( ITON) SET THEN
    11   S/CHECK DBLANK   D/ON  LPT  T/CHECK   RPT T/CHECK
    12      6 LBURN C!  6 RBURN C!   IENABLE   IADC    ILEDS
    13    4 ( IPON) SET  33 ( IDF ) SET ;
    14 LOK
    15
321 LIST
     0  ( FIRE CONTROL BLOCK)
     1
     2 : FIREON  0  SWAP  2DUP  C!  1+  C!  1FRYER  ;
     3
     4 : COMT   DUP  C@  SWAP 1+  C@  60 *  + ;
     5
     6 : LRFI  G7 ( LON) IF  16  LFSEC  FIREON  THEN  ;
     7
     8 : RRFI  G19 ( RON)  IF  8   RFSEC  FIREON THEN  ;
     9
    10 : ?LFIRE LFSEC COMT LFIRE  @  ) IF   LRFI 1 LCTF C!
    11   ELSE  LFSEC COMT  LBURN  C@  ) IF
    12     0  LCTF  C!   G10 ( LCOOK)  0= IF
    13    16  0FRYER      THEN THEN  THEN  ;
    14 LOK
    15
322 LIST
     0  ( FIRE CONTROL BLOCK)
     1
     2
     3 : ?RFIRE RFSEC COMT RFIRE  @  ) IF  RRFI 1 RCTF C!
     4   ELSE  RFSEC COMT  RBURN  C@  ) IF
     5     0  RCTF  C!   G22 ( RCOOK) 0= IF
     6     8  0FRYER       THEN THEN  THEN  ;
     7 LOK
     8
     9
    10
    11
    12
    13
    14
    15
323 LIST
     0 ( FIRE CONTROL BLOCK)
     1 CVARIABLE  LBN  ( ALLOW LEFT FIRE ON FLAG)
     2 CVARIABLE  RBN  ( ALLOW LEFT FIRE ON FLAG)
     3 CVARIABLE  RFIRED  ( RIGHT FIRE TURNED ON FLAG)
     4 CVARIABLE  LFIRED  ( LEFT FIRE TURNED ON FLAG)
     5
     6 : ?LNOF  0  G7 ( LON) 0= IF DROP 1
     7    ELSE  LPF  C@    IF  DROP 1
     8     ELSE  LHPF  C@    IF  DROP 1
     9      ELSE  LBPF  C@    IF  DROP 1
    10       ELSE GLMT  GLPT   4 +   ) IF   DROP  1
    11        ELSE  LBN  C@  0=  IF  DROP  1
    12   THEN  THEN  THEN  THEN  THEN  THEN  ;
    13
    14 LOK
    15
324 LIST
     0  ( FIRE CONTROL BLOCK)
     1
     2 : ?RNOF  0  G19 ( RON) 0= IF DROP 1
     3    ELSE  RPF  C@    IF  DROP 1
     4     ELSE  RHPF  C@   IF  DROP  1
```

```
    5       ELSE  RBPF  C@  IF  DROP  1
    6     ELSE  GRMT  GRPT  4  +   )  IF   DROP  1
    7    ELSE  RBN  C@  0=  IF  DROP  1
    8   THEN   THEN   THEN   THEN   THEN   THEN  ;
    9
   10 : ?FIRE   ?LNOF  0=  IF  ?LFIRE
   11     ELSE   16  @FRYER  @  LCTF  C!  THEN
   12     ?RNOF  0=  IF  ?RFIRE
   13     ELSE  8  @FRYER  @  RCTF  C!  THEN  ;
   14
   15 LOK
325 LIST
    0
    1 : RMELT  GRMT  180  )  IF  20  ( RMELT)  RESET
    2    26  RFIRE !  26  RBURN  C!  THEN ;
    3
    4 : LMELT  GLMT  180  )  IF  8  ( LMELT)  RESET
    5    26  LFIRE !  26  LBURN  !  THEN ;
    6
    7 : ?MELTING  G8  IF  LMELT  THEN
    8              G20  IF  RMELT  THEN ;
    9
   10 : ALLOFF   ROFF   LOFF   D/OFF  2 RESET 0 P/STAT C!
   11    SETUP  ;
   12 LOK
   13
   14
   15
326 LIST
    0
    1 HEX
    2 4500 ORG
    3
    4
    5
    6
    7
    8
    9
   10
   11   LOK
   12
   13
   14
   15
327 LIST
    0 ( PROGRAM MODE BUFFER ROUTINES)  HEX
    1
    2 CVARIABLE  P#KEYS
    3 CVARIABLE  POINTER
    4 CVARIABLE  KEY-BUFFER   3 ALLOT
    5
    6 : ERROR  2 ( PROG) RESET  5 ( ERROR)  SET ;
    7 : D/FORC  FORC C@  203 = IF RGDIS ELSE LGDIS THEN ;
    8 : P/NEXT  GPSTAT 1+  P/STAT C! ;
    9
   10  LOK
   11
   12
   13
   14
   15
```

```
328 LIST
    0 ( PROGRAM MODE BUFER ROUTINES)
    1 : ?FORC   FORC C@ 203 = IF 18 * 10 / 32 + THEN ;
    2
    3 : TCOM    KEY-BUFFER 1+ DUP 1+ DUP 1+ C@ SWAP
    4           C@ 10 * + SWAP C@ 100 * + ;
    5
    6 : STOREIT  TCOM   DUP 0= IF DROP  ELSE
    7   GPSTAT DUP 7 = IF  DROP  ?FORC -LPT !
    8   ELSE  9 =  IF  ?FORC RPT !
    9   THEN THEN  THEN P/NEXT ;
   10
   11 CODE CBUF  T SEX  0#LD STXD STXD STXD STXD STXD NEXT
   12
   13 Z
   14 : CLRBUFFER   KEY-BUFFER 3 +  CBUF  C! RBLANK ;
   15 LOK
329 LIST
    0 ( PROGRAM MODE 1/3)    HEX
    1 CREATE  PKEY   2 C, 7 C, 6 C,    0B C, 5 C,.    3 C, 21 C,
    2               4 C, 22 C, 0A C, 29 C,   0 C,
    3 40 #CODE  CHECK    PUSH USE P/STAT T RLD  T LDN T PLO T PHI
    4 ( GET P/STAT)  *KEY 5 ALD 5 LDN  0= NOT IF
    5 ( PREPARE)    PKEY 1- 7 RLD   7 SEX
    6 ( INDEX)      BEGIN   T DEC 7 INC   T GLO 0= END
    7 ( COMPARE)    5  LDN   XOR 0=  IF
    8 ( DISPLAY -)  RPDIS 1- 5 ALD   T GHI T PLO   5 GHI 7 PHI
    9              RADIS 1- 7 ALD
   10 ( INDEX)     BEGIN   T DEC 5 INC 7 INC   T GLO 0= END
   11 ( STR - )    84 # LD 5 STR   7 STR
   12 ( SET NEXT)  T GHI T PLO T INC
   13 ( ELSE ERROR) ELSE   80 # LD T PLO
   14 ( DONE )     THEN THEN   0#LD T PHI   NEXT  LOK
   15
330 LIST
    0 ( PROGRAM MODE 2/ )    HEX
    1
    2 ( CHECK FOR  CELSIUS OR FAERENHIET )
    3 30 #CODE S/FORC   PUSH USE   *KEY T RLD T LDN T PLO 0#LD T PHI
    4              2 STR  FORC 5 ALD   T GLO 1 # XOR 0= IF
    5              CB # LD 2 STR   ELSE   T GLO 0C # XOR  0= IF
    6              CE # LD 2 STR THEN THEN 2 LDN 0= IF 5 # LD T PLO
    7              ELSE  5 STR   6 # LD T PLO   THEN   NEXT
    8
    9 ( SEARCH FOR PROGRAM FUNCTION IE PROGRAM, DIAGNOSTICS, ETC )
   10 20 #CODE PSEARCH   PUSH USE  PKEY 3 + 7 RLD  7 SEX
   11            *KEY T RLD T LDN T PLO  0#LD T PHI
   12     BEGIN   T GLO XOR 0= IF   7 INC 7 LDN T PLO NEXT
   13     THEN   7 INC 7 INC  7 LDN 0= END
   14            80 # LD T PLO   NEXT ( LOAD ERROR #)
   15 LOK
331 LIST
    0 ( SENSITIVITY PROGRAMING MODE)
    1
    2 : SENS/P  GKEY DUP 13 = IF DROP GPSTAT 1+ ELSE DUP
    3   14 = IF DROP  ELSE DUP 1 = IF DROP  ELSE
    4   DUP 12 = IF DROP  ELSE 1- DUP 10 = IF 0 SWAP DROP
    5   THEN  GSELP 1- #NVR + C! RPDIS #SP@ RACOPY
    6   THEN THEN THEN  GPSTAT THEN ;
    7
    8
    9
   10   LOK
```

```
    11
    12
    13
    14
    15
332 LIST
    0
    1 : RESTOR   DBLANK  G7 ( LON)   IF LGDIS
    2     THEN  G19  ( RON)    IF RGDIS THEN ;
    3 : DSELP   SELP LAPDIS  SELP RAPDIS 63  0LLED 63 0RLED    ;
    4 : PEXIT   2 ( PROG) RESET 0 P/STAT C! 55 TEST C!
    5     RESTOR  PUTNVR GPSTAT ;
    6 : PSEL,  GKEY 13 = IF GPSTAT ELSE
    7     GKEY 14 = IF PEXIT   ELSE   GKEY DUP  P#SELP C!
    8       DUP  7 ( IF $TAB  1-  + C@  1LLED
    9       ELSE 6 - $TAB  1-  + C@  1RLED   THEN GPSTAT 1+
   10     THEN THEN   ;
   11
   12  LOK
   13
   14
   15
333 LIST
    0
    1 CVARIABLE  DREC  ( DISPLAY RECOVERY TIME FLAG)
    2 : D/REC DBLANK  G7  ( LON)   IF  DLRT  LPDIS  TIME/D  THEN
    3     G19 ( RON) IF DRRT RPDIS TIME/D  THEN
    4     30  TICPOT  C!
    5     1 DREC  C!  2 ( PROG)  RESET  DROP  0 ( FOR P/STAT) ;
    6 : BOILIT   195 LPT  !  195 RPT  !  1  BF  C!
    7     7 ( LON) SET  19 ( RON) SET
    8     8 ( LMELT) RESET  20  ( RMELT) RESET
    9     2 ( PROG) RESET DROP  0 ( FOR P/STAT)  ;
   10 : KSTORE  KEY-BUFFER  DUP  C@  10  *  SWAP  1+
   11     C@ +   60 *  KEY-BUFFER 2+ DUP  C@ 10  *
   12     SWAP 1+  C@ +  + DUP 3600 > IF  DROP  3600
   13     THEN  SWAP  !  ;
   14 LOK
   15
334 LIST
    0 ( PROGRAM MODE BUFFER ROUTINES)
    1   2 CVARIABLE  DOKEYS
    2
    3 : HSTORE  DOKEYS C@  IF  GSELP 1 = IF
    4     LHTIME   KSTORE   ELSE RHTIME  KSTORE
    5     THEN THEN  P/NEXT ;
    6
    7 : SSTORE  DOKEYS C@  IF GSELP 1 = IF
    8     LSTIME KSTORE   ELSE RSTIME  KSTORE
    9     THEN  THEN  10  P/STAT  C!  DSELP ;
   10
   11 : CSTORE  DOKEYS C@  IF GSELP 1-  2*   1TIME +
   12     KSTORE    THEN P/NEXT ;
   13  LOK
   14
   15
335 LIST
    0
    1 : TDX   KEY-BUFFER  DUP  C@  10  *  SWAP  1+
    2     C@  +  DBUFF 1+ C!  KEY-BUFFER  2+  DUP  C@  10  *
    3     SWAP  1+  C@  +  DBUFF  C!  DBUFF  ;
    4
    5 : SHOWIT  TEMPDIS  DUP GPSTAT 12 > IF   KSTORE
```

```
      6      TDX   RPDIS TIME/D  RACOPY    ELSE
      7      TCOM  SWAP ! RPDIS SWAP TEMP RACOPY THEN ;
      8
      9 : RDK   0  DOKEYS C! ;
     10
     11 : P>12   P#KEYS C@ CLRBUFFER RDK RBLANK ;
     12 LOK
     13
     14
     15
336 LIST
      0
      1 : SAVE  GPSTAT 13 = IF  CSTORE RDK ELSE  GPSTAT
      2    15 = IF  HSTORE RDK ELSE GPSTAT  17 = IF SSTORE RDK
      3    ELSE STOREIT THEN THEN THEN ;
      4 : D/H    HOLD LAPMSG ;
      5 : D/S    SHAKE LAPMSG ;
      6 : DSHT  TD  RPDIS  TIME/D  RACOPY ;
      7 : HOLD/D   GSELP 1 = IF LHTIME DSHT  D/H ELSE
      8            GSELP 12 = IF RHTIME DSHT D/H ELSE
      9            10 P/STAT C!  DSELP  GPSTAT  THEN THEN ;
     10 : SHAKE/D  GSELP  1 = IF  LSTIME  DSHT  D/S ELSE
     11            GSELP  12 = IF RSTIME DSHT   D/S  ELSE
     12            10 P/STAT C! DSELP  GPSTAT  THEN  THEN ;
     13 LOK
     14
     15
337 LIST
      0 ( PROGRAM MODE BUFFER ROUTINES)
      1
      2 : SHOVE   KEY-BUFFER  DUP 1+  3  0  DO  2DUP I  +
      3    C@  SWAP  I  +  C!  LOOP  DROP  3 + C! ;
      4
      5 : BUFFER  GKEY  13 = IF SAVE  ELSE  GKEY  14 = IF P>12
      6    ELSE GKEY 1 = NOT IF GKEY 12 = NOT IF
      7    POINTER C@ P#KEYS C@ = IF P>12 THEN
      8      GKEY 1  -    DUP 10 = IF DROP 0 THEN SHOVE
      9      SHOWIT GPSTAT 12 > IF 1 DOKEYS C! THEN
     10      POINTER DUP C@ 1+ SWAP C!
     11    THEN THEN THEN  THEN  GPSTAT ;
     12
     13
     14 LOK
     15
338 LIST
      0
      1
      2 : COOK/D  RBLANK GSELP   1-  2*  1TIME +  TD  RPDIS
      3    TIME/D  RACOPY  COOK LAPMSG ;
      4
      5 : CLIT    CLRBUFFER  P/NEXT BUFFER ;
      6
      7 : C1PREP  4 CLIT ;
      8
      9 : 1TPREP   3 CLIT ;
     10
     11
     12 LOK
     13
     14
     15
```

```
339 LIST
    0    ( PROGRAM MODE 3/3)
    1
    2 CREATE  P/JUMP    ' DCODE , ' CHECK , ' CHECK , ' CHECK ,
    3                   ' PSEARCH , ' S/FORC ,
    4                   ' 1TPREP , ' BUFFER , ' 1TPREP , ' BUFFER ,
    5                   ' PSELP , ' SENS/P , ' C1PREP , ' BUFFER ,
    6                   ' C1PREP , ' BUFFER , ' C1PREP , ' BUFFER ,
    7                   ' ERROR ,
    8   LOK
    9
   10
   11
   12
   13
   14
   15
340 LIST
    0    ( PROGRAM MODE 3/3 )
    1
    2 : PROGRAM   GPSTAT   2*   P/JUMP   +   @   EXECUTE
    3    DUP  5 = IF  DC/F ELSE   DUP  6 = IF  D1SP
    4     ELSE DUP 8 = IF D2SP  P/NEXT
    5      ELSE DUP 10 = IF DSELP ELSE DUP 11 = IF SENSD
    6       ELSE DUP 12 = IF  COOK/D ELSE DUP 14 = IF HOLD/D
    7        ELSE  DUP  16  =  IF  SHAKE/D
    8         ELSE  DUP  33  ( HEX 21)  =  IF  D/REC
    9         ELSE  DUP  34  ( HEX 22)  =  IF  BOILIT
   10        ELSE  DUP  41  ( HEX 29)  =  IF  DEMO
   11       ELSE  DUP  128 = IF ERROR  DROP  0  THEN THEN
   12      THEN THEN  THEN THEN THEN  THEN  THEN  THEN  THEN  THEN
   13    P/STAT C! ;
   14
   15 LOK
341 LIST
    0    ( PROGRAM MODE 3/3 )
    1 FORGET PROGRAM
    2 : PROGRAM   GPSTAT   2*   P/JUMP   +   @   EXECUTE
    3    DUP  5 = IF  DC/F ELSE  DUP  6 = IF  D1SP
    4     ELSE DUP 8 = IF D2SP  P/NEXT
    5      ELSE DUP 10 = IF DSELP ELSE DUP 11 = IF SENSD
    6       ELSE DUP 12 = IF  COOK/D ELSE DUP 14 = IF HOLD/D
    7        ELSE  DUP  16  =  IF  SHAKE/D
    8         ELSE  DUP  33  ( HEX 21)  =  IF  D/REC
    9         ELSE  DUP  34  ( HEX 22)  =  IF  BOILIT
   10        ELSE  DUP  41  ( HEX 29)  =  IF  DEMO
   11       ELSE  DUP  128 = IF ERROR  DROP  0  THEN THEN
   12      THEN THEN  THEN THEN THEN  THEN  THEN  THEN  THEN  THEN
   13    DUP  *KEY C@ RCA CR .  4 SPACES  .  TAR
   14    P/STAT C! ;
   15 LOK
342 LIST
    0  ( KEYSTROKE PROCESS ROUTINES)
    1
    2 : DRHE  )R  0  SWAP  GKEY  =  IF I ( RHE) GIT
    3        IF DROP  1   THEN    THEN R) DROP   ;
    4
    5 : ?FRHE  12  24  DRHE ;
    6
    7 : ?FLHE  1   12  DRHE ;
    8
    9 : D#SELP    OVER = NOT IF  0  ELSE  1 THEN ;
   10
```

```
     11 : ?L#SELP    GLSELP    D#SELP ;
     12
     13 : ?R#SELP    GRSELP    D#SELP ;
     14
     15  LOK
343 LIST
      0 ( KEYSTROKE PROCESS ROUTINES)      Z
      1 : PKL   1 ( ITON) RESET  2 ( PROG) SET DCODE  P/STAT C! ;
      2 : ?KLPROG  1 ( ITON) GIT  IF  PKL   ELSE GLMT 180 ( IF
      3     6 ( LMELT) SET THEN   THEN  ;
      4 : ?KRPROG  1 ( ITON) GIT IF PKL   ELSE GRMT 180 ( IF
      5     20 ( RMELT) SET THEN   THEN   ;
      6 : ?ALL  G2 ( PROG) IF ALLOFF THEN
      7      BF  ( BOIL) C@ IF  ALLOFF THEN  ;
      8 : RALARMS/OFF   0 RBPF C! 0 RHPF C! 0 RPF C! LBPF C@  0= IF
      9   LHPF C@ 0= IF LPF  C@  0= IF  0 AL/FLAG C!
     10  THEN   THEN  THEN   ;
     11 : LALARMS/OFF   0 LBPF C! 0 LHPF C! 0 LPF C! RBPF C@ 0=
     12    IF  RHPF C@ 0= IF  RPF C@ 0= IF 0 AL/FLAG C!
     13  THEN   THEN   THEN   ;
     14
     15 LOK
344 LIST
      0     ( KEYSTROKE PROCESS ROUTINES)
      1 CVARIABLE  FION  ( TEMP ON FLAGS)
      2 : *KLON  G2 ( PROG) 0= IF 7 ( LON) SET ?KLPROG 0   BF   C!
      3    GETNVR DROP  LALARMS/OFF   26 LFIRE !  0  LSSEC C!
      4     22 LFSEC C!  G19 ( RON) 0= IF  2 AUTIC C!  G19 ( RON) 0= IF
      5     20 UTIC C!  1 FION  C!  THEN THEN  THEN   ;
      6 : KLON  G7 ( LON) 0= IF *KLON ELSE LHPF C@ IF LPF C@ IF
      7     19 ( RON) RESET THEN THEN G19 ( RON) 0= IF
      8   ALLOFF 33 ( IDF) SET ELSE ?ALL LOFF THEN THEN ;
      9 : *KRON  G2 ( PROG) 0= IF 19 ( RON) SET ?KRPROG 0   BF   C!
     10    GETNVR DROP  RALARMS/OFF    26 RFIRE !  0 RSSEC C!
     11     22 RFSEC C!  G7 ( LON) 0= IF  2 AUTIC C! G7 ( LON) 0= IF
     12     20 UTIC C!  1 FION C!  THEN THEN   THEN   ;
     13 : KRON G19 ( RON) 0= IF *KRON  ELSE RHPF C@ IF RPF C@ IF
     14     7 ( LON) RESET THEN THEN  G7 ( LON)  0= IF
     15   ALLOFF 33 ( IDF) SET  ELSE ?ALL ROFF THEN THEN ;  LOK
345 LIST
      0 ( KEYBOARD PROCESS ROUTINES  1/   )
      1
      2 : ?LMELT  G2  ( PROG)  0=  IF
      3     G8 ( LMELT)  IF 8 ( LMELT) RESET LGDIS
      4       18 ( LCMELT) SET  1  ELSE  0  THEN  THEN ;
      5
      6 : ?RMELT  G2  ( PROG)  0=  IF
      7     G20 ( RMELT)  IF 20 ( RMELT) RESET RGDIS
      8       30 ( RCMELT) SET  1  ELSE  0  THEN  THEN ;
      9
     10 : ?PROG  G2 ( PROG) IF PROGRAM  1  ELSE  0  THEN  ;
     11
     12  LOK
     13
     14
     15
346 LIST
      0    ( KEYSTROKE PROCESS ROUTINES           )
      1 : NOBELL  0  AUTIC C!  ;
      2
      3 : ?LENDC ?L#SELP 1 = IF 11 ( LCE) GIT  IF 11 ( LCE) RESET
      4     LCAN THEN  THEN  ;
      5
```

```
    6 : ?RENDC ?R#SELP 1 = IF 23 ( RCE) GIT   IF 23 ( RCE) RESET
    7    RCAN  THEN  THEN ;
    8
    9 LOK
   10
   11
   12
   13
   14
   15
347 LIST
    0  ( KEYSTROKE PROCESS ROUTINES          )
    1 : ?LHEND DUP 1 = IF 12 ( LHE) GIT    IF 1 0LLED
    2    12 ( LHE) RESET NOBELL LCAN LGDIS    THEN THEN ;
    3
    4 : ?RHEND DUP 6 = IF 24 ( RHE) GIT.   IF 1 0RLED
    5    24 ( RHE) RESET NOBELL RCAN RGDIS   THEN THEN ;
    6
    7 CVARIABLE   IRBF  ( RIGHT INITIAL BURN FLAG)
    8 CVARIABLE   ILBF  ( LEFT INITIAL BURN FLAG)
    9
   10 : ?LHEND  12  ( LHHE)  RESET    LGDIS ;
   11 : ?RHEND  24  ( RHHE)  RESET    RGDIS ;
   12
   13 LOK
   14
   15
348 LIST
    0 ( KEYSTROKE  PROCESSING ROUTINES)
    1 : ?SHAKE @ DUP 0= IF DROP 0  ELSE  60  /MOD  1  THEN ;
    2 : LCOOKIT   DUP  1-  2*  1TIME +  @    IF
    3    10 ( LCOOK) SET DUP L#SELP C!  ILCOOK LTIME
    4    1 ILBF C!   64 1FRYER   32  ( LACF)  RESET
    5      CLLED  GLSELP 1 = IF 13 ( LHOLD) RESET
    6    LSTIME  ?SHAKE   IF  1DMIN C!  1DSEC C!
    7    1 LSHAKE C!    THEN   THEN   THEN ;
    8
    9 : RCOOKIT  DUP  1-  2*  12 +  1TIME + @    IF
   10    22 ( RCOOK) SET DUP R#SELP C! IRCOOK RTIME
   11     1 IRBF  C!  32  1FRYER   31 ( RACF). RESET
   12     CRLED  GRSELP 6 = IF  25  ( RHOLD) RESET
   13    RSTIME  ?SHAKE   IF   2DMIN C!  2DSEC C!
   14    1 RSHAKE C!   THEN.  THEN    THEN ;
   15 LOK
349 LIST
    0    ( KEYSTROKE PROCESSING ROUTINES)
    1
    2 : CKTIMRES   3  0  DO  DUP  I  +  @  SWAP   C!  LOOP DROP ;
    3
    4 : CORES  DUP 3 + SWAP DO  I  RESET  LOOP ;
    5
    6 : LCORES    10 ( LCOOK)  RESET  64  0FRYER 0 LSHAKE C!
    7    LRTIC CKTIMRES  10   CORES  LCAN LGDIS ;
    8
    9 : RCORES    22 ( RCOOK) RESET 32 0FRYER 0 RSHAKE C!
   10    RRTIC CKTIMRES  22   CORES RCAN RGDIS ;
   11
   12 LOK
   13
   14
   15
350 LIST
    0    ( KEYSTROKE PROCESSING ROUTINES)
```

```
  1
  2
  3 : ?LCOOK   11 ( LCE) GIT  0= IF ?FLHE 0= IF G10  ( LCOOK)
  4            0= IF   LCOOKIT   ELSE  ?L#SELP  1 = IF LCORES
  5         THEN THEN THEN THEN  ;
  6
  7
  8
  9 : ?RCOOK   23 ( RCE) GIT  0= IF ?FRHE 0= IF G22  ( RCOOK)
 10            0= IF   RCOOKIT   ELSE  ?R#SELP  1 = IF RCORES
 11         THEN THEN THEN THEN  ;
 12  LOK
 13
 14
 15
351 LIST
  0
  1
  2
  3
  4
  5
  6
  7
  8
  9
 10
 11
 12 LOK
 13
 14
 15
352 LIST
  0
  1 : LKP   G7 ( LON) IF  LPF C@  0= IF LHPF C@   0=  IF
  2        ?LCOOK ?LENDC     THEN    THEN    THEN   ;
  3
  4 : RKP   6 -  G19 ( RON)  IF  RPF C@ 0=  IF RHPF C@ 0= IF
  5       ?RCOOK ?RENDC    THEN    THEN    THEN   ;
  6
  7 : KP.  BF C@  0= IF
  8     GKEY DUP 7 < IF LKP  ELSE RKP  THEN DROP  THEN   ;
  9
 10
 11
 12
 13
 14
 15 LOK
353 LIST
  0
  1
  2
  3  LOK
  4
  5
  6
  7
  8
  9
 10
 11
 12
```

```
       13
       14
       15
354 LIST
     0   ( KEYSTROE PROCESS ROUTINES )
     1
     2 : 0KEY ;
     3
     4 : ?OPKEY  ?PROG  IF DROP  ELSE  0= IF KP  THEN THEN ;
     5
     6 : 1KEY    ?LMELT ?OPKEY  ;
     7
     8 : KL   G8 ( LMELT)  ?OPKEY  ;
     9
    10 : KH   G20 ( RMELT)  ?OPKEY ;
    11
    12 : 12KEY  ?RMELT  ?OPKEY     ;
    13
    14 LOK
    15
355 LIST
     0
     1
     2
     3
     4
     5
     6
     7
     8 LOK
     9
    10
    11
    12
    13
    14
    15
356 LIST
     0
     1 : TPOT    30 TICPOT C! ;
     2
     3 : ?DPOT G7 ( LON)   IF DLTEMP   TPOT
     4      THEN G19 ( RON)   IF   DRTEMP   TPOT THEN ;
     5
     6 : ?DPTEMP G7 ( LON)   IF DLPTEMP  TPOT
     7      THEN G19 ( RON)   IF   DRPTEMP  TPOT THEN ;
     8
     9 : ?POT G3 ( POT) 0= IF 3 ( POT) SET   ?DPOT
    10      ELSE ?DPTEMP    THEN ;
    11
    12 : 14KEY   G2 ( PROG)  IF PROGRAM ELSE ?POT THEN DROP ;
    13
    14 LOK
    15
357 LIST
     0
     1 : 13KEY EON IF G10 ( LCOOK) 0= IF 11 ( LCHE) GIT 0= IF
     2      12 ( LHHE) GIT 0= IF  13 ( LHOLD) GIT 0= IF
     3      22 ( RCOOK) GIT  0=  IF 23 ( RCHE) GIT 0= IF
     4      24 ( RHHE) GIT  0=  IF 25 ( RHOLD) GIT 0= IF
     5      BF CB 0= IF G2 ( PROG)  0= IF 2 ( PROG) SET
     6      PROGRAM  ELSE  PROGRAM  THEN THEN THEN THEN THEN THEN
     7      THEN THEN THEN THEN 24 ( RHHE) GIT IF ?RHEND THEN
```

```
     8      12 ( LHHE) GIT IF ?LHEND THEN THEN ;
     9
    10 LOK
    11
    12
    13
    14
    15
358 LIST
     0
     1
     2
     3
     4 : 15KEY  KLON ;
     5
     6 : 16KEY  KRON ;
     7 LOK
     8
     9
    10
    11
    12
    13
    14
    15
359 LIST
     0
     1
     2  CVARIABLE   FEK        ( END OF MAGIC FLAG)
     3
     4  ( THIS IS A TEMP 9 KEY  REMOVE AFTER PROGRAMING CHECKED OUT)
     5 : 9KEY    1 FEK C! ;
     6
     7
     8 : 15KEY   KLON ;
     9
    10 : 16KEY   KRON ;
    11 LOK
    12
    13
    14
    15
360 LIST
     0   ( KEYSTROKE ROUTINES )
     1 CREATE    K/JUMP   ' 0KEY , ' 1KEY , ' KL , ' KL ,
     2                    ' KL , ' KL , ' KL , ' KH ,
     3                    ' KH , ' KH , ' KH , ' KH ,
     4                    ' 12KEY , ' 13KEY , ' 14KEY , ' 15KEY ,
     5                    ' 16KEY ,
     6
     7
     8 : KEYPRO  GKFLAG C@ IF GKEY  2 * K/JUMP +
     9         @ EXECUTE  ?KEY    THEN  ;
    10
    11
    12
    13
    14  LOK
    15
361 LIST
     0   ( KEYSTROKE ROUTINES )
     1 CREATE    K/JUMP   ' 0KEY , ' 1KEY , ' KL , ' KL ,
     2                    ' KL , ' KL , ' KL , ' KH ,
```

```
   3                              ' KH  , ' 9KEY , ' KH  , ' KH  ,
   4                              ' 12KEY , ' 13KEY , ' 14KEY , ' 15KEY ,
   5                              ' 16KEY ,
   6
   7
   8 : KEYPRO  GKFLAG C@ IF SKEY  2  * K/JUMP +
   9       @ EXECUTE  ?KEY    THEN  ;
  10
  11
  12
  13
  14  LOK
  15
362 LIST
   0
   1 : ?CL G10 ( LCOOK)   IF  LSHAKE  C@   IF
   2    1DSEC @  0= IF  0 LSHAKE C!  1 DLSHAKE C!  30 AUTIC C!
   3     100 SHAKETIC C!  LBLANK  SHAKE  LMSG  THEN  THEN
   4      LCSEC C@ 0= IF  LCMIN C@ 0= IF  10  ( LCOOK) RESET
   5     11 ( LCE) SET  GLSELP 1 = IF LHTIME @  IF 13 ( LHOLD) SET
   6    ?LHTIME  THEN  THEN   COOK  LMSG   CFLLED
   7    32 ( LACF) SET  80 0FRYER  THEN   THEN  THEN ;
   8
   9
  10  LOK
  11
  12
  13
  14
  15
363 LIST
   0
   1 : ?CR G22 ( RCOOK)   IF  RSHAKE C@    IF
   2     2DSEC @  0= IF  0 RSHAKE C!  1 DRSHAKE C!  30 AUTIC C!
   3      100 SHAKETIC C!  RBLANK  SHAKE  RMSG  THEN  THEN
   4      RCSEC C@ 0= IF RCMIN C@ 0= IF  22 ( RCOOK) RESET
   5     23 ( RCE) SET  GRSELP 6 = IF RHTIME @ IF 25 SET
   6    ?RHTIME  THEN  THEN    COOK  RMSG   CFRLED
   7    31 ( RACF) SET   40 0FRYER  THEN  THEN  THEN  ;
   8
   9   LOK
  10
  11
  12
  13
  14
  15
364 LIST
   0
   1 : ?HL  G13 ( LHOLD)  IF 1DSEC C@ 0= IF  1DMIN C@ 0= IF
   2     13 ( LHOLD) RESET ( 1 LFLED) 12 ( LHE) SET HOLD LMSG
   3   THEN THEN THEN ;
   4
   5 : ?HR  G25 ( RHOLD)  IF 2DSEC C@ 0= IF  2DMIN C@ 0= IF
   6     25 ( RHOLD) RESET ( 32 RFLED ) 24 ( RHE) SET HOLD RMSG
   7   THEN THEN THEN ;
   8
   9 : $LMELT  G3 ( POT) 0= IF  G8 ( LMELT)    IF
  10    CYCL  LMSG  THEN  THEN      ;
  11
  12 : $RMELT  G3 ( POT)  0= IF  G20  ( RMELT)
  13    IF  CYCL   RMSG  THEN  THEN   ;
```

```
    14
    15 LOK
365 LIST
     0
     1 : $LCOOK  G10  ( LCOOK)  IF
     2      ILCOOK  DLSHAKE C@   IF  SHAKETIC C@  0= IF
     3        0 DLSHAKE  C!  THEN  THEN  DLSHAKE C@  0= IF
     4      G3  0= IF  LCOOK    THEN   THEN  THEN     ;
     5
     6 : $RCOOK  G22 ( RCOOK)   IF
     7      IRCOOK  DRSHAKE C@   IF  SHAKETIC C@  0= IF
     8        0 DRSHAKE  C!  THEN  THEN  DRSHAKE C@  0=  IF
     9      G3   0= IF  RCOOK    THEN  THEN  THEN    ;
    10
    11 : $COOK   $LCOOK   $RCOOK  ;
    12
    13  LOK
    14
    15
366 LIST
     0
     1
     2 : $LHOLD  G10 ( LCOOK)  0=  IF  G13  ( LHOLD)
     3      IF  LHOLD  THEN  THEN   ;
     4
     5 : $RHOLD  G22  ( RCOOK)  0=   IF  G25  ( RHOLD)
     6      IF  RHOLD  THEN  THEN   ;
     7
     8 : $HOLD  G3 ( POT)  0= IF  G22 ( RCOOK)  0= IF G25 ( RHOLD)
     9      IF  RHOLD  THEN THEN
    10      G10 ( LCOOK)  0= IF  G13 ( LHOLD)
    11       IF  LHOLD  THEN THEN THEN    ;
    12
    13  LOK
    14
    15
367 LIST
     0
     1
     2
     3 : $DPOT   G3 ( POT)   IF  TICPOT C@  0= IF
     4    3 ( POT) RESET G7 ( LON)   IF  G2 ( PROG)  0= IF  LGDIS
     5     THEN THEN    G19 ( RON)   IF  G2 ( PROG)  0= IF
     6      RGDIS THEN THEN THEN THEN    ;
     7
     8 : $DREC   DREC C@  IF   TICPOT C@   0= IF  0 DREC C!
     9      THEN  THEN    ;
    10  LOK
    11
    12
    13
    14
    15
368 LIST
     0
     1 : ?LCT   14  ( LLO) RESET   15 ( LHI) RESET
     2      G8 ( LMELT)  0= IF    LTD  DUP -15 < IF
     3        15 ( LHI) SET DROP   ELSE 15 > IF 14 ( LLO) SET
     4      THEN  THEN    THEN ;
     5
     6 : ?RCT  26 ( RLO) RESET   27 ( RHI) RESET
     7      G20 ( RMELT)  0= IF    RTD   DUP -15 < IF
     8        27 ( RHI) SET DROP   ELSE 15 > IF  26 ( RLO) SET
```

```
  9       THEN    THEN    THEN    ;
 10
 11 : ?TEMP    ?LCT   ?RCT ;
 12
 13   LOK
 14
 15
369 LIST
  0
  1
  2
  3
  4 LOK
  5
  6
  7
  8
  9
 10
 11
 12
 13
 14
 15
370 LIST
  0 ( FLAG AND DISPLAY CONTROL ROUTINES)
  1
  2 : ?SND   0   11 ( LCHE) GIT IF DROP 1 ELSE
  3               23 ( RCHE) GIT IF DROP 1 ELSE
  4               12 ( LHHE) GIT IF DROP 1 ELSE
  5               24 ( RHHE) GIT IF DROP 1
  6               THEN  THEN   THEN   THEN ;
  7
  8
  9 : $SOUND  ?SND    IF 1  C/H-ALARM C! ELSE 0 C/H-ALARM C! THEN ;
 10
 11
 12   LOK
 13
 14
 15
371 LIST
  0   ASSEMBLER    HEX
  1
  2  40  #CODE  XTEMP T GLO  5 PLO   0#LD T PHI T PLO
  3       5 LDA 0= NOT IF  5 LDA 0= IF  5 INC
  4       5 LDA 0= IF   5 LDA 0= IF   5 LDA 0= IF
  5       5 LDA 0= IF   5 LDA 0= NOT IF 1 # LD T PLO
  6       ELSE   5 LDN 0= NOT IF 2 # LD  T PLO
  7       ELSE   T GLO 0= IF 3 # LD T  PLO
  8       THEN   THEN     THEN THEN    THEN
  9       THEN THEN THEN THEN NEXT
 10
 11
 12   LOK
 13
 14
 15
372 LIST
  0
  1 : $LTEMP   FLAG  6 +  ( LON)  XTEMP  DUP  1 = IF
  2      LLO  DROP  ELSE  DUP  2  =  IF  LHI  DROP  ELSE
  3       3  =  IF   LGDIS  THEN  THEN  THEN  ;
```

```
    4
    5 : $RTEMP  FLAG  18  +  ( RON)  XTEMP  DUP  1  =  IF
    6    RLO  DROP  ELSE  DUP  2  =  IF  RHI  DROP  ELSE
    7    3  =  IF  RGDIS  THEN  THEN  THEN  ;
    8
    9   LOK
   10
   11
   12
   13
   14
   15
373 LIST
    0
    1 CVARIABLE  RHEAT      ( HEATING RIGHT POT FLAG)
    2 CVARIABLE  LHEAT      ( HEATING LEFT POT FLAG)
    3 : ?LH  0  G7  ( LON)  0=  IF  DROP  1
    4    ELSE  G8  ( LMELT)  IF  DROP  1
    5    THEN  THEN  IF  0  LHEAT  C!  ELSE
    6      LTD  20  )  IF  LHEAT  C@  0=  IF
    7    LRFI  1  LCTF  C!    1  LHEAT  C!
    8    THEN  ELSE  0  LHEAT  C!  THEN  THEN  ;
    9 LOK
   10
   11
   12
   13
   14
   15
374 LIST
    0
    1 : ?RH  0  G19  ( RON)  0=   IF  DROP  1
    2    ELSE  G20  ( RMELT)  IF  DROP  1
    3    THEN  THEN  IF  0  RHEAT  C!  ELSE
    4      RTD  20  )  IF  RHEAT  C@  0=  IF
    5    RRFI  1  RCTF  C!    1  RHEAT  C!
    6    THEN  ELSE  0  RHEAT  C!  THEN  THEN  ;
    7
    8 : ?HEATING   ?LH  ?RH  ;
    9
   10 LOK
   11
   12
   13
   14
   15
375 LIST
    0
    1 CVARIABLE  LPIF     ( LEFT PILOT FLAG)
    2 CVARIABLE  RPIF     ( RIGHT PILOT FLAG)
    3
    4 : 2PILOT  DUP  C@  0=  IF  1  SWAP  C!  DROP
    5    ELSE  0  SWAP  C!  1  SWAP  C!  THEN  ;
    6
    7 : LPILOT  G7  ( LON)     IF
    8    2POT  @  200  )  IF  LPF  LPIF  2PILOT
    9     ELSE  0  LPIF  C!   THEN  THEN  ;
   10 : RPILOT  G19  ( RON)  IF
   11    1POT  @  200  )  IF  RPF  RPIF  2PILOT
   12     ELSE  0  RPIF  C!  THEN  THEN  ;
   13 : ?PILOT    LPILOT   RPILOT  ;
   14 LOK
   15
```

```
376 LIST
    0
    1
    2 : ?PAL    G7 ( LON)   IF LPF  C@ IF 1 AL/FLAG C!   THEN THEN
    3          G19 ( RON)  IF RPF  C@ IF 1 AL/FLAG C!   THEN THEN  ;
    4
    5 LOK
    6
    7
    8
    9
   10
   11
   12
   13
   14
   15
377 LIST
    0
    1 : >SLRR   16 ( LRR) GIT   IF GLMT 325 )   IF
    2     16 ( LRR) RESET  1UMIN  C@  60  *  1USEC C@  +
    3       DUP LRT  !   2 * 10  /    RRFACT  C!
    4       1UMIN C@ DLRT 1+  C!   1USEC C@  DLRT  C!
    5     THEN  THEN  ;
    6
    7 : >SRRR   28 ( RRR) GIT   IF GRMT 325 )   IF
    8     28 ( RRR) RESET  2UMIN  C@  60  *  2USEC C@  +
    9       DUP RRT  !   2 * 10  /   LRFACT  C!
   10       2UMIN C@ DRRT 1+  C!   2USEC C@  DRRT  C!
   11     THEN  THEN  ;
   12
   13 LOK
   14
   15
378 LIST
    0
    1 : <LLIM    GLMT 250  <  IF  0   LRT  !  THEN ;
    2 : <RLIM    GRMT 250  <  IF  0   RRT  !  THEN ;
    3
    4 : <SLRR   16 ( LRR) GIT  0= IF   LRT @ 0= IF GLMT 275 ) IF
    5     16 ( LRR) SET   0   1USEC 2DUP 1+ C!  C! THEN THEN THEN ;
    6
    7 : <SRRR   28 ( RRR) GIT  0= IF RRT @ 0= IF GRMT 275 ) IF
    8     28 ( RRR) SET   0   2USEC 2DUP 1+ C!  C! THEN THEN THEN ;
    9
   10 : ?RISE     <LLIM    <SLRR    >SLRR
   11            <RLIM    <SRRR    >SRRR   ;
   12 LOK
   13
   14
   15
379 LIST
    0
    1 : ?LDAL    0     63 ( POT)  0=  IF
    2     2 ( PROG)  GIT  0=  IF
    3      LHPF C@   IF HOT LMSG DROP 1 ELSE
    4      LPF  C@   IF POT LMSG DROP 1 ELSE
    5      LBPF C@   IF BAD LMSG DROP 1
    6      THEN  THEN  THEN  THEN  THEN  ;
    7
    8 : ?RDAL    0     63 ( POT)  0=  IF
    9     2 ( PROG)  GIT  0=  IF
   10      RHPF C@    IF HOT RMSG DROP 1 ELSE
```

```
 11    RPF   C@    IF  POT  RMSG  DROP  1 , ELSE
 12    RBPF  C@    IF  BAD  RMSG  DROP  1
 13  THEN   THEN  THEN    THEN  THEN          ;
 14
 15 LOK
380 LIST
  0
  1 CVARIABLE  DER  ( DISPLAY ERROR FLAG)
  2 : DEER    DBLANK  *CODE  LMSG  EROR  RMSG  ;
  3 : ?NODIS  0  G2  ( PROG)  IF  DROP 1 ELSE  DER C@
  4    IF  DROP  1  ELSE  3  ( POT) GIT   IF  DROP  1
  5   ELSE DREC  C@  IF  DROP  1 THEN    THEN  THEN  THEN  ;
  6 : ?ERROR   5  ( ERR) GIT      IF  DER  C@  0=  IF   DEER
  7    40 AUTIC  C!   1 DER   C!   ELSE AUTIC  C@   0=   IF
  8     5  ( ERR)  RESET   0   DER   C!   DBLANK  G7 ( LON)  IF
  9    LGDIS THEN G19 ( RON) IF RGDIS THEN THEN THEN THEN ;
 10
 11 : LDIS  $LMELT  $LCOOK  $LHOLD  $LTEMP   ;
 12 : RDIS  $RMELT  $RCOOK  $RHOLD  $RTEMP   ;
 13
 14 LOK
 15
381 LIST
  0
  1 : DISPRO  G7 ( LON)  IF  FION C@ IF -ON- LMSG ELSE
  2   ?LDAL  0=  IF  ?NODIS
  3    0= , IF  BF  C@  IF DBOIL  ELSE
  4     11  ( LCHE) GIT 0= IF  12  ( LHHE) GIT  0= IF  LDIS
  5     THEN THEN  THEN  THEN  THEN  THEN  THEN
  6      G19  ( RON)  IF FION C@ IF -ON- RMSG ELSE
  7      ?RDAL 0= IF ?NODIS 0= IF BF  C@  IF  DBOIL  ELSE
  8      23  ( RCHE) GIT 0= IF  24  ( RHHE) GIT 0= IF  RDIS
  9    THEN THEN  THEN  THEN  THEN  THEN  THEN       ;
 10 : ?COOKING  G7 ( LON)   IF  ?CL THEN
 11      G19 ( RON)   IF ?CR THEN ;
 12 : ?HOLDING  G7 ( LON)   IF  ?HL THEN
 13      G19 ( RON)   IF ?HR THEN ;
 14 LOK
 15
382 LIST
  0
  1 : ?LBP   G7 ( LON)  IF  GLMT  0= IF
  2          1 LBPF C!  THEN THEN   ;
  3
  4 : ?RBP   G19 ( RON)  IF  GRMT  0= IF
  5          1 RBPF C!  THEN  THEN  ;
  6
  7 : ?BADPROBE   ?LBP   ?RBP         ;
  8
  9
 10 : ?BPF  LBPF  C@  IF  1 AL/FLAG  C!  THEN
 11     RBPF  C@  IF  1  AL/FLAG  C!  THEN  ;
 12
 13  LOK
 14
 15
383 LIST
  0
  1 : L-HILIMIT.  G7 ( LON) IF  GLMT  HI-LIMIT  )  IF  1  LHPF  C!
  2       80  0FRYER  63  0RLED   THEN   THEN    ;
  3
  4
  5 : R-HILIMIT  G19 ( RON) IF  GRMT  HI-LIMIT  )  IF  1  RHPF  C!
```

```
    6         40  ØFRYER  63 ØLLED      THEN    THEN        ;
    7
    8 : ?OVERTEMP  L-HILIMIT  R-HILIMIT          ;
    9
   10 : ?HPF  LHPF  C@  IF  1  AL/FLAG  C!  THEN
   11        RHPF  C@  IF  1  AL/FLAG  C!  THEN  ;
   12
   13 LOK
   14
   15
384 LIST
    0
    1 VARIABLE    LAV  8 ALLOT
    2 VARIABLE    LAVR
    3 VARIABLE    RAV  8 ALLOT
    4 VARIABLE    RAVR
    5
    6 : AVIT     >R  6  0  DO  J  I  2  *    +
    7     DUP  2+   @   SWAP  !  LOOP  R>  8 +  !  ;
    8
    9 : LAVIT  LDMT  @    DUP  100 >   IF DROP  0  ELSE  DUP  -100
   10   <  IF  DROP  0  THEN  THEN      LAV  AVIT  ;
   11
   12 : RAVIT  RDMT  @    DUP  100 >   IF DROP  0  ELSE
   13     DUP  -100  <  IF  DROP  0  THEN  THEN    RAV  AVIT  ;
   14 LOK
   15
385 LIST
    0
    1 : DRAV  0 RAVR  !  RAVR  >R    RAV  5  0  DO
    2    DUP  @  J  @  +  J  !  2+  LOOP  R>    DUP
    3    @  5  /  SWAP  !  DROP  ;
    4
    5 : DLAV  0 LAVR  !  LAVR  >R    LAV  5  0  DO
    6    DUP  @  J  @  +  J  !  2+  LOOP  R>    DUP
    7    @  5  /  SWAP  !  DROP  ;
    8
    9 : %RA    RAVIT  DRAV ;
   10
   11 : %LA    LAVIT  DLAV ;
   12 LOK
   13
   14
   15
386 LIST
    0
    1
    2 : LCORECTIT  10  *  LFSEC  C@  DUP  *  +  20  /  ;
    3
    4 : LCOR  LAVR  @ 6  *    G8 ( RMELT)  0= IF  LHEAT  C@ 0= IF
    5     G22  ( LCOOK)    0= . IF
    6       LBN  C@  IF  LCORECTIT  THEN  2 +  THEN  THEN  THEN
    7     GLMT  +    LMTCOR  @  +  2  /  LMTCOR  !  ;
    8
    9 LOK
   10
   11
   12
   13
   14
   15
```

```
387 LIST
    0
    1
    2 LOK
    3
    4
    5
    6
    7
    8
    9
   10
   11
   12
   13
   14
   15
388 LIST
    0
    1 : RCORECTIT  10  *  RFSEC  C@  DUP  *  +  20  /  ;
    2
    3 : RCOR  RAVR  @  6  *  G20  ( RMELT)  0=  IF
    4    RHEAT  C@  0=  IF  G22  ( RCOOK)  0=  IF
    5      RBN  C@  IF  RCORECTIT    THEN  2  +
    6    THEN   THEN   THEN  GRMT  +  RMTCOR  @  +
    7    2  /  RMTCOR  !  ;
    8
    9 LOK
   10
   11
   12
   13
   14
   15
389 LIST
    0
    1
    2 : ?IDF  33  ( IDF)  GIT  IF  0  G7  ( LON)  IF  DROP  1
    3    ELSE  G19  ( RON)  IF  DROP  1  THEN  THEN  IF
    4    33  ( IDF)  RESET    THEN THEN  ;
    5
    6
    7
    8  LOK
    9
   10
   11
   12
   13
   14
   15
390 LIST
    0
    1
    2
    3
    4
    5
    6
    7
    8
    9
   10  LOK
```

```
       11
       12
       13
       14
       15
391 LIST
     0 ( CONTROL BLOCK)
     1
     2
     3 : LRST    LBN C@  0= IF 1  LBN  C!
     4     LRFI   1 LCTF   C!   LSSEC C! ELSE  DROP  THEN  ;
     5
     6 : ?LFIREIT  0  GLMT  GLPT  1-  )  IF  DROP  1
     7     ELSE  LMTCOR @  GLPT  1-  )  IF  DROP  1 THEN  THEN
     8      0=  IF  9  LRST  ELSE  LBN  C@  IF  0  LBN  C!
     9       25   LSSEC  C!   ELSE
    10       LSSEC  C@  0=  IF  20 . LSSEC  C!  THEN THEN THEN ;
    11
    12 LOK
    13
    14
    15
392 LIST
     0 ( CONTROL BLOCK)
     1
     2
     3 : RRST    RBN C@  0= IF 1  RBN  C!
     4     RRFI   1 RCTF   C!   RSSEC C! ELSE  DROP  THEN  ;
     5
     6 : ?RFIREIT  0  GRMT  GRPT  1-  )  IF  DROP  1
     7     ELSE  RMTCOR @  GRPT  1-  )  IF  DROP  1 THEN  THEN
     8      0=  IF  9  RRST  ELSE  RBN  C@  IF  0  RBN  C!
     9       25   RSSEC  C!   ELSE
    10       RSSEC  C@  0=  IF  20  RSSEC  C!  THEN THEN THEN ;
    11
    12 LOK
    13
    14
    15
393 LIST
     0 ( CONTROL BLOCK)
     1
     2
     3 LOK
     4
     5
     6
     7
     8
     9
    10
    11
    12
    13
    14
    15
394 LIST
     0 ( CONTROL BLOCK)
     1
     2
     3
     4
     5
```

```
      6 LOK
      7
      8
      9
     10
     11
     12
     13
     14
     15
395 LIST
      0 ( CONTROL BLOCK)
      1
      2 : ?RCON   G20 ( RMELT) IF 26 RFIRE ! 6 RBURN C! 1  RBN  C!
      3     ELSE 26 RBURN C! RHEAT C@ IF 1 RBN C!
      4       ELSE  IRBF  C@  IF 25  RRST 25 RSSEC C! 0  IRBF  C!
      5     ELSE RSSEC C@  0= IF   ?RFIREIT
      6    THEN   THEN   THEN   THEN   ;
      7
      8 : ?LCON   G8 ( LMELT) IF 26 LFIRE ! 6 LBURN C! 1  LBN  C!
      9     ELSE 26 LBURN C! LHEAT C@ IF 1 LBN C!
     10       ELSE  ILBF  C@  IF 25  LRST 25 LSSEC C! 0  ILBF  C!
     11     ELSE LSSEC C@  0= IF   ?LFIREIT
     12    THEN   THEN   THEN   THEN   ;
     13 LOK
     14
     15
396 LIST
      0
      1 : ?CONTROLING      RCOR    LCOR    ?RCON ?LCON  ;
      2
      3 : LSAMPLE   CH3  @   DUP  LLMT  @  -  LDMT  !
      4    LLMT   !     %LA  ;
      5
      6 : RSAMPLE   CH2  @   DUP  LRMT  @  -  RDMT  !
      7    LRMT   !     %RA  ;
      8
      9 : SAMPLE    LSAMPLE   RSAMPLE     ;
     10
     11 LOK
     12
     13
     14
     15
397 LIST
      0    ( PRINT LOGGING BLOCK )
      1 : PR    RCA    3 U.R  2 SPACES    TAR ;
      2 : KR  RCA    CR      TAR ;
      3 : STATUS  KR  GRPT  PR      GRMT  PR
      4    RMTCOR @ PR RSSEC C@  PR   ( RBN C@ PR)
      5     RFSEC  DUP C@ SWAP 1+ C@ 60 * + PR
      6     RCSEC  DUP C@ SWAP 1+ C@ 60 * + PR
      7    IOBYTE  C@ 8 / BIN   RCA   4 U.R 2 SPACES  TAR Z
      8   ( RDMT @ RCA  .  2 SPACES  TAR)
      9   ( RAVR @ RCA  .   TAR) ;
     10 : SAMPLE    STATUS     RSAMPLE  ;
     11
     12 LOK
     13
     14
     15
398 LIST
      0
```

```
    1 : ?DOADC    ?ADC  GASTAT  128  =  IF
    2     SAMPLE    ?BADPROBE  ?OVERTEMP  ?PILOT THEN ;
    3 : ?DDIS  FION   C@  IF  UTIC C@  0=  IF  0  FION C! THEN THEN ;
    4 : MAGIC  0  FEK  C!  TAR  BEGIN
    5    KEYPRO        DISPRO          $SOUND      ?COOKING    ?HOLDING
    6    $DREC         $DPOT           ?IDF        ?DOADC      ?DDIS
    7    FION C@  0=  IF
    8    ?MELTING      ?HEATING      ?CONTROLING THEN
    9    ?FIRE         ?RISE
   10    ?BPF          ?HPF            ?TEMP       ?PAL        ?ERROR
   11    FEK C@  END  RCA DROP ;
   12 : GO     SETUP MAGIC ;
   13 LOK
   14
   15
399 LIST
    0
    1 : ?DOADC    ?ADC  GASTAT  128  =  IF
    2     SAMPLE    ?BADPROBE  ?OVERTEMP  ?PILOT THEN ;
    3 : ?DDIS  FION   C@  IF  UTIC C@  0=  IF  0  FION C! THEN THEN ;
    4 : MAGIC  SETUP  BEGIN
    5    KEYPRO        DISPRO          $SOUND      ?COOKING    ?HOLDING
    6    $DREC         $DPOT           ?IDF        ?DOADC      ?DDIS
    7    FION C@  0=  IF
    8    ?MELTING      ?HEATING      ?CONTROLING THEN
    9    ?FIRE         ?RISE
   10    ?BPF          ?HPF            ?TEMP       ?PAL        ?ERROR
   11       0     END ;
   12 LOK
   13
   14
   15
400 LIST
    0
    1
    2 : DF   2 SPACES  .  2 SPACES   ;
    3
    4 : TFLAGS CR  ." RBN   "  RBN C@ DF ." RFIRED" RFIRED C@ DF
    5      ." RCTF " RCTF C@ DF   ." RMELT " G20 DF
    6      ." RHEAT " RHEAT C@ DF CR ." IRBF  " IRBF C@ DF
    7      ." RCOOK " G22 DF
    8      ." RFIRE " RFIRE @ DF  ." RBURN " RBURN C@ DF     CR
    9      ." RFIRETIME" RFSEC COMT DF CR CR
   10     318   LIST     ;
   11 LOK
   12
   13
   14
   15
401 LIST
    0
    1 CVARIABLE RCTX
    2
    3
    4
    5
    6
    7
    8 LOK
    9
   10
   11
   12
```

What is claimed is:

1. A deep fat fryer comprising:
a frypot having heating means for heating cooking oil;
temperature sensing means for producing a signal indicative of the cooking oil temperature;
memory means for storing cooking data;
temperature control means for controlling the heat provided to the cooking oil;
food transport means for placing food in and removing food from the cooking oil;
processing means connected to said temperature sensing means and temperature control means for computing a cooking time and a cooking temperature from said data, periodically adjusting the computed cooking time and cooking temperature by timing the cooking of the food within the cooking oil and determining the temperature of the cooking oil during the cooking time and adjusting the cooking time and cooking temperature to compensate for deviations of cooking temperature from the computed cooking temperature and for activating the food transport means to remove the food from the cooking oil at the expiration of the adjusted cooking time.

2. A deep fat fryer according to claim 1 wherein said memory means further includes a security circuit means for only allowing storage of the cooking data after a predetermined code sequence has been input to the security circuit.

3. A deep fat fryer according to claim 2 wherein said processing means is further connected to a user output of visible indicia.

4. A deep fat fryer according to claim 3 wherein said user output further includes an audio indicia.

5. A deep fat fryer according to claim 4 wherein said processing means further includes input circuitry having a cooking sensitivity input that alters the computation of the cooking temperature.

6. A cooking appliance comprising:
heating means to provide heat to a cooking medium for cooking food;
temperature sensing means for detecting the cooking medium temperature and for generating a frequency proportional to the detected temperature; and
control means connected to said temperature means for receiving said frequency indicating the cooking medium temperature and for cooking the food according to data stored in the control means, by controlling the heating means and removing the food from the cooking medium in accordance with said data, said control means including input storage circuitry for a use to input data, said input storage circuitry including means to protect the stored data from unauthorized access.

* * * * *